(12) United States Patent
Nevitt et al.

(10) Patent No.: US 11,550,089 B2
(45) Date of Patent: Jan. 10, 2023

(54) SINGLE PACKET REFLECTIVE POLARIZER WITH THICKNESS PROFILE TAILORED FOR LOW COLOR AT OBLIQUE ANGLES

(71) Applicant: 3M INNOVATIVE PROPERTIES COMPANY, St. Paul, MN (US)

(72) Inventors: Timothy J. Nevitt, Red Wing, MN (US); Carl A. Stover, St. Paul, MN (US); Gilles J. Benoit, Minneapolis, MN (US); Kristopher J. Derks, Woodbury, MN (US); Zhaohui Yang, North Oaks, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 12 days.

(21) Appl. No.: 17/305,867

(22) Filed: Jul. 16, 2021

(65) Prior Publication Data

US 2021/0341660 A1 Nov. 4, 2021

Related U.S. Application Data

(60) Division of application No. 16/787,608, filed on Feb. 11, 2020, now Pat. No. 11,099,312, which is a
(Continued)

(51) Int. Cl.
*G02B 5/30* (2006.01)
*B32B 7/023* (2019.01)
(Continued)

(52) U.S. Cl.
CPC .......... *G02B 5/305* (2013.01); *B29D 11/0073* (2013.01); *B29D 11/00644* (2013.01);
(Continued)

(58) Field of Classification Search
CPC ...... G02B 5/305; G02B 5/3083; B32B 7/023; B32B 2307/42; B29D 11/0064; B29D 11/0073
(Continued)

(56) References Cited

U.S. PATENT DOCUMENTS 5,808,794 A 9/1998 Weber et al.
5,882,774 A 3/1999 Jonza et al.
(Continued)

FOREIGN PATENT DOCUMENTS

EP 2 514 592 10/2012
JP 2006-062281 3/2006
(Continued)

OTHER PUBLICATIONS

PCT International Search Report from PCT/US2017/051026, dated Dec. 26, 2017, 3 pages.

*Primary Examiner* — Ricky D Shafer
(74) *Attorney, Agent, or Firm* — Robert S. Moshrefzadeh

(57) ABSTRACT

Multilayer optical film reflective polarizers previously considered to have excessive off-axis color can provide adequate performance in an LC display in an "on-glass" configuration, laminated to a back absorbing polarizer of the display, without any light diffusing layer or air gap in such laminate. The reflective polarizer is a tentered-one-packet (TOP) multilayer film, having only one packet of microlayers, and oriented using a standard tenter such that birefringent microlayers in the film are biaxially birefringent. The thickness profile of optical repeat units (ORUs) in the microlayer packet is tailored to avoid excessive perceived color at normal and oblique angles. Color at high oblique angles in the white state of the display is reduced by positioning thicker ORUs closer to the absorbing polarizer, and by ensuring that, with regard to a boxcar average of the ORU thickness profile, the average slope from an ORU(600)
(Continued)

to an ORU(645) does not exceed 1.8 times the average slope from an ORU(450) to the ORU(600).

12 Claims, 42 Drawing Sheets

Related U.S. Application Data continuation of application No. 16/331,998, filed as application No. PCT/US2017/051062 on Sep. 12, 2017, now Pat. No. 10,613,264.

(60) Provisional application No. 62/393,985, filed on Sep. 13, 2016.

(51) Int. Cl.

| | | |
|---|---|---|
| *B29D 11/00* | (2006.01) | |
| *B32B 27/08* | (2006.01) | |
| *B32B 27/36* | (2006.01) | |
| *B29K 67/00* | (2006.01) | |
| *B29L 31/34* | (2006.01) | |

(52) U.S. Cl.
CPC .............. *B32B 7/023* (2019.01); *B32B 27/08* (2013.01); *B32B 27/36* (2013.01); *B29K 2067/003* (2013.01); *B29L 2031/3475* (2013.01); *B32B 2250/05* (2013.01); *B32B 2250/244* (2013.01); *B32B 2307/42* (2013.01); *B32B 2457/202* (2013.01)

(58) Field of Classification Search
USPC ............. 359/485.03, 489.13, 489.15, 489.19
See application file for complete search history.

(56) References Cited

U.S. PATENT DOCUMENTS

| | | | |
|---|---|---|---|
| 6,025,897 | A | 2/2000 | Weber et al. |
| 6,049,419 | A | 4/2000 | Wheatley et al. |
| 6,088,159 | A | 7/2000 | Weber et al. |
| 6,096,375 | A | 8/2000 | Ouderkirk et al. |
| 6,111,697 | A | 8/2000 | Merrill et al. |
| 6,157,490 | A | 12/2000 | Wheatley et al. |
| 6,449,092 | B1 | 9/2002 | Weber et al. |
| 6,543,153 | B1 | 4/2003 | Weber et al. |
| 6,590,707 | B1 | 7/2003 | Weber |
| 6,783,349 | B2 | 8/2004 | Neavin et al. |
| 6,949,212 | B2 | 9/2005 | Merrill et al. |
| 7,791,687 | B2 | 9/2010 | Weber et al. |
| 8,469,575 | B2 | 6/2013 | Weber et al. |
| 8,792,165 | B2 | 7/2014 | Merrill et al. |
| 8,917,448 | B2 | 12/2014 | Weber et al. |
| 8,982,462 | B2 | 3/2015 | Merrill et al. |
| 9,057,843 | B2 | 6/2015 | Weber et al. |
| 9,063,293 | B2 | 6/2015 | Weber et al. |
| 9,110,245 | B2 | 8/2015 | Derks et al. |
| 9,188,790 | B2 | 11/2015 | Weber et al. |
| 9,279,921 | B2 | 3/2016 | Kivel et al. |
| 9,488,766 | B2 | 11/2016 | Weber et al. |
| 9,513,420 | B2 | 12/2016 | Derks et al. |
| 9,773,847 | B2 | 9/2017 | Epstein et al. |
| 9,823,395 | B2 | 11/2017 | Weber et al. |
| 9,864,120 | B2 | 1/2018 | Free et al. |
| 10,018,262 | B2 | 7/2018 | Depraete et al. |
| 10,254,460 | B2 | 4/2019 | Free et al. |
| 10,545,273 | B2 | 1/2020 | Stover et al. |
| 10,613,264 | B2 | 4/2020 | Nevitt et al. |
| 10,754,073 | B2 | 8/2020 | Benoit et al. |
| 10,838,127 | B2 | 11/2020 | Haag et al. |
| 10,859,741 | B2 | 12/2020 | Stover et al. |
| 11,099,312 | B2 * | 8/2021 | Nevitt .................... G02B 5/305 |
| 2007/0264447 | A1 | 11/2007 | Oya et al. |
| 2008/0151147 | A1 | 6/2008 | Weber et al. |
| 2010/0259708 | A1 | 10/2010 | Hiratsuka et al. |
| 2011/0102891 | A1 | 5/2011 | Derks et al. |
| 2011/0272849 | A1 | 11/2011 | Neavin et al. |
| 2013/0063818 | A1 | 3/2013 | Weber et al. |
| 2016/0109628 | A1 | 4/2016 | Weber et al. |
| 2016/0195659 | A1 | 7/2016 | Johnson et al. |
| 2018/0348418 | A1 | 12/2018 | Stover et al. |

FOREIGN PATENT DOCUMENTS

| | | |
|---|---|---|
| JP | 2008-158365 | 7/2008 |
| JP | 2015-169769 | 9/2015 |
| WO | WO 99/36258 | 7/1999 |
| WO | WO 99/36809 | 7/1999 |
| WO | WO 2009/123928 | 3/2009 |
| WO | WO 2012/157477 | 5/2012 |
| WO | WO 2014/085197 | 6/2014 |
| WO | WO 2015/035030 | 9/2014 |
| WO | WO 2015/034899 | 3/2015 |
| WO | WO 206/061192 | 10/2015 |
| WO | WO 2016/109587 | 7/2016 |

* cited by examiner

SINGLE PACKET REFLECTIVE POLARIZER WITH THICKNESS PROFILE TAILORED FOR LOW COLOR AT OBLIQUE ANGLES

FIELD OF THE INVENTION

This invention relates generally to multilayer optical film reflective polarizing films, with particular application to such films that have only one packet or stack of alternating polymer microlayers, some being biaxially birefringent, and laminates in which such a reflective polarizer is bonded to an absorbing polarizer for use in a display. The invention also relates to associated articles, systems, and methods.

BACKGROUND

Reflective polarizers are commonly used to enhance the brightness of liquid crystal (LC) displays and display systems. The LC display system typically includes an LC panel, behind which is an illumination assembly or backlight positioned to provide light to the LC panel. Brightness enhancement is provided by the reflective polarizer as the result of a light recycling process: light that cannot (because of its polarization state) contribute to the display output is reflected by the reflective polarizer back into the backlight, where some of the light is re-reflected towards the reflective polarizer in a different polarization state that can contribute to the display output and that passes through the reflective polarizer toward the user or viewer.

The LC panel includes a layer of liquid crystal material disposed between glass panel plates. Furthermore, the LC panel is sandwiched between two absorbing polarizer films: a front absorbing polarizer, attached to the front glass plate of the LC panel, and a back absorbing polarizer, attached to the back glass plate. The brightness-enhancing reflective polarizer is placed somewhere behind the LC panel, and behind the back absorbing polarizer.

In practice, design details of the reflective polarizer have an impact on exactly where the reflective polarizer can be placed in the display system to provide optimal, or at least acceptable, optical performance. Some types of reflective polarizers can be laminated directly to the exposed rear surface of the back absorbing polarizer. Those of ordinary skill in the art consider it necessary for these types of reflective polarizers to have a very low perceived color for the pass state of polarization both at normal incidence (light propagating along the optical axis of the display system) and at highly oblique incidence. Since the reflective polarizer is attached to the back absorbing polarizer, and the back absorbing polarizer is in turn commonly attached to the back glass plate of the LC panel, this is referred to as an "on-glass" configuration of the reflective polarizer. One reflective polarizer currently used in the on-glass configuration is a parabolically-stretched reflective polarizer, discussed further below. Another reflective polarizer used in the on-glass configuration is a multi-packet reflective polarizer, also discussed below.

Other types of reflective polarizers, now considered by those of ordinary skill in the art to have excessive perceived color for the pass state of polarization for obliquely incident light, are not laminated to the back absorbing polarizer of the display because the (undesirable) color associated with the reflective polarizer would be visible to the user through the absorbing polarizer and through the LC display. Instead, these latter types of reflective polarizers—multilayer optical film reflective polarizers of alternating polymer layers in which there is only one packet of microlayers, the microlayer packet having a thickness gradient or profile to provide broadband reflection, the multilayer optical film having been oriented using a standard tenter such that birefringent layers of the film are biaxially birefringent, such films referred to herein as Tentered-One-Packet ("TOP") films or TOP reflective polarizers—are used in the display system as a standalone film, separated from the back absorbing polarizer by at least one air gap, and attached to a light diffusing film or layer that is disposed between the reflective polarizer and the back absorbing polarizer. The light diffusing layer has a significant haze value so as to effectively combine light rays that pass through the reflective polarizer in different directions, to reduce or eliminate the color associated with the TOP reflective polarizer from the standpoint of the user or viewer.

U.S. Pat. No. 7,791,687 (Weber et al.) appears to go against this prevailing opinion by disclosing embodiments in which a display panel has on one side thereof the combination of a first absorbing polarizer and a TOP reflective polarizer, these two polarizers being aligned with each other, and on the other side of the display panel is a second absorbing polarizer that is crossed with (oriented at 90 degrees relative to) the first absorbing polarizer. However, the '687 Weber patent refers to special cases in which the first absorbing polarizer is a low contrast absorbing polarizer (see e.g. column 2, lines 1-15, and column 3, lines 22-39). In the examples, the first absorbing polarizer has a contrast ratio of only about 5 (see e.g. Example 2, where the block state transmission of the first absorbing polarizer is reported as 20%). The '687 Weber patent says that in these cases where the first absorbing polarizer is of low contrast, the optical properties of the reflective polarizer become more important for maintaining the contrast of the display (see col. 3, lines 22-39). As demonstrated in the examples, the '687 Weber patent then assesses the display contrast by evaluating the block state (dark state) performance of the display. That is, the patent calculates and compares the spectral transmission through crossed polarizer systems, in which a combination TOP reflective polarizer/first absorbing polarizer (of low contrast, and aligned with the TOP polarizer) is crossed with a second absorbing polarizer of high contrast. These transmission spectra are calculated for various oblique polar angles $\theta$ and an azimuthal angle $\varphi$ of 45 degrees. The calculated transmission through such crossed polarizer systems is representative of the dark state of the display, and is thus very low—all of the examples have transmissions under 4%, and some are well under 1%, over the entire visible wavelength region for the angles that were tested. The examples compare systems in which the TOP reflective polarizer is oriented different ways—some where the thickness profile of the TOP reflective polarizer is oriented one way, and some where it is oriented the opposite way—by comparing their calculated transmission spectra. This analysis led the '687 Weber researchers to conclude the thickness profile of the TOP reflective polarizer should be oriented such that a majority of the layers having a smaller optical thickness are disposed closer to the display panel than the layers having a larger optical thickness. In embodiments where the combination TOP reflective polarizer/low contrast absorbing polarizer is disposed behind (rather than in front of) the display panel, this means that the thickness profile of the TOP polarizer should be oriented so that thinner layers face the front, i.e., towards the user, and the thicker layers face the back, i.e., away from the user and towards the backlight.

BRIEF SUMMARY

In light of current prevailing opinion that TOP reflective polarizers are not suitable for on-glass applications in modern display systems that use a high contrast absorbing polarizer both at the front and the back of the LC display panel due to the significant color generated by conventional TOP polarizers in the pass state (white state) of the display system at highly oblique incidence angles, we have revisited the suitability of TOP reflective polarizers for these applications. Briefly summarized, we have found it is indeed feasible to use TOP reflective polarizers in such display systems in an on-glass configuration, i.e., laminated to the high contrast absorbing polarizer at the back of the display panel. We have further found that unwanted visible color at high oblique angles in the white state of the display can be substantially reduced to acceptable levels by properly orienting the TOP polarizer, and by properly tailoring the layer thickness profile associated with the thick microlayer end of the microlayer packet. Interestingly, the orientation of the TOP polarizer we have found to be optimal—having the thicker microlayers (more precisely, the thicker optical repeat units (ORUs)) face the front of the display (and the absorbing polarizer), and the thinner microlayers (more precisely, the thinner ORUs) face the back of the display—is the opposite of the orientation taught by the '687 Weber et al. patent.

TOP reflective polarizers, properly designed and oriented, can provide acceptable performance in an LC display, in an on-glass configuration, without the need for any air gap or high haze light diffusing layer. Thus, a laminate made by combining such a TOP reflective polarizer with a high contrast absorbing polarizer, without an air gap and without a high haze light diffusing layer or structure (and in some cases without any significant light diffusing layer or structure at all) between the reflective polarizer and the absorbing polarizer, can be successfully used and incorporated into a liquid crystal display or the like. The TOP reflective polarizer in this construction is a multilayer optical film of alternating polymer layers in which there is only one packet of microlayers, the multilayer optical film having been oriented using a standard tenter such that birefringent layers (including microlayers) of the film are biaxially birefringent. The microlayers in the packet, or more precisely the ORUs in the packet, are provided with a thickness profile appropriately tailored to avoid excessive perceived color at normal and highly oblique angles for the pass state (white state) of the display system. Such TOP multilayer optical film reflective polarizers are discussed further below.

We thus describe herein, inter alia, reflective polarizers having only one packet of microlayers that reflects and transmits light by optical interference, the packet of microlayers configured to define a first pass axis (y), a first block axis (x), and a first thickness axis (z) perpendicular to the first pass axis and the first block axis. The packet of microlayers may include alternating first and second microlayers, at least the first microlayers being biaxially birefringent. Adjacent pairs of the first and second microlayers form optical repeat units (ORUs) along the packet of microlayers, the ORUs defining a physical thickness profile having a gradient that provides a wide band reflectivity for normally incident light polarized along the first block axis. The ORUs have respective resonant wavelengths as a function of the physical thickness profile and optical geometry. The ORUs include a first ORU and a last ORU at opposite ends of the packet. ORUs proximate the last ORU have an average physical thickness greater than that of ORUs proximate the first ORU. An intrinsic-bandwidth based boxcar average of the physical thickness profile yields an IB-smoothed thickness profile, the IB-smoothed thickness profile being defined at each of the ORUs. The ORUs include an ORU(450), an ORU(600), and an ORU(645). The ORU(450) has a resonant wavelength, for the IB-smoothed thickness profile, of at least 450 nm for an oblique optical geometry in which p-polarized light is incident in the x-z plane at a polar angle ($\theta$) of 80 degrees. All of the ORUs disposed on a side of the ORU(450) that includes the first ORU have resonant wavelengths, for the IB-smoothed thickness profile, less than 450 nm for the oblique optical geometry. The ORU(600) and ORU(645) are similarly defined, and have resonant wavelengths of at least 600 nm and 645 nm, respectively, at the same oblique optical geometry. The physical thickness profile of the packet is tailored such that the IB-smoothed thickness profile has a first average slope over a range from ORU(450) to ORU(600), and a second average slope over a range from ORU(600) to ORU(645), and the ratio of the second average slope to the first average slope is no more than 1.8.

By satisfying this condition, the TOP reflective polarizer, and the laminate of which it is a part, can impart an amount of color—to white light passing through it at highly oblique angles—that is so small that, for a display incorporating such a polarizer or laminate, the perceived color of the white state of such display at such highly oblique angles is acceptably close to a neutral white or target white color.

We also describe laminates in which such a reflective polarizer is combined with an absorbing polarizer. The absorbing polarizer has a second pass axis and a second block axis, and has a high contrast ratio, e.g., a contrast ratio of at least 1000. The absorbing polarizer attaches to the reflective polarizer with no air gap therebetween, and such that the first and second pass axes are substantially aligned. The reflective polarizer is oriented relative to the absorbing polarizer such that the last ORU is closer than the first ORU to the absorbing polarizer. Related methods, systems, and articles are also discussed.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF DRAWINGS

In the figures, like reference numerals designate like elements.

DETAILED DESCRIPTION OF ILLUSTRATIVE EMBODIMENTS

Figure 1:
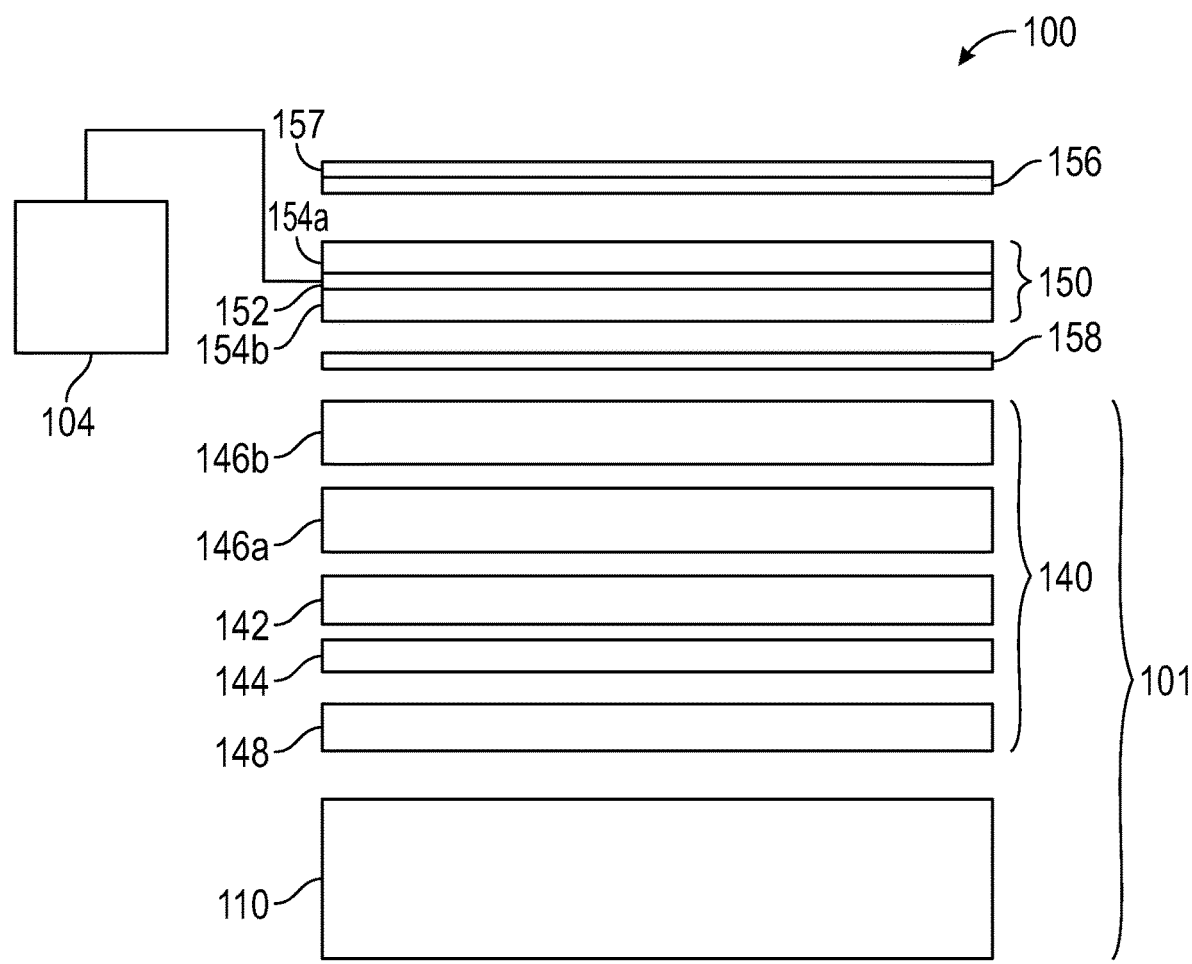
FIG. 1 is a schematic side or sectional view of a liquid crystal display system.

As stated above, we have found that TOP (tentered-one-packet) multilayer optical film reflective polarizers, normally considered to have too much off-axis color to be used in an on-glass configuration with a high contrast absorbing polarizer, can actually provide adequate performance in such a configuration in a liquid crystal display. No air gap or high haze light diffusing layer (and in some cases no light diffusing layer or structure at all) is needed, and none is typically provided, between the TOP reflective polarizer and the absorbing polarizer, or anywhere in a laminate that comprises these two polarizers. The high contrast absorbing polarizer is generally located at the back of the LC panel in an LC display, which display may also include a high contrast absorbing polarizer at the front of the LC panel, as well as front and back glass plates as described above.

The TOP reflective polarizer has only one packet of microlayers, and is oriented using a standard tenter such that birefringent microlayers in the film are biaxially birefringent as a result of the constrained stretch of the tenter. Furthermore, the microlayers in the single packet—or rather, the optical repeat units (ORUs) defined by the microlayers—have a suitably tailored thickness profile. The thickness profile is tailored so that thicker ORUs in the microlayer packet are closer than thinner ORUs to the absorbing polarizer. The thickness profile is further tailored as described further below to provide the laminate with a surprisingly low amount of perceived color in light transmitted through the TOP reflective polarizer (and through the laminate of which it is a part) at highly oblique angles. By so tailoring the thickness profile of the microlayer packet, the TOP reflective polarizer, when combined with a high contrast absorbing polarizer, can provide an acceptable on-glass laminate for use in an LC display. Adequate color performance can be achieved both at normal incidence and oblique incidence, up to a polar angle ($\theta$) of at least 80 degrees, and at intermediate azimuthal angles ($\phi$) between 0 and 90 degrees.

In general, if one is given a multilayer optical film reflective polarizer of unspecified design, appropriate placement of that reflective polarizer in an LC display system is a function of, among other things, color characteristics of the reflective polarizer, particularly color characteristics at high off-axis (oblique) angles of light propagation. Good color performance is harder to achieve at highly oblique angles than at normal incidence. The color characteristics are, in turn, a function of the manner in which the film was fabricated, and the film's resulting physical and optical features.

For example, it is known to fabricate a reflective polarizer by coextruding tens, hundreds, or thousands of alternating polymer layers through a die, optionally doubling or tripling the number of layers by splitting and re-stacking the flow stream in a layer multiplier device, cooling the extrudate on a casting wheel, and orienting (stretching) the cast film to reduce the film thickness such that individual polymer layers form optically thin microlayers, and to induce birefringence in at least some of the microlayers. In the finished multilayer optical film, the microlayers reflect and transmit light by optical interference, as a function of refractive index differences between adjacent microlayers, optical thicknesses of adjacent pairs of microlayers, and the thickness profile of a stack of such layer pairs along a thickness direction or axis of the film. To make a reflective polarizer, the orientation or stretching is carried out primarily along one in-plane direction, so that the refractive indices of the microlayers define a block axis of high reflectivity, a pass axis of low reflectivity (and high transmission), and a thickness axis perpendicular to the pass and block axes. See for example U.S. Pat. No. 5,882,774 (Jonza et al.).

FIG. 1 is provided for reference to illustrate various components, layers, and films that may be included in a typical LC display system 100. The display system 100 includes a display panel 150 and an illumination assembly 101 positioned behind the panel 150 to provide light thereto. The display panel 150 can include any suitable type of display. In the illustrated embodiment, the display panel 150 includes, or is, an LC panel (hereafter referred to as LC panel 150). The LC panel 150 typically includes a layer of liquid crystal (LC) 152 disposed between panel plates 154a, 154b (collectively, 154). The plates 154 are often composed of glass and can include electrode structures and alignment layers on their inner surfaces for controlling the orientation of the liquid crystals in the LC layer 152. These electrode structures are commonly arranged so as to define LC panel pixels, i.e., areas of the LC layer where the orientation of the liquid crystals can be controlled independently of adjacent areas. A color filter may also be included with one or more of the plates 152 for imposing desired colors such as red, green, and blue on subpixel elements of the LC layer, and thus on the image displayed by the LC panel 150. The LC panel 150 is positioned between a front (or upper) absorbing polarizer 156 and a back (or lower) absorbing polarizer 158. In the illustrated embodiment, the front and back absorbing polarizers 156, 158 are located outside the LC panel 150. Often, the absorbing polarizer (156 or 158) is laminated to the outer major surface of its neighboring glass panel plate (154a or 154b respectively) with a suitable transparent adhesive. The absorbing polarizers 156, 158 and the LC panel 150 in combination control the transmission of light from a backlight 110 through the display system 100 to the viewer. For example, the absorbing polarizers 156, 158 may be arranged with their pass axes (transmission axes) perpendicular to each other. Selective activation of different pixels of the LC layer 152, e.g. by a controller 104, results in light passing out of the display system 100 at certain desired locations, thus forming an image seen by the viewer. The controller 104 may include, for example, a computer or a television controller that receives and displays television images.

One or more optional layers 157 may be provided proximate the front absorbing polarizer 156, for example, to provide mechanical and/or environmental protection to the display surface. The layer 157 may for example include a hardcoat over the front absorbing polarizer 156.

The illumination assembly 101 includes a backlight 110 and one or more light management films in an arrangement 140 positioned between the backlight 110 and the LC panel 150. The backlight 110 can be or include any known backlight of suitable design. For example, light source(s) within the backlight may be positioned such that the backlight is of the edge-lit variety or the direct-lit variety. The light source(s) may include any known light sources, including one or more of: fluorescent bulbs or lamps, including cold cathode fluorescent lamps (CCFLs); and individual LEDs or arrays of LEDs, typically, LEDs that emit nominally white light, whether by a combination of different colored LED die chips (such as RGB), or by a blue or UV LED die illuminating and exciting a white- or yellow-light-emitting phosphor.

The arrangement 140 of light management films, which may also be referred to as a light management unit, is positioned between the backlight 110 and the LC panel 150. The light management films affect the illumination light propagating from the backlight 110. In some cases the backlight 110 can be considered to include one, some, or all of the light management films in the arrangement 140.

The arrangement 140 of light management films may include a diffuser 148. The diffuser 148 is used to scatter or diffuse the light received from the backlight 110. The diffuser 148 may be any suitable diffuser film or plate. For example, the diffuser 148 can include any suitable diffusing material or materials. In some embodiments, the diffuser 148 may include a polymeric matrix of polymethyl methacrylate (PMMA) with a variety of dispersed phases that include glass, polystyrene beads, and $CaCO_3$ particles. The diffuser 148 may also be or include 3M™ Scotchcal™ Diffuser Film, types 3635-30, 3635-70, and 3635-100, available from 3M Company, St. Paul, Minn., USA. A diffuser 148 as used in a light management film arrangement such as arrangement 140 would typically have a relatively high haze, e.g. at least 40%, as measured using a Haze Guard Plus haze meter from BYK-Gardiner, Silver Springs, Md., according to a suitable procedure such as that described in ASTM D1003.

The light management unit 140 also includes a reflective polarizer 142. Although in a general sense the reflective polarizer 142 may be of any suitable design—for example, a multilayer optical film, a diffusely reflective polarizing film (DRPF) such as a continuous/disperse phase polarizer, a wire grid reflective polarizer, or a cholesteric reflective polarizer—for purposes of the present application we are interested in cases where the reflective polarizer is a particular type of multilayer optical film, as discussed elsewhere herein. For example, the reflective polarizer may be a TOP reflective polarizer as described above. Those of ordinary skill in the art have regarded this type of reflective polarizer as having so much off-axis color that a high haze diffuser and air gap between the reflective polarizer 142 and the back absorbing polarizer 158 was considered necessary to keep the overall perceived color of the display system 100 at or reasonably near a neutral white color, in the pass state (white state) of the display system.

In some embodiments, a polarization control layer 144, such as a quarter wave retarding layer, may be provided between the diffuser 148 and the reflective polarizer 142. The polarization control layer 144 may be used to change the polarization of light that is reflected from the reflective polarizer 142 so that an increased fraction of the recycled light is transmitted through the reflective polarizer 142.

The arrangement 140 of light management films may also include one or more brightness enhancing layers. A brightness enhancing layer can redirect off-axis light in a direction closer to the axis of the display. This increases the amount of light propagating on-axis through the LC layer 152, thus increasing the brightness of the image seen by the viewer. One example of a brightness enhancing layer is a prismatic brightness enhancing layer, which has a number of prismatic ridges that redirect the illumination light through refraction and reflection. In FIG. 1, a first prismatic brightness enhancing layer 146a provides optical gain in one dimension, and a second prismatic brightness enhancing layer 146b has prismatic structures oriented orthogonally to those of layer 146a, such that the combination of layers 146a, 146b increases the optical gain of the display system 100 in two orthogonal dimensions. In some embodiments, the brightness enhancing layers 146a, 146b may be positioned between the backlight 110 and the reflective polarizer 142.

The different layers in the light management unit 140 may be free standing relative to each other. Alternatively, two or more of the layers in the light management unit 140 may be laminated to each other.

Two design aspects of the multilayer optical film reflective polarizer to be used in the LC display system are of particular relevance to the present application: the manner in which the extruded film is stretched—which in practical effect determines whether the birefringent microlayers are uniaxially birefringent or biaxially birefringent, and whether layer multiplier devices are used during fabrication, or whether the finished multilayer optical film has more than one distinct stack or packet of microlayers.

We first discuss the manner of stretching or orienting the extruded film. In a first known technique, a long length or web of polymer film continuously advances through a standard tenter apparatus. In the standard tenter, the film is held tautly by sets of clips attached to opposite edges of the film, and the clip sets move forward along rails, under the action of a chain drive or the like. In one section of the tenter, straight sections of the rails diverge from each other such that the clips stretch the film in the cross-web direction (also called the transverse direction) as the clips carry the film generally forward in the down-web direction (also called the longitudinal direction). This orients the film primarily in the cross-web direction. The clips in the standard tenter maintain a constant clip-to-clip spacing and move at a constant speed throughout the length of the straight rail sections, which prevents the film from relaxing in the down-web direction. Due to this down-web constraint of the film during orientation, the stretch provided by such a standard tenter is sometimes referred to as a constrained stretch. As a consequence of the constraint, layers within the film that become birefringent under the conditions of the stretch typically develop three different refractive indices along the three principal directions (the cross-web or x-direction, the down-web or y-direction, and the thickness or z-direction) of the film. If we denote the refractive indices of such a layer along the principal x-, y-, and z-directions as $n_x$, $n_y$, and $n_z$, then $n_x \neq n_y$, and $n_y \neq n_z$, and $n_z \neq n_x$. (To the extent the material exhibits dispersion, whereby a given refractive index n changes somewhat as a function of optical wavelength, the refractive index may be understood to be specified at a particular visible wavelength such as 550 nm (green) or 632.8 nm (He—Ne laser, red), or the refractive index may be understood to be an average over the visible wavelength range, e.g. from 400-700 nm.) A material having this type of birefringence is said to be biaxially birefringent.

In a reflective polarizer in which birefringent microlayers alternate with isotropic microlayers, a consequence of the birefringent microlayers being biaxially birefringent is that the layer-to-layer refractive index differences along the y-direction and along the z-direction cannot both be zero. This in turn results in residual reflectivity and (when used in a display) perceived color for light that propagates at high oblique angles relative to an optical axis perpendicular to the film, for p-polarized light propagating in a reference plane that includes the y-axis (i.e., the pass axis of the polarizer) and the z-axis, and for highly oblique light propagating along other directions.

In a second known technique, the film or web advances through a stretching apparatus that has been specially designed to allow the web or film to fully relax in the down-web direction during the orientation process. For example, in some embodiments the stretching apparatus utilizes sets of clips that move along parabolically-shaped rails. See e.g. U.S. Pat. No. 6,949,212 (Merrill et al.). By allowing the film to relax in the down-web direction (as well as in the thickness direction), layers within the film that become birefringent under the conditions of the stretch typically develop only two different refractive indices along the three principal directions of the film. Stated differently, for such a birefringent layer, the refractive index along the z-direction equals, or substantially equals, the refractive index along the y-direction, but those refractive indices differ substantially from the refractive index along the x-direction (the direction of stretch). Using the $n_x$, $n_y$, $n_z$ notation, $n_y = n_z$, but $n_x \neq n_y$, and $n_x \neq n_z$. (In some cases $n_y$ and $n_z$ may not be exactly equal, but their difference is very small, as discussed below. Thus, $n_y \approx n_z$.) A material having this type of birefringence is said to be uniaxially birefringent. In a reflective polarizer in which birefringent microlayers alternate with isotropic microlayers, a consequence of the birefringent microlayers being uniaxially birefringent is that the layer-to-layer refractive index differences along the y-direction and along the z-direction can both be made to be zero, or substantially zero, while the refractive index difference along the x-direction is nonzero and large in magnitude. This results in little or no significant reflectivity at high oblique angles, and little or no perceived color at such angles when the film is used as a reflective polarizer in a display.

Thus, with regard to off-axis color in a display, a multilayer reflective polarizer whose birefringent microlayers are uniaxially birefringent, e.g. made using a parabolic stretching apparatus, has an inherent advantage relative to a polarizer whose birefringent microlayers are biaxially birefringent, e.g. made using a conventional tenter. However, in practice, with all other factors being equal, a uniaxially birefringent polarizer is more costly to manufacture than a biaxially birefringent polarizer, at least in part due to substantially lower yields for the specialized parabolic stretching apparatus compared to those for the standard tenter.

Optical materials that may be used in the fabrication of the disclosed reflective polarizers can be selected from known materials, preferably transparent polymer materials whose material properties allow for the coextrusion of such materials at the same temperature and in a common feedblock. In exemplary embodiments, layers of alternating thermoplastic polymers (ABABAB . . . ) are used, and one of the polymers is selected to become birefringent, and the other polymer is selected to remain optically isotropic, under the conditions of stretching. Suitable polymers may be judiciously selected from, for example, polyethylene naphthalate (PEN), polyethylene terephthalate (PET), polybutylene terephthalate (PBT), copolymers thereof, and blends thereof. Additionally, other classes of polymers that exhibit birefringence and may be useful for this purpose are polystyrenes (including syndiotactic polystyrene), polyamides (including Nylon6), and liquid crystal polymers.

Regarding the above discussion relating to uniaxial and biaxial birefringence, and equalities and inequalities involving nx, ny, and nz, we recognize that exact equality between two refractive indices may be difficult to achieve or measure, and, from a practical standpoint, small differences may be indistinguishable from exact equality. Therefore, for purposes of this document, we consider a material to be uniaxially birefringent if one pair of its refractive indices are substantially the same, e.g., if they differ by less than 0.05, while remaining pairs of its refractive indices are not substantially the same, e.g., if they differ by at least 0.05. Likewise, a material is considered to be biaxially birefringent if each and every pair of its principal refractive indices are not substantially the same, e.g., if they differ by at least 0.05.

Typically, with regard specifically to multilayer optical film reflective polarizers, a biaxially birefringent layer in such polarizer may for example have refractive indices nx, ny, nz that satisfy the relationships |ny−nz|≥0.05, and |nx−ny|>0.06 or 0.08. In contrast, a uniaxially birefringent layer in such polarizer may for example have refractive indices nx, ny, nz that satisfy the relationships |ny−nz|≤0.05, and |nx−ny|>0.06 or 0.08.

Another design aspect of particular relevance to the present application is the number of distinct stacks of microlayers that are present in the finished multilayer reflective polarizer, which is often related to whether layer multiplier devices were used during fabrication of the film. In describing this feature, reference is made to FIG. 2, which schematically depicts a single packet multilayer optical film configured as a reflective polarizer 220.

Figure 2:
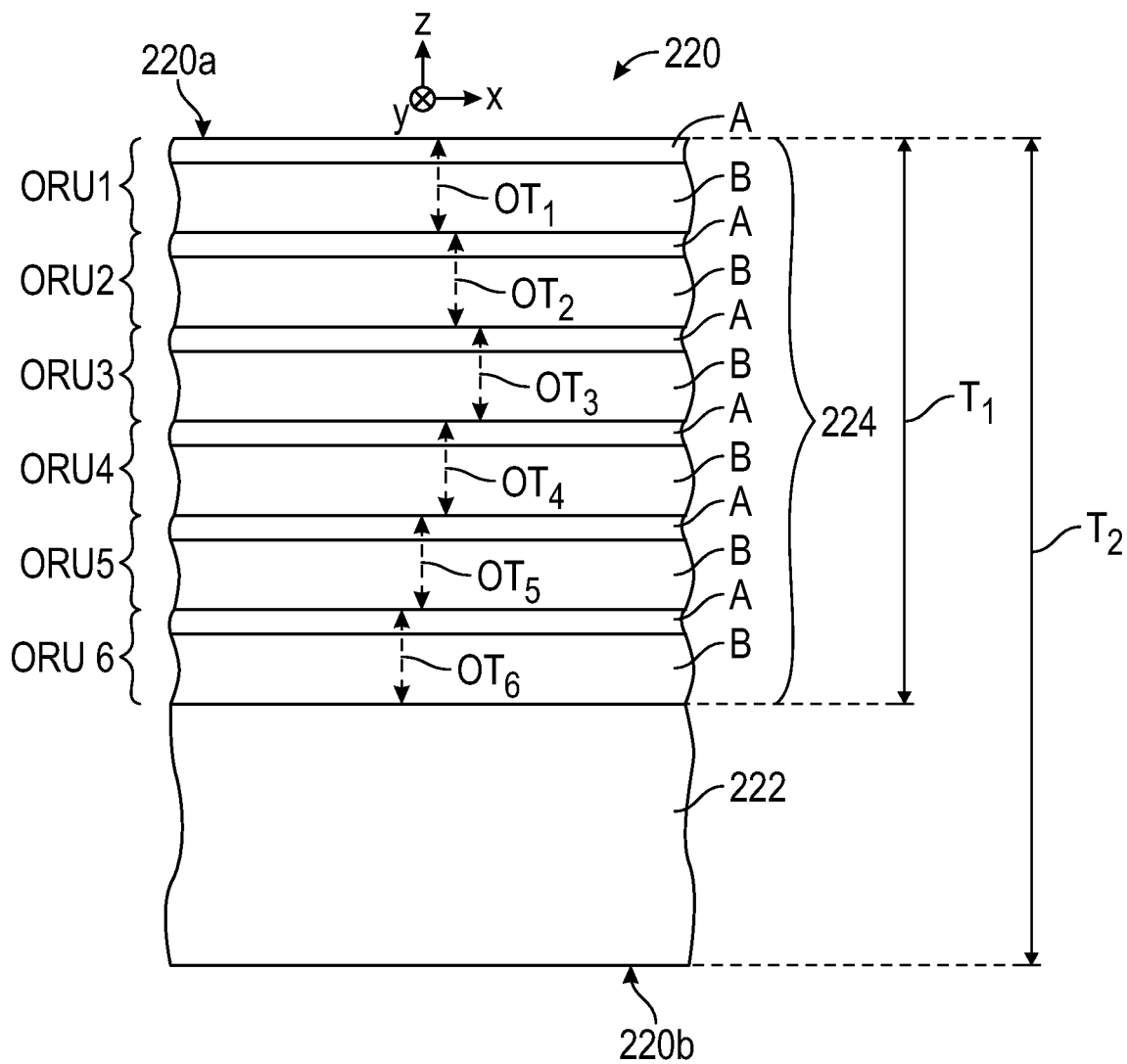
FIG. 2 is a schematic side or sectional view of a single packet multilayer optical film configured as a reflective polarizer.

The multilayer optical film or polarizer 220 has two opposed outer major surfaces 220a, 220b, between which are a plurality of distinct polymer layers. Polymer materials and film-making equipment that can be used to make such a film by coextrusion and stretching are known, see e.g. U.S. Pat. No. 5,882,774 (Jonza et al.) and U.S. Pat. No. 6,783,349 (Neavin et al.), and patent application publication US 2011/0102891 (Derks et al.). Adjacent polymer layers have substantially different refractive indices along at least one of the principal x, y, or z axes, so that some light (depending upon the direction of propagation and the polarization state of the light) is reflected at interfaces between the layers. Some of the polymer layers of the polarizer 220 are sufficiently thin—referred to herein as "optically thin"—so that light reflected at a plurality of the interfaces undergoes constructive or destructive interference in order to give the multilayer optical film the desired reflective or transmissive properties. These layers are referred to herein as microlayers, and are labeled "A" and "B" in FIG. 2. For reflective polarizers designed to reflect visible light, each microlayer generally has an optical thickness (i.e, a physical thickness multiplied by its refractive index) of less than about 1 micron. Thicker layers, such as skin layers or protective boundary layers (PBLs), as are known in the art, may also be present in the polarizer, as illustrated in FIG. 2 by the layer 222. Such "optically thick" layers have an optical thickness of at least 1 micron, and often much greater than 1 micron, and are not considered to be microlayers. (Throughout this document, when the term "thickness" is used without the modifier "optical", the thickness refers to the physical thickness, unless otherwise indicated by the context.)

A coherent grouping of microlayers is referred to herein as a stack or packet of microlayers, or as a microlayer packet. As shown, the polarizer 220 contains only one packet 224 of microlayers. The packet 224 has a (physical) thickness of $T_1$, and the polarizer 220 has an overall thickness of $T_2$, as shown in the figure. Configuring the multilayer optical film with only one packet 224 of microlayers simplifies the manufacturing process (provided the number of microlayers desired is not excessive) and allows for greater control of the thicknesses and thickness profiles of the microlayers, which in turn allows for greater control of the spectral reflectivity and spectral transmission characteristics of the reflective polarizer. In FIG. 2, pairs of adjacent microlayers form optical repeat units (ORUs), labeled ORU1 through ORU6, each ORU having an optical thickness (OT1, OT2, . . . OT6) equal to the sum of the optical thicknesses of its constituent microlayers. Although only 6 ORUs (12 microlayers) are shown, the reader will understand that a typical single packet reflective polarizer will contain many more microlayers and ORUs in order to provide adequate reflectivity over the visible spectrum. For example, the total number of microlayers in the single packet reflective polarizer may be less than 500, or less than 400, or less than 350, or in a range from 200 to 500, or from 200 to 400, or from 200 to 350, or from 225 to 325, for example. The optical thickness of an ORU determines the wavelength at which the ORU exhibits peak reflectivity. Careful control of the thicknesses of the ORUs in accordance with a desired layer thickness profile, wherein the optical thicknesses of the ORUs gradually increase from one side of the packet (e.g. near the major surface 220a) to the opposite side of the packet (e.g. near the thick layer 222), allows the packet of microlayers to provide a broad reflectivity over the visible spectrum and over a desired range of observation angles, provided a sufficient number of ORUs are present in the packet.

An alternative approach, to more easily achieve the desired optical performance targets, is to design the multilayer optical film reflective polarizer to have more microlayers than can be practically incorporated into a single packet film. For this reason (or for other reasons), reflective polarizers are made in which the microlayers are divided or separated into two or more distinguishable microlayer packets, with at least one optically thick polymer material separating neighboring packets. Such multiple packet reflective polarizers can be manufactured in various ways. For example, the reflective polarizer can be made using multiple feedblocks (corresponding to the multiple packets) and combining the packets from these feedblocks while the polymer materials are still liquid, rather than using only one feedblock. See e.g. patent application publication US 2011/0272849 (Neavin et al.). Alternatively, the reflective polarizer can be made using a layer multiplier device, e.g. as discussed in U.S. Pat. No. 5,882,774 (Jonza et al.) or U.S. Pat. No. 6,025,897 (Weber et al.). The layer multiplier device may for example double or triple the number of microlayers and ORUs, producing two or three times (respectively) the number of packets in the finished reflective polarizer. In still another approach, a multiple packet reflective polarizer can be made by laminating together two or more multilayer optical film reflective polarizers that were each made with, for example, a single feedblock.

Drawbacks of multiple packet reflective polarizers tend to include (a) increased manufacturing cost because of the large number of layers and resulting high material cost, and (b) relatively large overall physical thickness, which can be a significant disadvantage in some display applications. (The disclosed reflective polarizers desirably have a thickness of less than 50 microns, or less than 40 microns, or in a range from 20 or 25 microns to 50 microns or from 20 or 25 microns to 40 microns.) However, the larger number of microlayers allow the multiple packet reflective polarizers to achieve display-quality optical performance targets even when such polarizers are oriented using a standard tenter, that is, even when the birefringent microlayers in such reflective polarizers are biaxially birefringent. This is because the multiple packets can produce a spectral smoothing as described in patent application publication US 2013/0063818 (Weber et al.), resulting in a reduced amount of off-axis color. Single packet reflective polarizers cannot take advantage of this spectral smoothing technique, and have a smaller margin of error with respect to layer thickness variability.

When discussing multilayer optical films made by coextruding numerous layers of alternating polymer materials through a feedblock/die and orienting the film with a stretching operation, and the suitability of such films in visual display applications, one aspect of the film of practical interest to the person of ordinary skill is the degree to which the as-manufactured film is spatially uniform. This aspect of the film is of interest because it relates to how much of the manufactured film can be used, versus how much must be disposed of, in the intended application. This in turn affects the manufacturing yield and cost of manufacture, and it can also place size limitations on how large of a piece can be obtained or cut from a given web of film to fit a large display system. In the case of optical films for use in LC displays, a high degree of spatial uniformity is desirable so that film-related artifacts are not noticeable in the displayed image.

Figure 3:
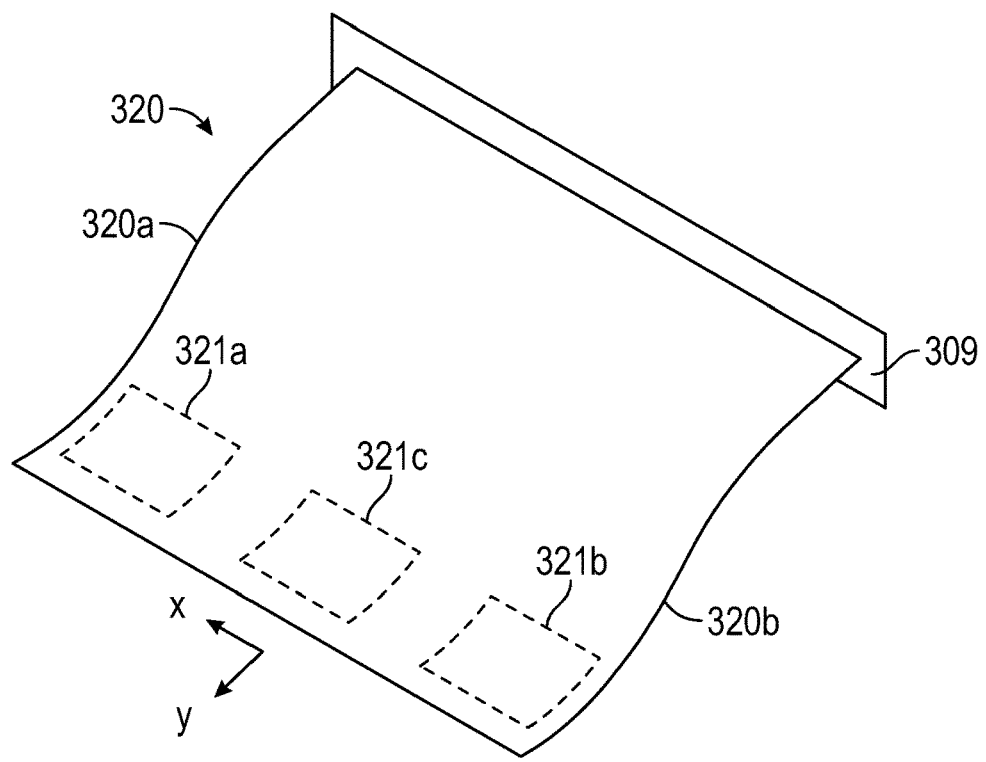
FIG. 3 is a perspective view of a web of optical film.

A web of optical film 320 is shown schematically in FIG. 3. The film 320 is manufactured on a film-making line and emerges from a tenter or other stretching device, which is depicted schematically as element 309. The film 320 has a longitudinal or down-web direction parallel to the y-axis, as shown. The film 320 also has a transverse or cross-web direction parallel to the x-axis, as shown. Two opposed longitudinal edges 320a, 320b define the longitudinal boundaries of the film 320. It is near these edges that the clip sets from the tenter or specialized stretching apparatus grasped the film during a previous orientation step, after which the film 320 was trimmed to the edges 320a, 320b. Three film samples, intended for use as reflective polarizers in a display application or other desired application, are shown in the figure: a film sample 321a near the film edge 320a, a film sample 321b near the film edge 320b, and a film sample 321c in a central portion (in relation to the transverse direction) of the film 320. These film samples or pieces are cut from the larger web or film 320 with a knife, slitter, or other suitable cutting implement. As a reflective polarizer, the optical film 320, and each of the film samples 321a, 321b, 321c, has a block axis parallel to the x-axis, and a pass axis parallel to the y-axis.

In an idealized situation, the film samples 321a, 321b, 321c will all have the same optical characteristics and properties. However, in practice, the film 320 exhibits a certain amount of spatial variability. As a result, the layer thickness profile of the microlayer packet (and its corresponding spectral transmission and reflection characteristics) near an edge of the film 320 differs somewhat from the layer thickness profile (and corresponding spectral transmission and reflection characteristics) in the central portion of the film. The amount of change in the spectral characteristics between the center and edge of the film is particularly significant for the type of multilayer optical film of interest to the present application, namely, a reflective polarizer having only one packet of microlayers and oriented using a standard tenter such that birefringent microlayers in the film are biaxially birefringent. This is because such films lack the spectral smoothing that is provided by the multiple packets of other types of reflective polarizers. See e.g. patent application publication US 2013/0063818 (Weber et al.).

Figure 4:
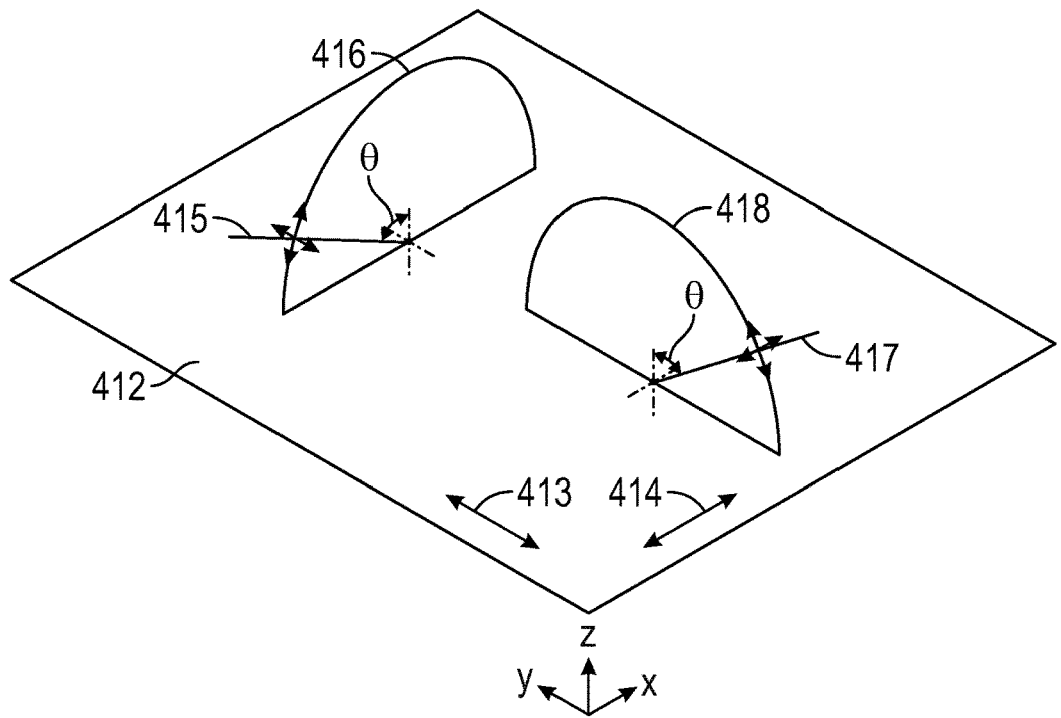
FIG. 4 is a perspective view of an optical film or laminate in relation to a Cartesian coordinate system.

Elsewhere in this document we discuss optical properties such as transmission and reflection of certain polarizing films and laminates at specific angles and polarization states. FIG. 4 is provided to assist the reader in understanding some relevant directions, planes, and angles. In the figure, an optical body 412, which may for example be or comprise a multilayer optical film configured as a reflective polarizer (such as a TOP reflective polarizer), or such a film laminated to an absorbing polarizer and/or to another optical film or body, is shown in the context of a Cartesian x-y-z coordinate system. As a polarizer, the optical body 412 has a pass axis 413 and a block axis 414, which correspond to the mutually perpendicular y- and x-axes, respectively. The z-axis corresponds to a thickness direction of the body 412, i.e., an axis perpendicular to the plane of the body 412. Light that is normally incident on the body 412 propagates parallel to the z-axis, characterized by a polar angle ($\theta$) of zero. Such light is substantially transmitted by the body 412 if the light has a linear polarization component parallel to the pass axis 413, and is substantially blocked (reflected in the case of a reflective polarizer, absorbed in the case of an absorbing polarizer) if the light has a linear polarization component parallel to the block axis 414.

For lack of an alternative term, "plane of incidence" is used herein to refer to the reference plane containing the surface normal direction and the light propagation direction, both in cases where the light is incident on the film, and in cases where light is not incident on the film but instead is emerging from the film. Likewise, "incidence angle" is used to refer to the angle between the surface normal direction (z-axis) and the light propagation direction, both for light incident on the film and for light emerging from the film, this angle also corresponding to the polar angle $\theta$.

Two reference planes of incidence, 416 and 418, are included in the figure: reference plane 416 contains the block axis 414 and the z-axis; and reference plane 418 contains the pass axis 413 and the z-axis. Two obliquely incident light rays 415, 417 are shown in the figure. Ray 415 lies in plane 416, and ray 417 lies in plane 418. The rays 415, 417 are obliquely incident because their directions of propagation form respective non-zero polar angles θ with respect to the z-axis. For each ray 415, 417, the polarization state of the light ray can be resolved into two orthogonal components, represented in the figure as a pair of orthogonal double-headed arrows: a component whose polarization state is in the plane of incidence, referred to as "p-polarized", and a component whose polarization state is perpendicular to the plane of incidence, referred to as "s-polarized". Inspection of the figure reveals that the polarization direction of p-polarized light for oblique ray 415 is not the same as (and is not parallel to) the polarization direction of p-polarized light for oblique ray 417. Similarly, the polarization direction of s-polarized light for oblique ray 415 is not the same as (and is not parallel to) the polarization direction of s-polarized light for oblique ray 417. Also apparent is that the p-polarized ("p-pol") component of ray 415 is perpendicular to the pass axis 413 and partially aligned with the block axis 414, while the s-polarized ("s-pol") component of ray 415 is parallel to the pass axis 413. The p-pol component of ray 417 is perpendicular to the block axis 414 and partially aligned with the pass axis 413, while the s-pol component of ray 417 is parallel to the block axis 414. From this, one can see that depending on the direction of incidence, p-polarized light can be perpendicular to the pass axis in some cases and perpendicular to the block axis in others, and s-polarized light can be parallel to the pass axis in some cases and parallel to the block axis in others.

The two oblique light rays 415, 417 are special cases of the more general case of an arbitrary obliquely incident light ray, which arbitrary oblique ray may have a plane of incidence that is parallel to neither plane 416 nor plane 418., i.e., parallel to neither the x-axis nor the y-axis. To fully characterize such an arbitrary oblique ray, we employ an additional angle ϕ, referred to as an azimuthal angle. The azimuthal angle ϕ is the angle, measured in the x-y plane, between the x-axis (i.e., the block axis) and the projection of such ray in the x-y plane, or between the x-axis (block axis) and the plane of incidence of such ray. A value of ϕ=0 degrees corresponds to the plane 416, and a value of ϕ=90 degrees corresponds to the plane 418.

Figure 5:
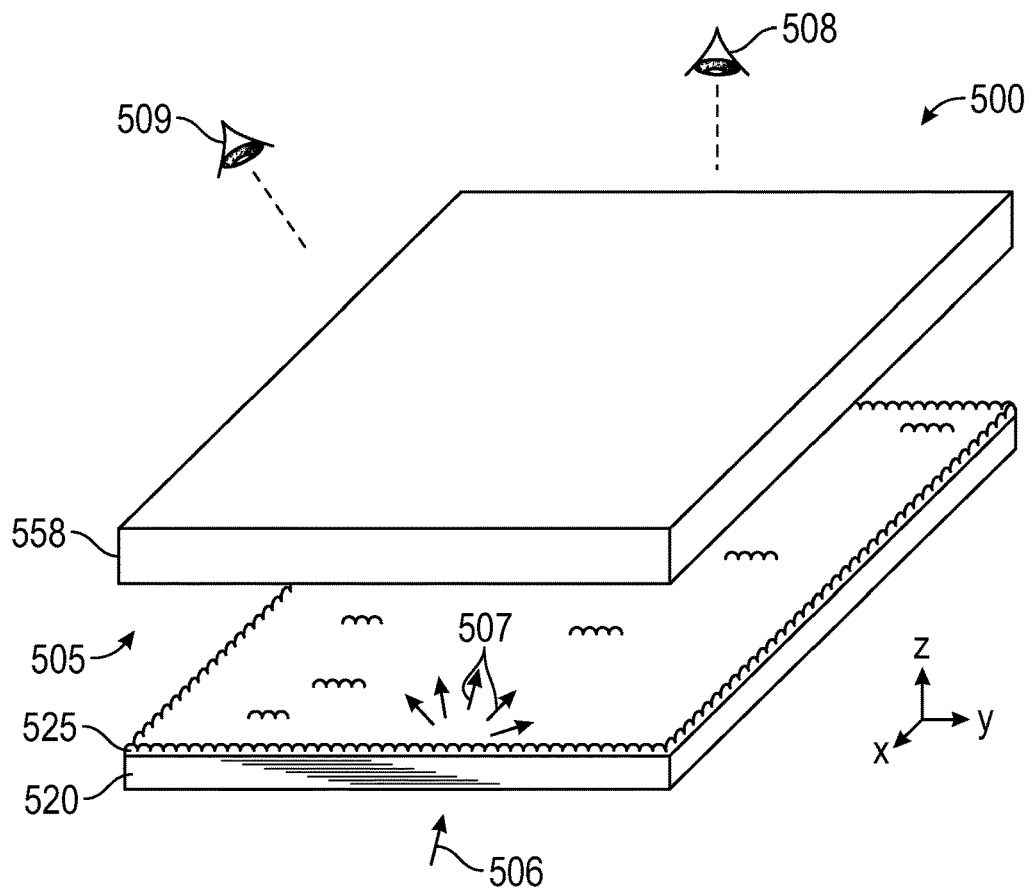
FIG. 5 is a schematic perspective view of a multilayer optical film reflective polarizer disposed behind and spaced apart from an absorbing polarizer, the reflective polarizer provided with a light diffusing layer to reduce the amount of observed color.

Turning now to FIG. 5, we see there schematically illustrated selected elements of an LC display system 500. The selected elements shown are a back absorbing polarizer 558 (which may be the same as or similar to the back absorbing polarizer 158 in FIG. 1), a multilayer optical film reflective polarizer 520 (which may be the same as or similar to the reflective polarizer 142 of FIG. 1, or the reflective polarizer 220 of FIG. 2), and a light diffusing layer 525 disposed on the front major surface of the reflective polarizer 520. Other components that would be included in the LC display system, such as an LC panel, a front absorbing polarizer, and a backlight, are omitted from the figure for simplicity. The optical films lie generally in, or parallel to, the x-y plane. A first user or viewer 508 is located in front of the system 500 and views the display at normal incidence, along a system optical axis parallel to the z-axis. A second user or viewer 509 is also located in front of the system 500, but views the display at an oblique angle.

The back absorbing polarizer 558 is assumed to be any of the absorbing polarizers known in the art for their suitability in LC displays. The polarizer 558 has a pass axis and a block axis (not shown in FIG. 5), the polarizer being oriented such that the pass axis is parallel to the y-axis, and the block axis is parallel to the x-axis. In contemporary LC displays, the back absorbing polarizer 558 is usually a high contrast polarizer, greater than 1000 contrast ratio. In this regard, the contrast of a polarizer for purposes of this document refers to a ratio of the polarizer's transmission for pass-state polarized light to the polarizer's transmission for block-state polarized light, and, unless otherwise specified, for light that is normally incident on the polarizer, and whose wavelength is in the visible spectrum or within any other useful wavelength range for the polarizer. An absorbing polarizer is said to have a high contrast if the contrast is at least 1000, or at least 10,000 in some cases. Currently available absorbing polarizers may have a contrast in a range from 1000 to 100,000, or from 2,000 to 10,000, for example.

The reflective polarizer 520 is assumed to be a TOP (tentered-one-packet) reflective polarizer as described above. FIG. 5 depicts the polarizer 520 in a stand-alone configuration, in keeping with the popular belief that TOP reflective polarizers are not suitable for an on-glass configuration due to excessive off-axis color of the polarizer. Thus, the reflective polarizer 520 is separated from the absorbing polarizer 558 by an air gap 505. Furthermore, the reflective polarizer 520 is provided with a light diffusing layer 525 on one major surface thereof, the diffusing layer 525 being disposed between the reflective polarizer 520 and the absorbing polarizer 558. The light diffusing layer 525 scatters light into a cone or distribution of angles as shown by incident light ray 506 and scattered light rays 507. The scattering effectively mixes light rays that propagate through the reflective polarizer 520 in different directions to reduce or eliminate color associated with the reflective polarizer 520. The diffusing layer 525 is assumed to have a relatively high haze, e.g. at least 40%, as measured using a Haze Guard Plus haze meter. The diffusing layer 525 may be of any known type or design, for example, it may comprise glass or ceramic beads or other particles immersed in a matrix of a different refractive index, or it may comprise a textured, faceted, or otherwise non-smooth major surface at a polymer/air or polymer/polymer interface.

As already mentioned, we have found through investigation and testing that, contrary to prevailing opinion, a properly designed and oriented TOP reflective polarizer can provide acceptable optical performance in an on-glass configuration, i.e., when laminated to a high contrast back absorbing polarizer, and with no diffusing layer or structure therebetween. (In some cases, however, a diffusing layer or structure may be included that has a relatively low haze, e.g., less than 30%, or less than 20%, or less than 10% haze). Two examples of an on-glass configuration are shown in FIGS. 6 and 7.

Figure 6:
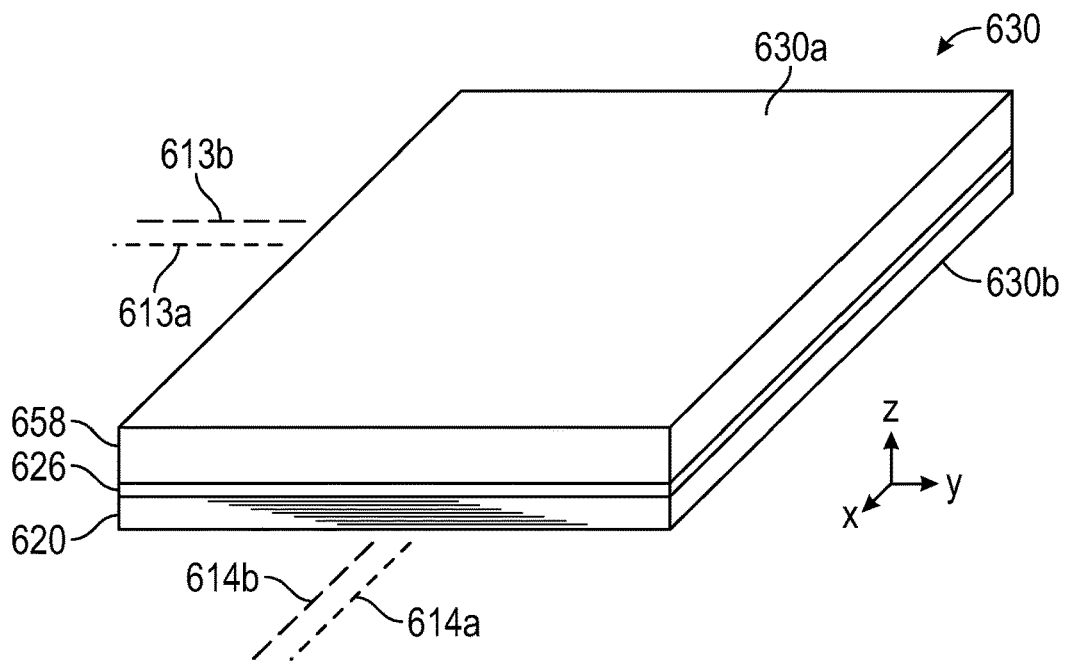
FIG. 6 is a schematic perspective view of a laminate of a multilayer optical film reflective polarizer and an absorbing polarizer, with no light diffusing layer.
Figure 7:
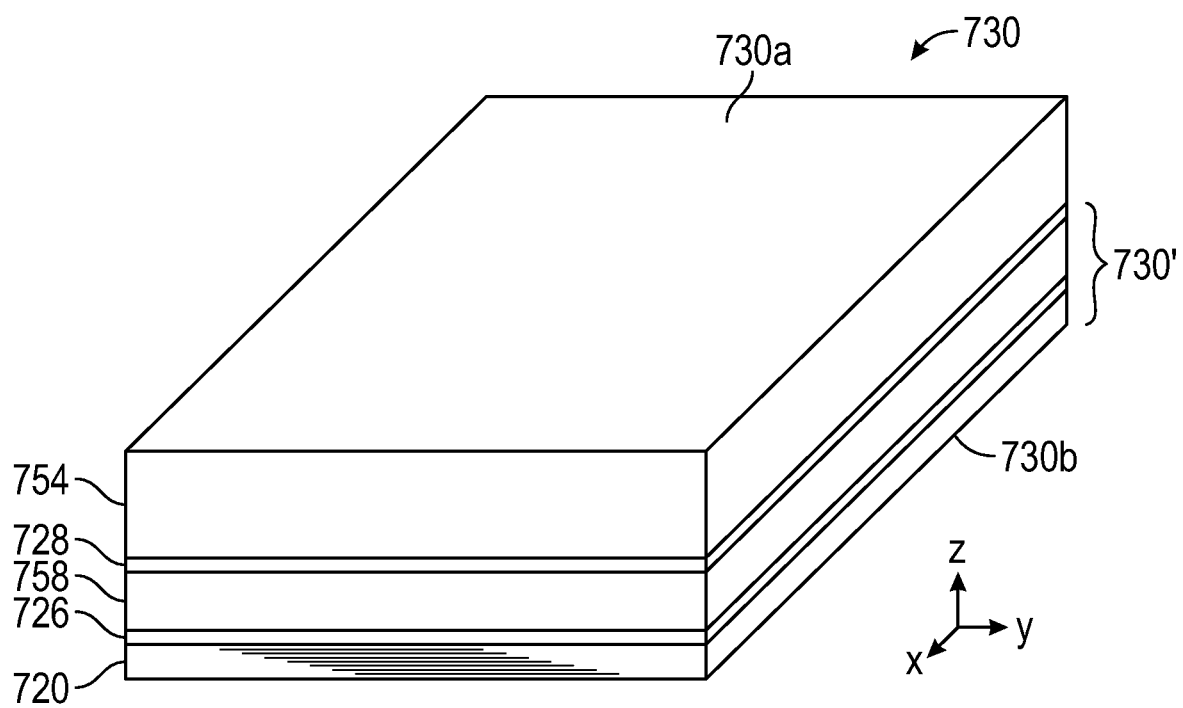
FIG. 7 is a schematic perspective view of a laminate similar to that of FIG. 6 but further including a glass layer from a liquid crystal panel, the absorbing polarizer being disposed between the reflective polarizer and the glass layer.

In the schematic view of FIG. 6, a laminate 630 or optical body is shown, wherein a multilayer optical film reflective polarizer 620 attaches to a back absorbing polarizer 658 by a transparent adhesive layer 626. The reflective polarizer 620, the back absorbing polarizer 658, and the adhesive layer 626 are all coextensive with each other, and there is no air gap between the reflective polarizer 620 and the absorbing polarizer 658. A viewer side of the laminate 630 is in the positive z direction, thus, the back absorbing polarizer 658 may be considered to be in front of the reflective polarizer 620. The reflective polarizer 620 may be the same as or similar to the reflective polarizer 520 described above. In fact, in the description that follows we assume the reflective polarizer 620 is a TOP reflective polarizer. The TOP reflective polarizer 620 may be a central portion of a reflective polarizer web, see e.g. film sample 321c in FIG. 3, or it may be an edge portion, see e.g. film samples 321a, 321b.

The TOP reflective polarizer 620 has a pass axis 613a, generally parallel to the y-axis, and a block axis 614a, generally parallel to the x-axis. The number of ORUs in the single microlayer packet, and the thickness profile of those ORUs, provides the reflective polarizer 620 with a high transmission for normally incident visible light polarized parallel to the pass axis 613a, and a low transmission (and high reflection, since transmission+reflection is about equal to 100% for these low-absorption multilayer optical films) for normally incident visible light polarized parallel to the block axis 614a. For example, the transmission of normally incident visible light polarized parallel to the pass axis 613a may be at least 60%, or at least 70%, or at least 80% when averaged over the visible wavelength range, and the transmission of normally incident visible light polarized parallel to the block axis 614a may be less than 30%, or less than 20%, or less than 10%, when averaged over the visible wavelength range. Optical performance of the TOP reflective polarizer 620 for oblique p-polarized light, incident in a reference plane that contains the z-axis and the pass axis 613a, is influenced by the unavoidable layer-to-layer refractive index mismatches resulting from the biaxially birefringent nature of the birefringent microlayers in the film. For such oblique light at a 60 degree polar angle of incidence, the transmission of the reflective polarizer 620 (by itself, in isolation from any absorbing polarizer) has a value in a range from 70% to 90%, or from 70% to 85%, for at least some wavelengths from 450 to 700 nm; in some cases, the transmission for such oblique light may be less than 90% throughout a wavelength range from 400 to 500 nm.

The TOP reflective polarizer 620 may have an overall thickness of less than 50 microns, or less than 40 microns, or it may be in a range from 20 to 50 microns, or in a range from 20 to 40 microns, or in a range from 25 to 40 microns. The layer thickness profile of the ORUs in the microlayer packet of the polarizer 620 may be tailored so that the color shift of transmitted white light from normal incidence to any viewing angle up to and including a polar angle $\theta$ of 80 degrees is not objectionable, as described further below. In particular, if we quantify the color shift of such light by the change ($\Delta$) from a first CIE chromaticity (a*, b*) coordinate at normal incidence to a second CIE chromaticity (a*, b*) coordinate at any angle up to $\theta$=80 degrees, then sqrt(($\Delta$a*)^2+($\Delta$b*)^2) is desirably less than 3.5, more desirably less than 2.5, and most desirably less than 2.0.

The back absorbing polarizer 658, which has a pass axis 613b and a block axis 614b, may be the same as or similar to the back absorbing polarizer 558 described above. In fact, we assume the absorbing polarizer 658 is a high contrast absorbing polarizer. The absorbing polarizer 658 is oriented relative to the reflective polarizer 620 such that the pass axes 613a, 613b are substantially aligned, and the block axes 614a, 614b are also substantially aligned. For example, two such substantially aligned axes may be characterized by an angular deviation of less than 1 degree, or less than 0.1 degrees.

The transparent adhesive layer 626 may be any suitable optical adhesive, for example, any of the Optically Clear Adhesive products available from 3M Company, St. Paul, Minn. The refractive index of the adhesive layer 626 is desirably reasonably close to the refractive index of the exterior surface of the absorbing polarizer 658 and the refractive index of the exterior surface of the reflective polarizer 620, to avoid Fresnel reflection at the polymer/adhesive interfaces of those films. The adhesive layer 626 preferably provides a permanent bond between the absorbing polarizer 658 and the reflective polarizer 620.

The laminate 630 may consist (only) of, or it may consist essentially of, the reflective polarizer 620, the absorbing polarizer 658, and the adhesive layer 626. In some embodiments, the laminate 630, and each of these three components, does not incorporate any significant identifiable light diffusing layer or structure, such as beads or other particles of different refractive index, or a textured or other non-smooth major surface. The laminate 630 may thus be devoid of any such light diffusing layer or structure. In cases where the laminate 630 does include such a diffusing layer or structure, that layer may be between the reflective polarizer 620 and the absorbing polarizer 658, or on the side of the reflective polarizer 620 opposite the absorbing polarizer 658, or within the reflective polarizer 620, or within the absorbing polarizer 658. The foregoing statements are made with the recognition that even ideal, flat optical films and layers with exceptional optical clarity may exhibit a minute but measureable amount of optical scattering or diffusion. Thus, for clarity, we may establish a minimal threshold below which the layer or structure at issue may be considered, from a practical standpoint and for the purposes of the present document, to have no light diffusion. We set this minimal light diffusion threshold at a haze value of 5%, or 4%, or 3%, or 2%, or 1%, as measured using a Haze Guard Plus haze meter from BYK-Gardiner, Silver Springs, Md., according to a suitable procedure such as that described in ASTM D1003.

Optical films are often sold and/or shipped with a temporary polymeric release liner on both sides to protect the major surfaces of the film from scratches or other damage. Such release liners can be easily removed from the product by peeling. The release liners can incorporate dyes, pigments, or other agents, including light diffusing agents, so they can be easily seen or detected by the user. Such temporary release liners may be applied to the outer surfaces of the laminate 630 as well. However, such release liners are distinguishable from, and need not be considered part of, the laminate 630. Thus, to the extent such release liners are present on the laminate 630 (or on other laminates disclosed herein, including laminate 730 below) and have a substantial light diffusion property, it can still be correct to state that the laminate does not incorporate any significant light diffusing layer or structure.

The reader should be cautioned, however, that in some cases it can be desirable to include one or more moderate diffusing layers or structures between the reflective polarizer 620 and the absorbing polarizer 658, such moderate diffusing layers or structures having an amount of haze that is significant, i.e., greater than the above-mentioned minimal light diffusion threshold, yet smaller than high haze diffusers typically found in stand-alone configurations such as that of FIG. 5. A diffusing layer or structure may for example be included between the TOP reflective polarizer 620 and the high contrast absorbing polarizer 658 that has a relatively low haze, e.g., less than 30%, or less than 20%, or less than 10% haze.

The microlayers and ORUs in the microlayer packet of the disclosed TOP reflective polarizers have physical thicknesses, optical thicknesses, or both that are carefully tailored, and properly oriented, to provide a thickness profile that gives the reflective polarizer not only low transmission (high reflectivity) for the block state polarization and high transmission (low reflectivity) for the pass state polarization, over the visible wavelength range of interest, and for both normal incidence and highly oblique incidence, but also low transmitted color for the highly oblique light, particularly at intermediate azimuthal angles $\phi$, e.g. where $\phi$ is in a range from 15 to 45 degrees. Undesired color at high oblique angles in the pass state of the polarizer (which is closely associated with the white state of the display in which the TOP reflective polarizer is located) is reduced by positioning thicker ORUs in the microlayer packet closer than thinner ORUs to the high contrast absorbing polarizer, and by satisfying a condition described further below that involves an intrinsic-bandwidth based boxcar average of the physical thickness profile (IB-smoothed thickness profile), and the presence of an ORU(450), an ORU(600), and an ORU(645), and ensuring that the IB-smoothed thickness profile has a first average slope over a range from ORU(450) to ORU (600), and a second average slope over a range from ORU(600) to ORU(645), and the ratio of the second average slope to the first average slope is no more than 1.8. By satisfying this condition, the TOP reflective polarizer, and the laminate of which it is a part, can impart an amount of color—to white light passing through it at highly oblique angles—that is so small that, for a display incorporating such a polarizer or laminate, the perceived color of the white state of such display at such highly oblique angles is acceptably close to a neutral white or target white color.

Another laminate 730 or optical body is shown in FIG. 7. The laminate 730 may be the same as or similar to the laminate 630 as described above, except that two additional layers have been added. Thus, the laminate 730 includes a high contrast back absorbing polarizer 758, a TOP reflective polarizer 720, and an adhesive layer 726 that bonds the absorbing polarizer 758 to the reflective polarizer 720. These elements may be the same as or similar to corresponding elements of the laminate 630, and they form an optical body or structure 730' which may thus be the same as or similar to the laminate 630, except that the front of structure 730' is attached to additional layers. In particular, the front major surface of the high contrast back absorbing polarizer 758 is bonded to a glass layer 754 through an adhesive layer 728. The adhesive layer 728 may be the same as or similar to the adhesive layer 726. The glass layer may be the back or rear panel plate of a liquid crystal panel, such as the panel plate 154b of the LC panel 150, described above.

The laminate 730 may consist (only) of, or it may consist essentially of, the elements 720, 726, 758, 728, and 754 as described above. Similar to the laminate 630, the laminate 730 and each of its components preferably does not incorporate any significant identifiable light diffusing layer or structure, such as beads or other particles of different refractive index, or a textured or other non-smooth major surface. The laminate 730 may thus be devoid of any such light diffusing layer or structure. In cases where the laminate 730 does include such a diffusing layer or structure, that layer may be between the reflective polarizer 720 and the absorbing polarizer 758, or on the side of the reflective polarizer 720 opposite the absorbing polarizer 758, or within the reflective polarizer 720, or within the absorbing polarizer 758. As discussed above, even ideal, flat optical films and layers with exceptional optical clarity may exhibit measurable optical scattering, and we may establish a minimal threshold below which the layer or structure at issue may be considered to have no light diffusion for purposes of the present document. Suitable threshold values are given above. Furthermore, in some cases it can be desirable to include one or more diffusing layers or structures between the reflective polarizer 720 and the absorbing polarizer 758 that have a small but significant amount of haze, e.g., less than 30%, or less than 20%, or less than 10% haze.

The layer thickness profile used in the disclosed TOP reflective polarizers, such as those of the FIGS. 6 and 7 laminates, warrants some additional discussion. As already mentioned, the microlayers in the microlayer packet are organized into optical repeat units (ORUs), and the optical thicknesses of the ORUs (and microlayers) are tailored to provide, for light throughout the visible spectrum, a high broadband reflectivity for light of the block polarization, and a high broadband transmission (low reflectivity) for light of the pass polarization, both at normal incidence and over a desired range of oblique incidence angles and directions. This is accomplished by tailoring the thickness profile of the ORUs along the thickness direction (z-axis) of the film to be a monotonic, or near-monotonic, function, with thinner ORUs located generally at one side of the packet (referred to here as the thin side), and thicker ORUs located generally at the opposite side of the packet (referred to here as the thick side).

In order to reduce the undesirable perceived off-axis transmitted color of the disclosed films, it is helpful to (a) orient the reflective polarizer such that the thick side of the microlayer packet faces the absorbing polarizer (and thus also the observer and the LC panel), and the thin side of the microlayer packet faces away from the absorbing polarizer (and thus towards the backlight of a display system), and (b) tailor the ORU thickness profile to be smoothly varying in such a way that an IB-smoothed thickness profile of the microlayer packet has a first average slope over a range from an ORU(450) to an ORU(600), and a second average slope over a range from the ORU(600) to an ORU(645), and ensuring that the ratio of the second average slope to the first average slope is no more than 1.8. By satisfying this condition, the TOP reflective polarizer, and the laminate of which it is a part, can impart an amount of color—to white light passing through it at highly oblique angles—that is so small that, for a display incorporating such a polarizer or laminate, the perceived color of the white state of such display at such highly oblique angles is acceptably close to a neutral white or target white color.

The discussion above relating to the ORU thickness profile and its characteristics that we have found can be tailored to keep the color effects of the TOP reflective polarizer, and of a laminate incorporating same, to acceptably low levels will now be explained in further detail and with the aid of numerous embodiments as well as some examples. We begin the more detailed discussion with reference to FIGS. 8A and 8B, which relate to a simplified ORU physical thickness profile. The simplified thickness profile allows us to more easily describe concepts such as smoothing of the thickness profile using boxcar averaging, and resonant wavelengths for the boxcar-averaged (smoothed) thickness profile at a given optical geometry, for each ORU. After this, numerous TOP reflective polarizer embodiments, and their modeled color-related performance at highly oblique angles, are discussed and compared in connection with FIGS. 9 through 30C. Finally, an example TOP reflective polarizer is discussed in connection with FIGS. 31 through 32C, and two comparative example TOP reflective polarizers are discussed in connection with FIGS. 33 through 36C. Unless otherwise indicated, all of the embodiments include an ORU physical thickness profile having a gradient that provides a wide band reflectivity for normally incident light polarized along the block axis, and the ORUs have resonant wavelengths as a function of the physical thickness profile and optical geometry.

Figure 8A:
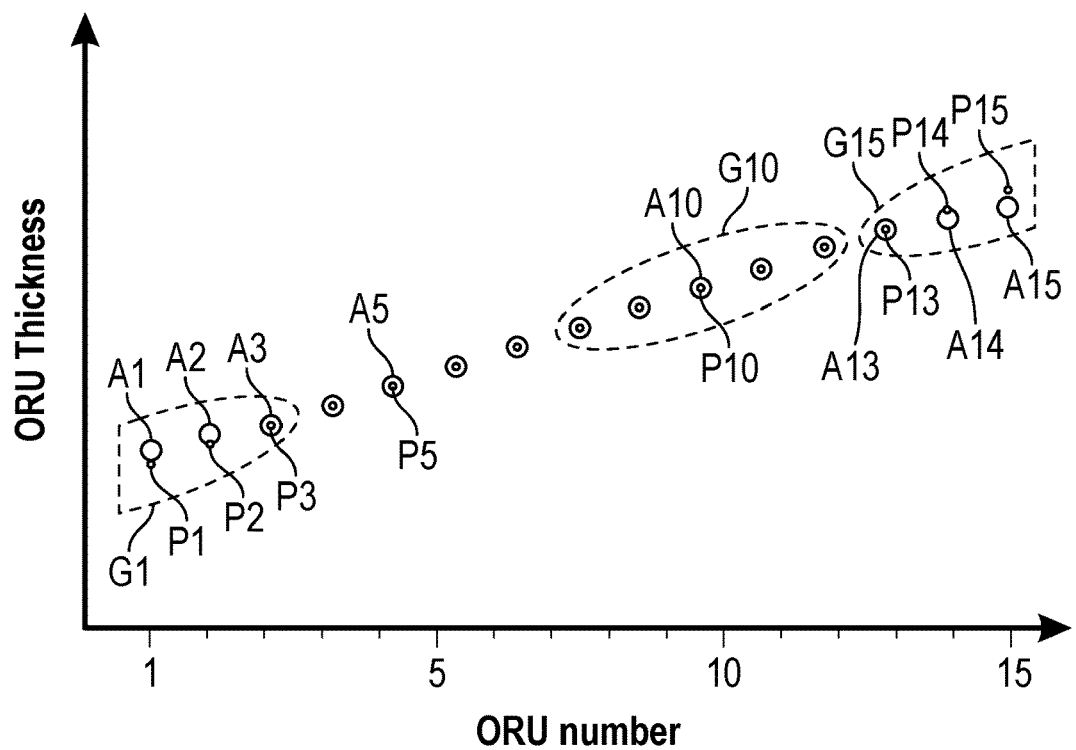
FIG. 8A is a simplified graph for illustrative purposes of a first physical thickness profile and a boxcar-smoothed thickness profile for the microlayer packet of a TOP reflective polarizer, the packet containing exactly 15 ORUs.
Figure 8B:
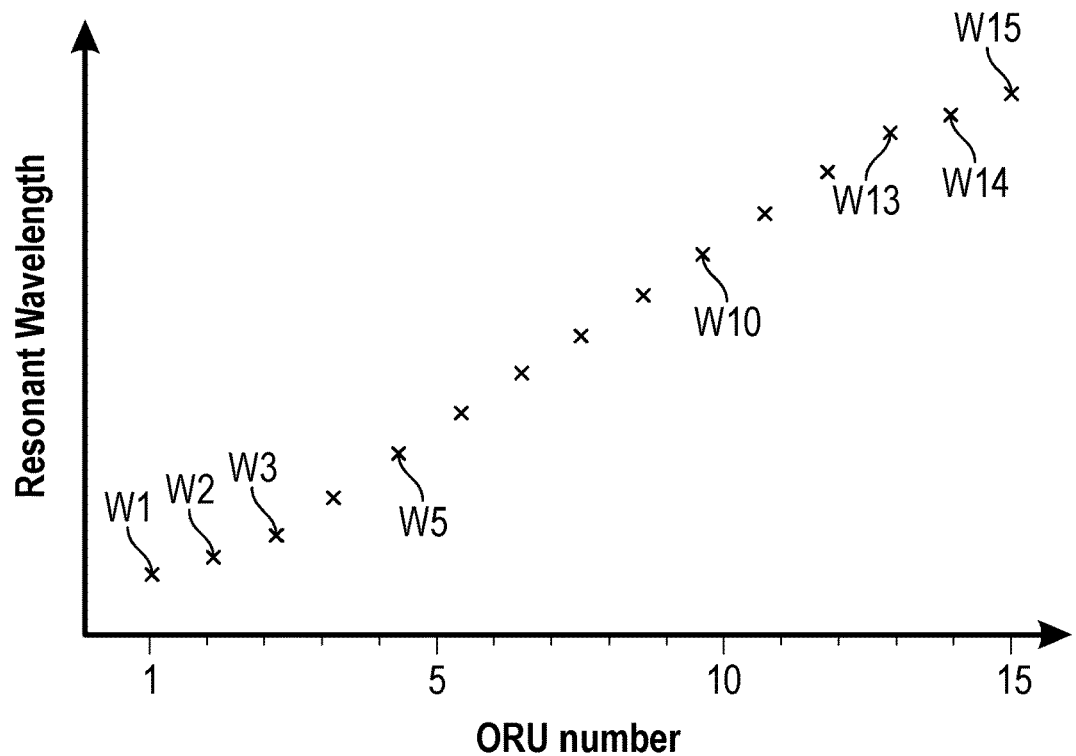
FIG. 8B is a corresponding simplified graph for the same embodiment but depicting the resonant wavelength for the boxcar-smoothed thickness profile and for a given optical geometry.

FIGS. 8A and 8B illustrate in simplified fashion the concepts of an ORU physical thickness profile, a smoothed physical thickness profile by boxcar averaging (e.g. an intrinsic-bandwidth (IB) based boxcar average), and oblique angle resonant wavelengths. In FIG. 8A, the physical thickness profile of a hypothetical TOP reflective polarizer is presented in a graph that plots ORU thickness against ORU number. For generality, the vertical axis of the graph is not provided with numerical markings, but the reader will understand that thickness increases linearly in the direction of the axis arrow. The horizontal axis is simply a count of the number of ORUs starting at a first end of the microlayer packet. (As such, the horizontal axis is also closely related to a physical position or depth within the reflective polarizing film relative to the first end of the packet.) Inspection of that axis reveals that the hypothetical polarizer has exactly 15 ORUs. Each ORU may consist of two adjacent microlayers, e.g. as shown above in FIG. 2. A point P1 represents the physical thickness of the first ORU, a point P2 represents the physical thickness of the second ORU, and so forth, and a point P15 represents the physical thickness of the fifteenth (and last) ORU in the packet of microlayers forming the illustrated TOP reflective polarizer. The collection of points P1 through P15 is the ORU physical thickness profile of the packet of microlayers of the reflective polarizer. As drawn, this thickness profile is monotonically increasing, and substantially linear as a function of ORU number. ORUs proximate the fifteenth (last) ORU have an average physical thickness greater than that of ORUs proximate the first ORU.

For any given optical geometry, each ORU produces a reflectivity spectrum characterized by (1) a peak or maximum reflectivity, and (2) a spectral breadth or width (e.g. as measured by the full-width-at-half-maximum of the reflectivity spectrum), which we refer to as the intrinsic bandwidth. The aggregate of the spectral reflectivities of all the ORUs in the microlayer packet then substantially yield the reflectivity of the TOP reflective polarizer as a whole. The peak reflectivity of a given ORU occurs at a wavelength that is referred to as a resonant wavelength (for that ORU); however, the peak reflectivity, and thus the resonant wavelength, changes as a function of optical geometry. For normally incident light, the resonant wavelength equals one-half of the optical thickness of the ORU, where optical thickness differs from physical thickness as explained in detail above. At oblique angles, the resonant wavelength is less than the resonant wavelength at normal incidence, and furthermore it is in general different for s-polarized light and p-polarized light. The intrinsic bandwidth of an ORU reflectance spectrum is also influenced to some extent by optical geometry, but also by other factors such as the refractive indices of the microlayers in the packet, and the refractive index differences between such microlayers.

The fact that each ORU in the packet has a reflectivity with a non-zero intrinsic bandwidth means that the reflectivity of the reflective polarizer as a whole at a given specific wavelength (and for a specific optical geometry) is attributable to not only the ORU whose resonant wavelength equals the specific wavelength, but also to neighboring ORUs whose resonant wavelengths are close to (in terms of the intrinsic bandwidths of the ORU reflection spectra) the specific wavelength. For example, if we assume the ORU represented by point P10 has a resonant wavelength of precisely $\lambda 10$ at a given optical geometry, and then we consider the reflectivity of the reflective polarizer (and packet) as a whole at that wavelength $\lambda 10$ (and at the given optical geometry), such latter reflectivity may be attributable not only to the ORU of point P10, but also to several of its nearest neighboring ORUs on both sides, as indicated by the group G10 in FIG. 8A. In the case of the reflectivity at a wavelength corresponding to a resonant wavelength of an ORU at or near one of the two ends of the microlayer packet, such as the ORU for point P1 or for point P15 in FIG. 8A, nearest neighbor ORUs may exist only on one side of the subject ORU, which results in one-sided or unbalanced ORU groupings, such as the group G1 and the group G15 in FIG. 8A.

The foregoing phenomenon of overlapping reflectivity bands for neighboring ORUs leads us to define a smoothed ORU thickness profile, obtained by averaging, at each of the 15 ORUs, the thickness of the subject ORU and of its neighboring ORUs, if any, on each side of the subject ORU. We refer to this technique as boxcar averaging. The actual number of neighboring ORUs to include on each side of the subject ORU will depend on the intrinsic bandwidths of the ORUs in the microlayer packet and on other factors, but for purposes of this simplified example, we include 2 ORUs (to the extent they exist) on each side of the subject ORU. The result of this intrinsic-bandwidth (IB) based boxcar averaging is illustrated in FIG. 8A by the small open-circle marks provided at each of the 15 ORUs, namely, A1, A2, A3, and so forth, through A15. To the extent the original ORU thickness profile as represented by points P1 through P15 is strictly linear, the marks A3 through A13 will also be linear, and will coincide with their respective points P3 through P13, due to the symmetrical nature of the boxcar averaging for those ORUs. However, for the ORUs at and near the ends of the packet, the IB-smoothed thickness profile deviates from the original thickness profile, as shown by the non-registration of the open circles A1, A2, A14, A15 with their respective points P1, P2, P14, P15, due to the asymmetrical nature of the boxcar averaging for those ORUs.

Following these computations, we next compute the resonant wavelength for each of the 15 ORUs based on the IB-smoothed thickness profile and on a sufficiently oblique optical geometry, which we select as being p-polarized light incident in the x-z plane (see e.g. FIG. 4 above) at a polar angle ($\theta$) of 80 degrees. This computation may employ a Berriman 4×4 matrix multilayer optical response calculation engine that utilizes as inputs the IB-smoothed thickness profile and other parameters, such as the (wavelength-dependent) refractive index values $n_x$, $n_y$, $n_z$ for each of the microlayers in the ORUs (see the discussion of FIG. 2 above), as well as the specified oblique optical geometry. With this information, the resonant wavelength at the specified oblique angle geometry can be calculated for each of the 15 ORUs. The result is plotted in a graph of resonant wavelength versus ORU number in FIG. 8B. The Berriman methodology can also be used to calculate the spectral reflectivity and spectral transmission of the TOP reflective polarizer and of such polarizer laminated to a high contrast absorbing polarizer.

For generality, the vertical axis of the graph is not provided with numerical markings, but the reader will understand that resonant wavelength increases linearly in the direction of the axis arrow. The horizontal axis is simply a count of the number of ORUs starting at the first end of the microlayer packet, just as in the graph of FIG. 8A. The x-shaped points, labeled W1, W2, W3, and so forth through W15, represent the resonant wavelengths calculated at each of the ORUs.

Having now performed the foregoing calculations, we are prepared to engage in an analysis to determine if the (hypothetical simplified) TOP reflective polarizer satisfies conditions that will promote low perceived color in the transmission of the reflective polarizer and of a laminate of the reflective polarizer with a high contrast absorbing polarizer. As part of this analysis, we determine if any of the ORUs in the microlayer packet satisfy both of the following conditions: the resonant wavelength at the specified oblique optical geometry (p-polarized light incident in the x-z plane $\theta=80$ degrees), and for the IB-smoothed thickness profile, is at least 450 nm; and all ORUs disposed on a side of the ORU that includes the first ORU have resonant wavelengths (under the same conditions) less than 450 nm. If so, we refer to this ORU as ORU(450). (Preferably, the resonant wavelength of the ORU(450) is less than 455 nm, for the IB-smoothed thickness profile at the specified oblique optical geometry.) Similarly, we determine if any of the ORUs in the microlayer packet satisfy both of the following conditions: the resonant wavelength at the specified oblique optical geometry (p-polarized light incident in the x-z plane $\theta=80$ degrees), and for the IB-smoothed thickness profile, is at least 600 nm; and all ORUs disposed on a side of the ORU that includes the first ORU have resonant wavelengths (under the same conditions) less than 600 nm. If so, we refer to this ORU as ORU(600). (Preferably, the resonant wavelength of the ORU(600) is less than 605 nm, for the IB-smoothed thickness profile at the specified oblique optical geometry.) In like fashion, we determine if any of the ORUs in the microlayer packet satisfy both of the following conditions: the resonant wavelength at the specified oblique optical geometry (p-polarized light incident in the x-z plane $\theta=80$ degrees), and for the IB-smoothed thickness profile, is at least 645 nm; and all ORUs disposed on a side of the ORU that includes the first ORU have resonant wavelengths (under the same conditions) less than 645 nm. If so, we refer to this ORU as ORU(645). (Preferably, the resonant wavelength of the ORU(645) is less than 650 nm, for the IB-smoothed thickness profile at the specified oblique optical geometry.) Note that the ORU(400), ORU(600), ORU(645) are defined at a highly oblique optical geometry, which means that their characteristics for normally incident light will be substantially different than their characteristics at the oblique geometry. For example, the ORU(645) will likely have a resonant wavelength for normally incident light that is well into the near-infrared portion of the electromagnetic spectrum.

If the TOP reflective polarizer contains all three of the ORU(400), ORU(600), and ORU(645), then we perform further analysis on the IB-smoothed thickness profile (see e.g. points A1 through A15 in FIG. 8A), and in particular, on an average slope of that profile. We compare a first average slope of the IB-smoothed thickness profile over a short wavelength range, namely, from ORU(400) to ORU(600), to a second average slope of the same profile over a longer wavelength range, namely, from ORU(600) to ORU(645). Low transmitted color for the reflective polarizer, for a laminate of the polarizer and a high contrast absorbing polarizer (provided the reflective polarizer is oriented such that an end of the microlayer packet having thicker ORUs is adjacent to or faces the absorbing polarizer), and for the white state of a display incorporating the laminate, are promoted when a ratio of the second average slope to the first average slope is no more than 1.8.

The reader is cautioned that although this analysis makes use of a resonant wavelength as calculated at a particular highly oblique optical geometry, namely, for p-polarized light incident in the x-z plane at a polar angle $\theta=80$ degrees, the low color output is by no means limited to that geometry. Stated differently, if the reflective polarizer, and the laminate of which it is a part, is tailored as set forth in the above analysis, low color transmission is achieved not only at the particular highly oblique optical geometry used in the analysis, but also at other highly oblique geometries, including at intermediate azimuthal angles $\phi$ between 0 and 90 degrees (for polar angles $\theta$ of at least 80 degrees), and for other polarization states.

Figure 9:
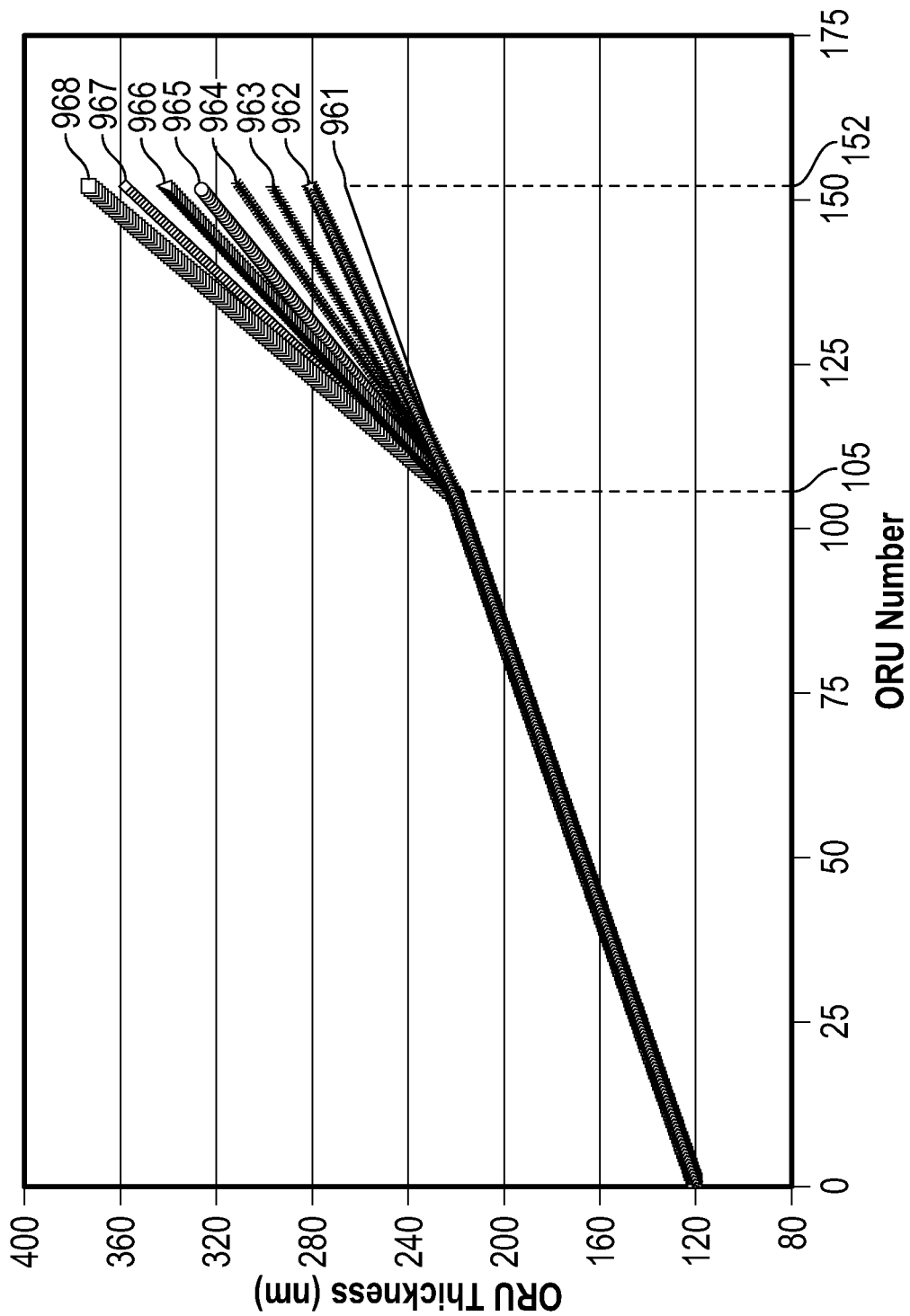
FIG. 9 is a graph of eight different but related physical thickness profiles that may be used in a TOP reflective polarizer, the performance of which was modeled and shown in FIGS. 10A through 17C.

FIG. 9 and its related FIGS. 10A through 17C demonstrate the application of these principles to a number of related (modeled) embodiments of a TOP reflective polarizer and laminates thereof with a high contrast absorbing polarizer. The transmission and reflection spectra of the reflective polarizer were computed using a Berriman 4×4 matrix multilayer optical response calculation engine. The input parameters for the calculations included a layer thickness profile of ORUs, and wavelength-dependent refractive index values for the birefringent microlayers and the isotropic microlayers that make up the microlayer packet and the ORUs.

In these embodiments, the TOP reflective polarizer has exactly 152 ORUs. Each ORU includes only two microlayers, one of which is biaxially birefringent, and the other of which is isotropic, with an f-ratio of 0.5. The birefringent microlayer is assigned a refractive index set (nx, ny, nz) that is based on measured data for a uniaxially stretched Low Melt Point PEN (LmPEN). With regard to the composition of LmPEN, the diol is 100% ethylene glycol, while the diacid is 10 mol % terephthalic acid and 90 mol % naphthalene dicarboxylic acid. The isotropic microlayer is assigned an isotropic refractive index (Niso) based on measured data for an amorphous blend of PETg GN071 (Eastman Chemicals, Knoxville, Tenn.) and LmPEN at the weight fraction of 58% and 42%, respectively. The refractive indices of these materials as used in our computational modeling are shown in Table 1:

TABLE 1

| wavelength | LmPEN | | | 58% PETg/42% LmPEN |
| | nx | ny | nz | Niso |
| --- | --- | --- | --- | --- |
| 450 nm | 1.906 | 1.665 | 1.575 | 1.653 |
| 550 nm | 1.836 | 1.622 | 1.547 | 1.611 |
| 633 nm | 1.810 | 1.607 | 1.538 | 1.595 |

Inspection of the table reveals that nx is greater than Niso, providing a large refractive index difference for electric fields along the x-axis. The value of ny is approximately equal to Niso. The value of nz is less than Niso, providing a refractive index difference for p-polarized light for non-normal incidence angles. Based on the teachings of the SCIENCE paper referenced below, the combination of birefringent and isotropic refractive indices shown in Table 1 will result in increasing interfacial reflectivity, and increasing reflection band power, for increasing incidence angle $\theta$ and for both s- and p-polarized light.

In FIG. 9, we have a graph of eight different but related ORU physical thickness profiles 961, 962, 963, 964, 965, 966, 967, and 968, any of which may be readily employed in a TOP reflective polarizer. The thickness profile 961 is linear in form, i.e. of constant slope, from the first ORU (#1), whose physical thickness is about 120 nm, to the last ORU (#152), whose physical thickness is about 265 nm. The other thickness profiles 962-968 are identical to the thickness profile 961 from ORU #1 through ORU #105, but then at ORU #105 they undergo a step-change in the slope of thickness profile from ORU #105 to ORU #152. The step change in slope is smallest for profile 962 and largest for profile 968, as shown in the figure.

Each of these ORU thickness profiles is then analyzed as described above, by calculating from the ORU thickness profile:
- an IB-smoothed thickness profile, where, for purposes of the boxcar average, the number of ORUs that we include on each side of the subject ORU is 10 (if present), to take into account the intrinsic bandwidth of the ORU reflection bands for the modeled refractive indices; and
- the resonant wavelength of the IB-smoothed thickness profile at each ORU, for the highly oblique optical geometry of p-polarized light incident in the x-z plane at a polar angle $\theta$ of 80 degrees; and then
- determining if the microlayer packet includes an ORU (450), an ORU(600), and an ORU(645) as described above; and if so, then
- calculating a first average slope of the IB-smoothed thickness profile from the ORU(450) to the ORU(600), and calculating a second average slope of the IB-smoothed thickness profile from the ORU(600) to the ORU(645); and
- calculating a ratio ("slope ratio") of the second average slope to the first average slope.

Note, if the microlayer packet does not include any one of the ORU(450), the ORU(600), or the ORU (645), the aforementioned slope ratio is undefined.

Besides this, we also use the Berriman methodology to calculate the color response of a laminate of the modeled TOP reflective polarizer with an aligned absorbing polarizer having a contrast ratio of 10,000, with no air gap or diffusing material therebetween, and with the reflective polarizer oriented with the thicker microlayers (and ORUs) closer than the thinner microlayers (and ORUs) to the absorbing polarizer, for a range of highly oblique optical geometries as defined by a range of polar angles $\theta$ from 45 to 85 degrees in 5 degree increments, and for azimuthal angles $\phi$ of 15, 25, 35, and 45 degrees. (Angles such at these are often susceptible to undesired color or color variation in the white state of standard display panels.) For each such geometry, for example, ($\theta=50$ deg, $\phi=35$ deg), the computational model launches an unpolarized input light beam towards the laminate at the specified direction, such input beam being incident from air upon the thinnest-layer-end of the microlayer packet, i.e., on the ORU #1. The spectral content of the input beam is modeled as a standard display white LED, filtered through red, green, and blue color filters, typical of an LC display. The Berriman methodology then calculates the output beam as transmitted through the laminate (both the TOP reflective polarizer and the aligned high contrast absorbing polarizer), and calculates the spectral content of the output beam. Comparing the computed output beam to the input beam yields a color response for the laminate at the particular geometry. We quantify the color response in terms of the well-known CIE (L*, a*, b*) color coordinates. The general color response performance of the laminate (and reflective polarizer) can be assessed by evaluating the computed (a*, b*) values across the modeled range of azimuth and polar angles.

Figure 10A:
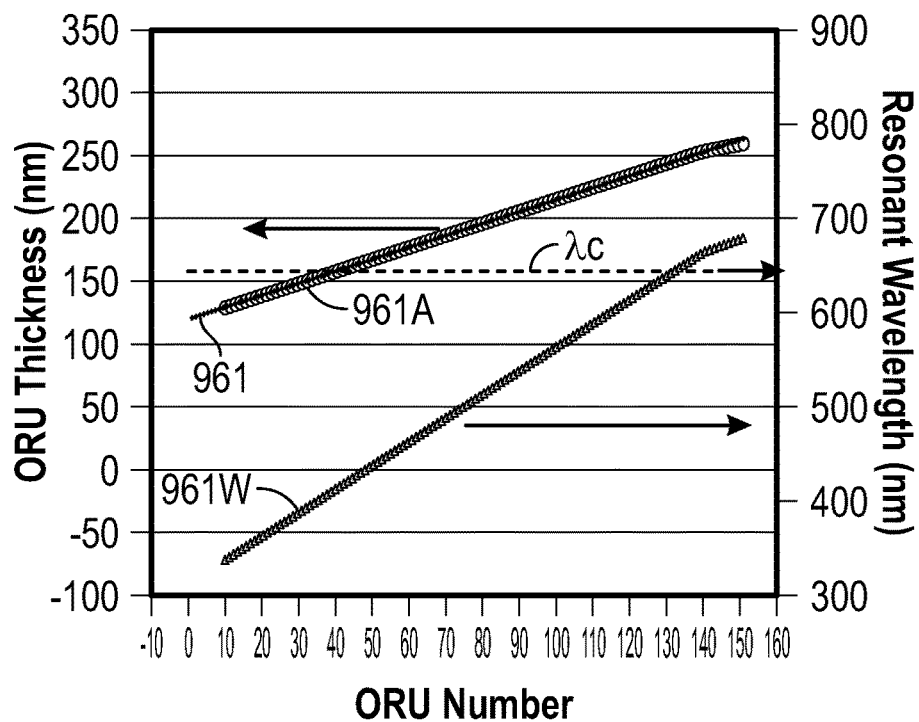
FIG. 10A is a compound graph that plots ORU thickness against ORU number, and also plots a resonant wavelength against the ORU number.

Thus, in FIG. 10A, a compound graph has a single horizontal axis that represents ORU number, a left-hand-side (LHS) vertical axis that represents ORU (physical) thickness in nanometers (nm), and a right-hand-side (RHS) vertical axis that represents resonant wavelength in nanometers (nm). The use of dual vertical axes allows us to plot both ORU thickness (using the LHS axis) and resonant wavelength (using the RHS axis) against ORU number on the same graph. The curves 961 and 961A are plotted against the LHS vertical axis, and the curve 961W is plotted against the RHS vertical axis.

The curve 961 is identical to the ORU physical thickness profile 961 of FIG. 9, having a constant slope from ORU #1 to ORU #152. (In practice, if an actual multilayer film sample is provided, the ORU physical thickness profile is typically measured using an Atomic Force Microscopy (AFM) system, designed for multilayer polymer characterizations, and some averaging or smoothing of the raw data from the AFM may be needed to obtain an accurate result.)

The curve 961A is the intrinsic-bandwidth (IB) based boxcar average of the curve 961. For any of the ORUs #11 through 142, the corresponding point on the averaged or smoothed curve 961A is derived by calculating the average thickness (from curve 961) for the group of ORUs consisting of the given ORU, and the 10 ORUs immediately adjacent to the given ORU on the left, and the 10 ORUs immediately adjacent to the given ORU on the right. The averages for these ORUs #11 through 142 are thus derived from groups of 21 ORUs. For ORUs at or near the ends of the microlayer packet, i.e., for ORUs #1 through 10 and 143 through 152, fewer than 21 ORUs are used in the group average, because, for these ORUs, fewer than 10 ORUs are available on the left or on the right of the given ORU. A 10-ORU-per-side (21-ORU group except at or near the ends) boxcar average is appropriate and representative of the reflection/transmission behavior of the microlayer thickness profile for the disclosed embodiments, based on the intrinsic bandwidth of resonant ¼ wavelength ORUs, of the variety that dominate the transmission properties of a microlayer thickness profile packet, in the critical viewer angle-range of interest. The intrinsic bandwidth of an ORU having ¼ wavelength microlayers, with refractive indices as shown above in Table 1, is approximately 10%. This implies that for any given wavelength, approximately 10 ORUs that are thicker, near-neighbors, and 10 ORUs that are thinner, near-neighbors of the central ORU, will participate in creating a reflection response at that given wavelength; hence our use of terms such as 21-ORU boxcar average reflector group.

The IB-smoothed thickness profile, evaluated at any given ORU, preferably encompasses substantially only those ORUs that coherently contribute to a reflectivity of the packet at the resonant wavelength of the given ORU. In the embodiments of primary interest in the discussion at hand, this means the IB-smoothed thickness profile encompasses 10 nearest-neighbor ORUs on each side of a given ORU. In other embodiments, however, the IB-smoothed thickness profile may encompass a different predetermined number of nearest neighbor ORUs on each side the given ORU as a result of a different intrinsic bandwidth due to, for example, substantially different refractive indices, and refractive index differences, compared to the embodiments of primary interest. In such cases, the predetermined number of ORUs (on each side of the given ORU) may be no more than 20, but at least 5.

The plotted values of the 21-ORU boxcar average are calculated beginning at ORU #11, near the thin end of the microlayer packet, and continuing to the ORU #142. Then, from ORU #143 to the last ORU #152 on the thick end of the packet, the group of ORUs in the boxcar average diminishes from 20 down to 11 as the number of ORUs available on the right diminishes. Each of these boxcar-averaged ORU values represent a group of microlayers that coherently act to create a reflection band at the wavelength that is appropriate to its optical phase thickness, which in turn, depends on the polarization state of the incident light, the refractive index of the external medium from which the incident light emanates, and the and the azimuth and polar angle of the incident light. A detailed discussion of these properties for multilayered stacks of biaxial materials, is found in the paper "Giant Birefringent Optics in Multilayer Polymer Mirrors", SCIENCE vol. 287, pp. 2451-2456 (Mar. 31, 2000).

The curve 961W in FIG. 10A plots the resonant wavelength (in nanometers) of each boxcar-averaged reflector group, at a highly oblique optical geometry characterized by θ=80 degrees, φ=0 degrees, and for p-polarized light with the x-z plane as its plane of incidence. That is, any point on the curve 961W at a given ORU is the resonant wavelength for the IB-smoothed thickness profile 961A at the given ORU, and at the specified oblique optical geometry. Also plotted is a reference line λc at a critical wavelength, the critical wavelength selected to be 645 nm for the disclosed embodiments. Inspection of the graph reveals that the curve 961W encompasses the resonant wavelengths 400 nm, 600 nm, and 645 nm. Consequently, the IB-smoothed thickness profile 961A includes an ORU(400), an ORU(600), and an ORU(645).

Figure 10B:
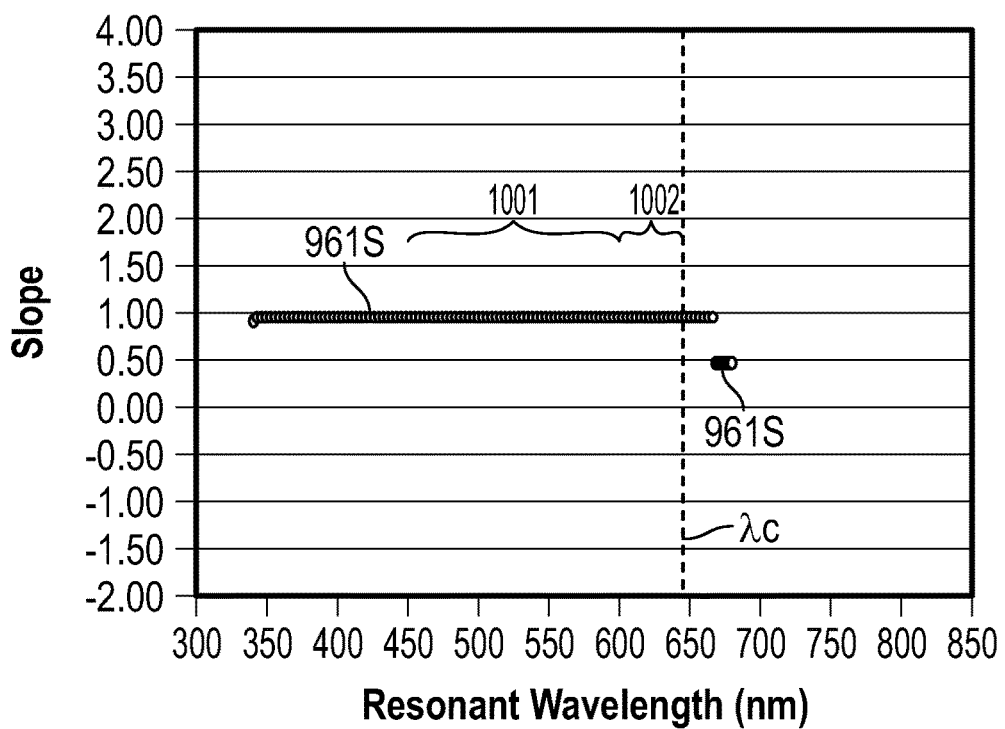
FIG. 10B is a graph of the slope of an averaged thickness profile in FIG. 10A as a function of resonant wavelength.

FIG. 10B graphs the slope of the IB-smoothed thickness profile 961A from FIG. 10A as a function of resonant wavelength as defined by the curve 961W. That is, instead of scaling the horizontal axis of FIG. 10B according to the ORU number, it is scaled according to the resonant wavelength (at the specified oblique optical geometry) of each of the ORUs. The calculated slope simply equals the rise over the run of the curve 961A in FIG. 10A. This calculated slope is shown in FIG. 10B as curve 961S, which has a discontinuity at about 665 nm due to the abrupt change in slope of the curve 961A near ORU #141. In FIG. 10B, the reference line λc appears vertically at the critical angle of 645 nm. Also included in FIG. 10B is a first region 1001, which extends from 450 nm (corresponding to ORU(450)) to 600 nm (corresponding to ORU(600)), and a second region 1002, which extends from 600 nm to 645 nm (corresponding to ORU(645)).

The slope ratio discussed above involves computing a first average of the slope, i.e. of the curve 961S, over the range of the first region 1001, and computing a second average of the slope (curve 961S) over the range of the second region 1002. In this embodiment, inspection of FIG. 10B reveals that curve 961S is substantially flat over these two regions, thus, the first and second averages are substantially identical. For this embodiment, therefore, a ratio of these averages (the slope ratio) yields a value of 1.0.

Figure 10C:
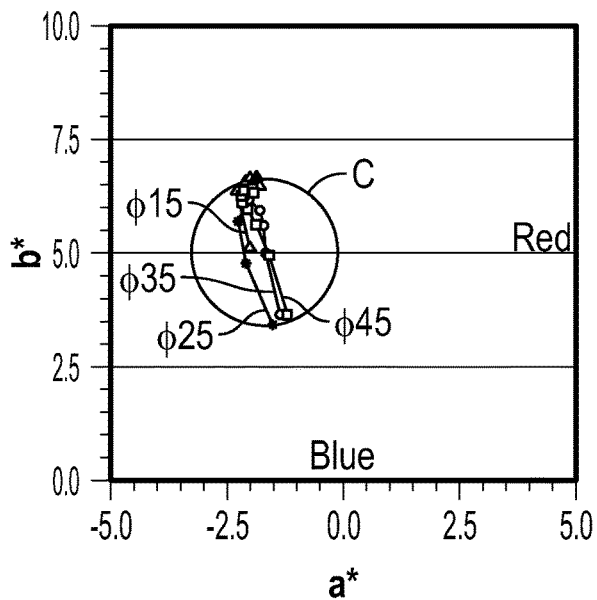
FIG. 10C is a graph of the calculated color of light transmitted through a laminate of a TOP reflective polarizer and a high contrast absorbing polarizer over a range of azimuthal ($\phi$) and polar ($\theta$) angles, the TOP reflective polarizer having the thickness profile of FIG. 10A.

FIG. 10C graphs the color response for the embodiment of FIGS. 10A and 10B, as explained in detail above, using the (dimensionless) CIE a* and b* color coordinates. In brief, Berriman methodology was used to calculate the color response of a laminate of the modeled TOP reflective polarizer with an aligned absorbing polarizer having a contrast ratio of 10,000, with no air gap or diffusing material therebetween, and with the reflective polarizer oriented with the thicker microlayers (and ORUs) closer than the thinner microlayers (and ORUs) to the absorbing polarizer. The color response was calculated for highly oblique optical geometries for polar angles θ ranging from 45 to 85 degrees in 5 degree increments, and for azimuthal angles φ of 15, 25, 35, and 45 degrees. The results are grouped in terms of azimuthal angle, with the curve φ15 showing the color response for φ=15 deg over the range of polar angles, and the curve φ25 showing the color response for φ=25 deg over the range of polar angles, and the curve φ35 showing the color response for φ=35 deg over the range of polar angles, and the curve φ45 showing the color response for φ=45 over the range of polar angles. A reference circle labeled C is provided to indicate the same scale when comparing (a*,b*) graphs presented herein. Unless otherwise noted, the circle C has a diameter of 3.0 (unit-less dimension) in all such graphs.

The same methodology as described above for the ORU physical thickness profile 961, and as shown in FIGS. 10A, 10B, and 10C, was then repeated for each of the other related ORU physical thickness profiles shown in FIG. 9.

Thus, for the profile 962: FIG. 11A is a compound graph in which curve 962 is identical to the profile 962, curve 962A is the IB-smoothed thickness profile of curve 962, the curve 962W is the resonant wavelength for the IB-smoothed thickness profile at the specified oblique optical geometry, and reference line λc marks the critical wavelength at 645 nm; FIG. 11B graphs as curve 962S the slope of the IB-smoothed thickness profile 962A as a function of resonant wavelength as defined by curve 962W, and provides a first region 1101 from 450 to 600 nm and a second region 1102 from 600 to 645 nm, and the reference line λc at 645 nm; and FIG. 11C graphs the color response in a*, b* color coordinates of the reflective polarizer-absorbing polarizer laminate, with the curves φ15, φ25, φ35, and φ45 having analogous meanings to those of FIG. 10C, and with a reference circle C.

For the profile 963: FIG. 12A is a compound graph in which curve 963 is identical to the profile 963, curve 963A is the IB-smoothed thickness profile of curve 963, the curve 963W is the resonant wavelength for the IB-smoothed thickness profile at the specified oblique optical geometry, and reference line λc marks the critical wavelength at 645 nm; FIG. 12B graphs as curve 963S the slope of the IB-smoothed thickness profile 963A as a function of resonant wavelength as defined by curve 963W, and provides a first region 1201 from 450 to 600 nm and a second region 1202 from 600 to 645 nm, and the reference line λc at 645 nm; and FIG. 12C graphs the color response in a*, b* color coordinates of the reflective polarizer-absorbing polarizer laminate, with the curves φ15, φ25, φ35, and φ45 having analogous meanings to those of FIG. 10C, and with a reference circle C.

Figure 13A:
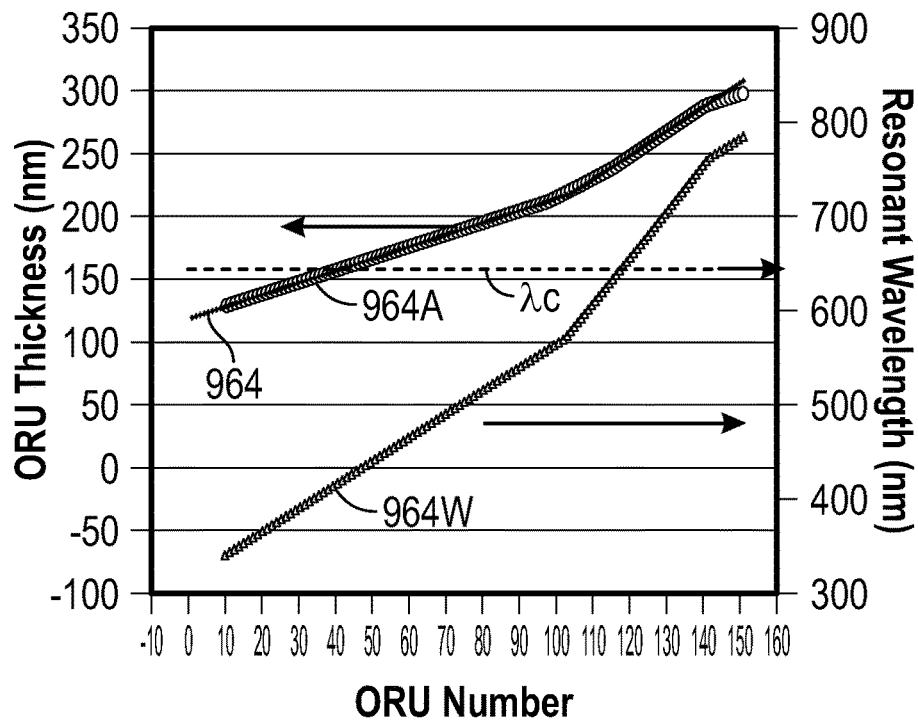
Figure 13B:
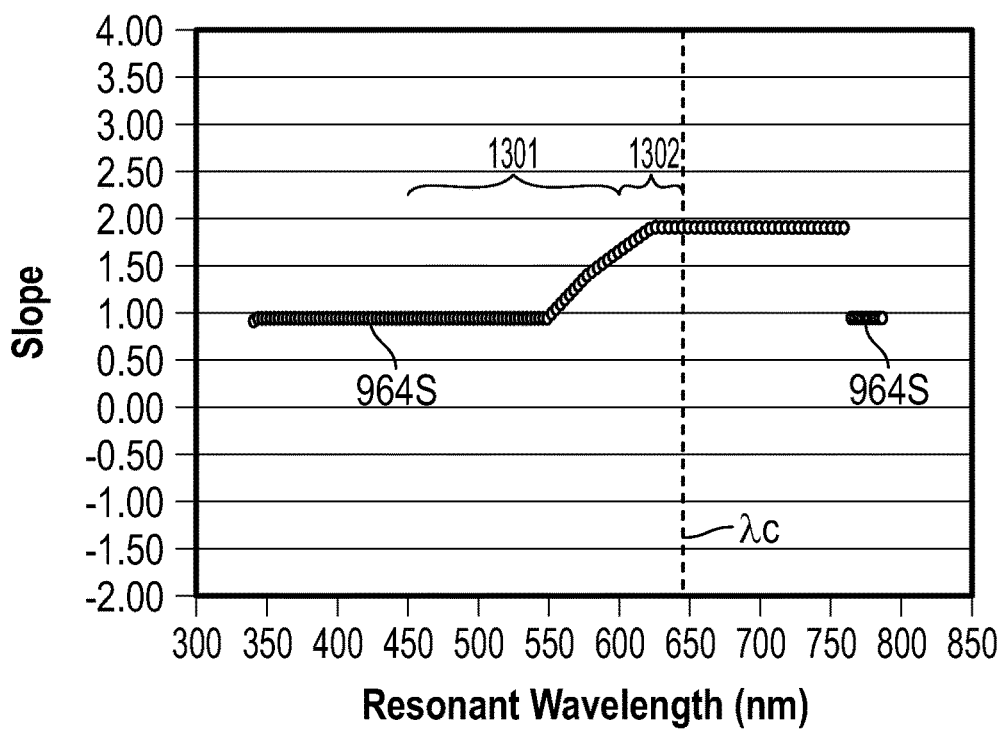

For the profile 964: FIG. 13A is a compound graph in which curve 964 is identical to the profile 964, curve 964A is the IB-smoothed thickness profile of curve 964, the curve 964W is the resonant wavelength for the IB-smoothed thickness profile at the specified oblique optical geometry, and reference line λc marks the critical wavelength at 645 nm; FIG. 13B graphs as curve 964S the slope of the IB-smoothed thickness profile 964A as a function of resonant wavelength as defined by curve 964W, and provides a first region 1301 from 450 to 600 nm and a second region 1302 from 600 to 645 nm, and the reference line λc at 645 nm; and FIG. 13C graphs the color response in a*, b* color coordinates of the reflective polarizer-absorbing polarizer laminate, with the curves φ15, φ25, φ35, and φ45 having analogous meanings to those of FIG. 10C, and with a reference circle C.

Figure 14A:
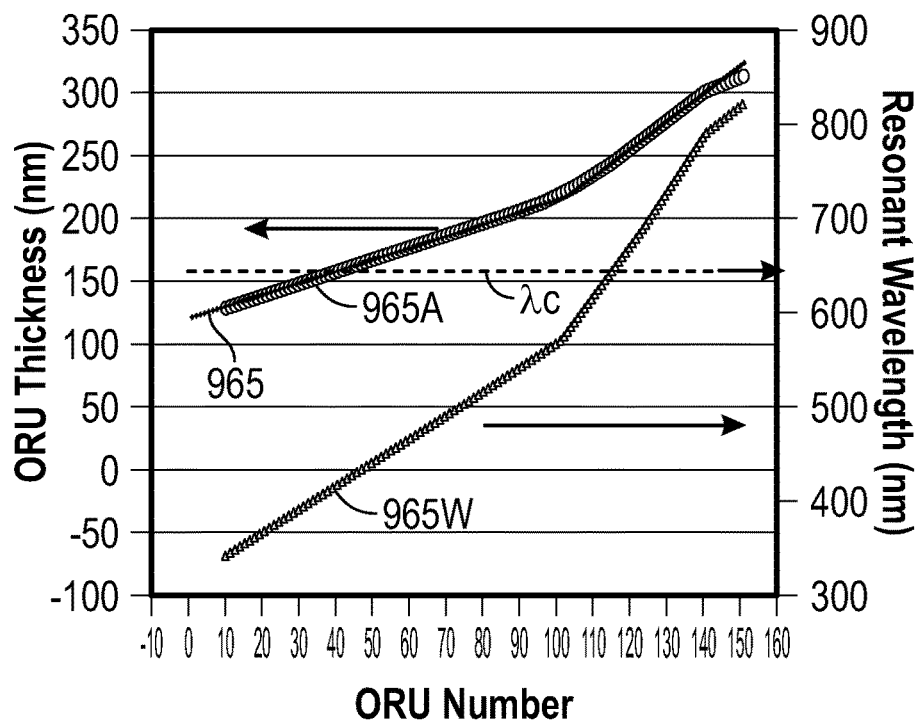
Figure 14B:
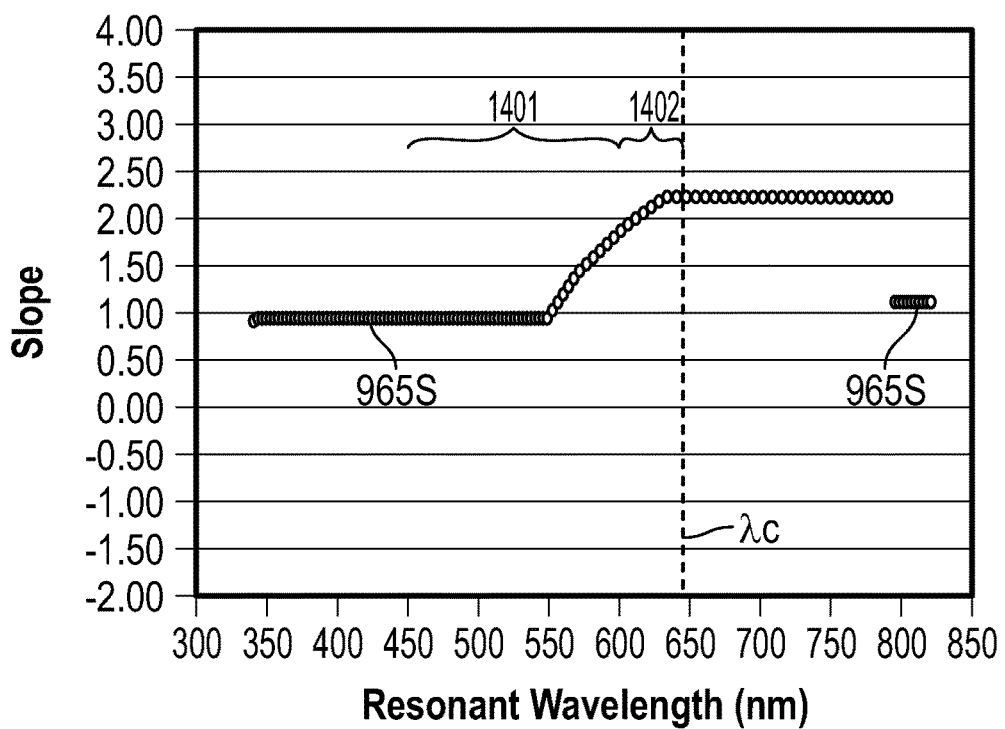
Figure 14C:
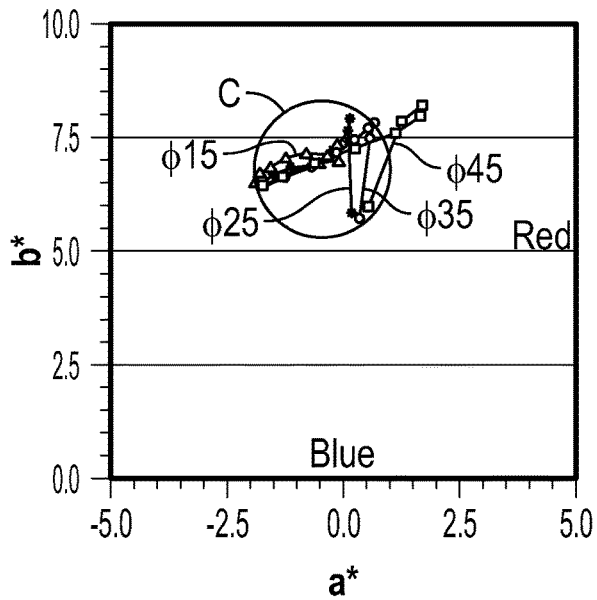
Figure 16C:
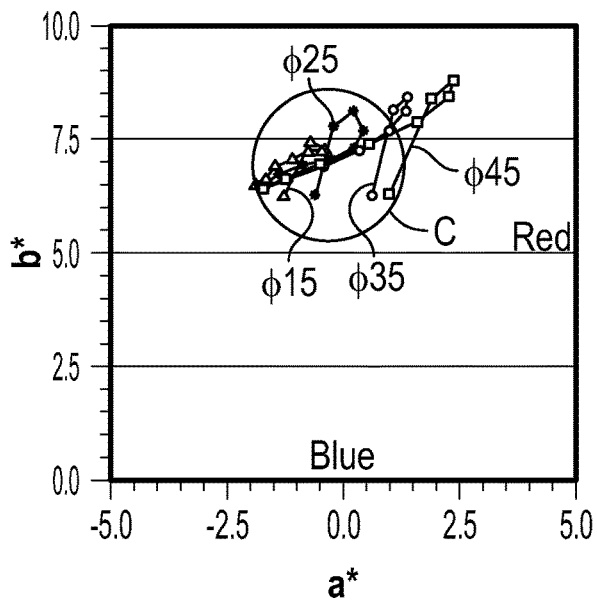
Figure 17C:
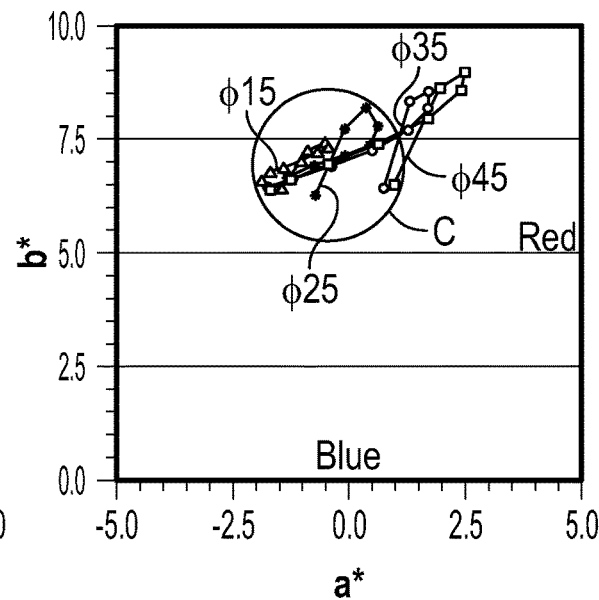

For the profile 965: FIG. 14A is a compound graph in which curve 965 is identical to the profile 965, curve 965A is the IB-smoothed thickness profile of curve 965, the curve 965W is the resonant wavelength for the IB-smoothed thickness profile at the specified oblique optical geometry, and reference line λc marks the critical wavelength at 645 nm; FIG. 14B graphs as curve 965S the slope of the IB-smoothed thickness profile 965A as a function of resonant wavelength as defined by curve 965W, and provides a first region 1401 from 450 to 600 nm and a second region 1402 from 600 to 645 nm, and the reference line λc at 645 nm; and FIG. 14C graphs the color response in a*, b* color coordinates of the reflective polarizer-absorbing polarizer laminate, with the curves φ15, φ25, φ35, and φ45 having analogous meanings to those of FIG. 10C, and with a reference circle C.

Figure 15C:
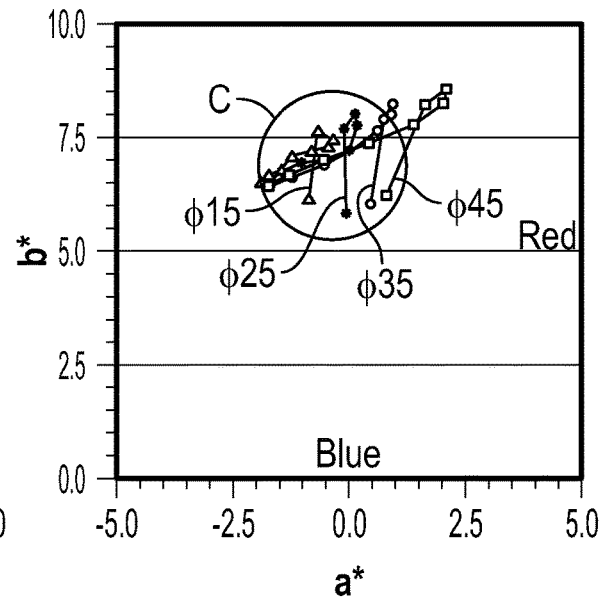
Figure 15A:
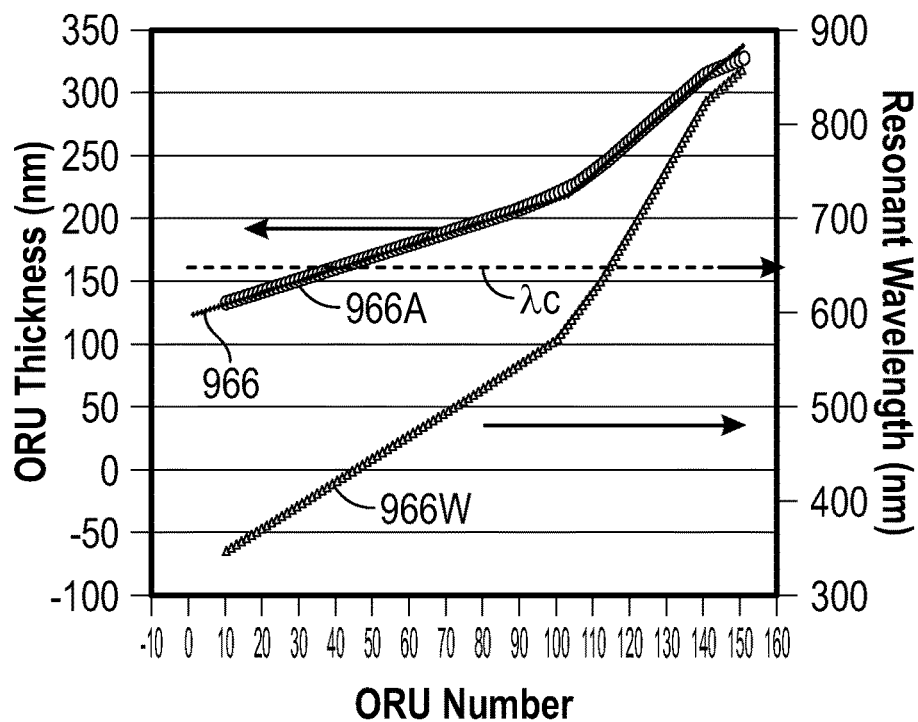
Figure 15B:
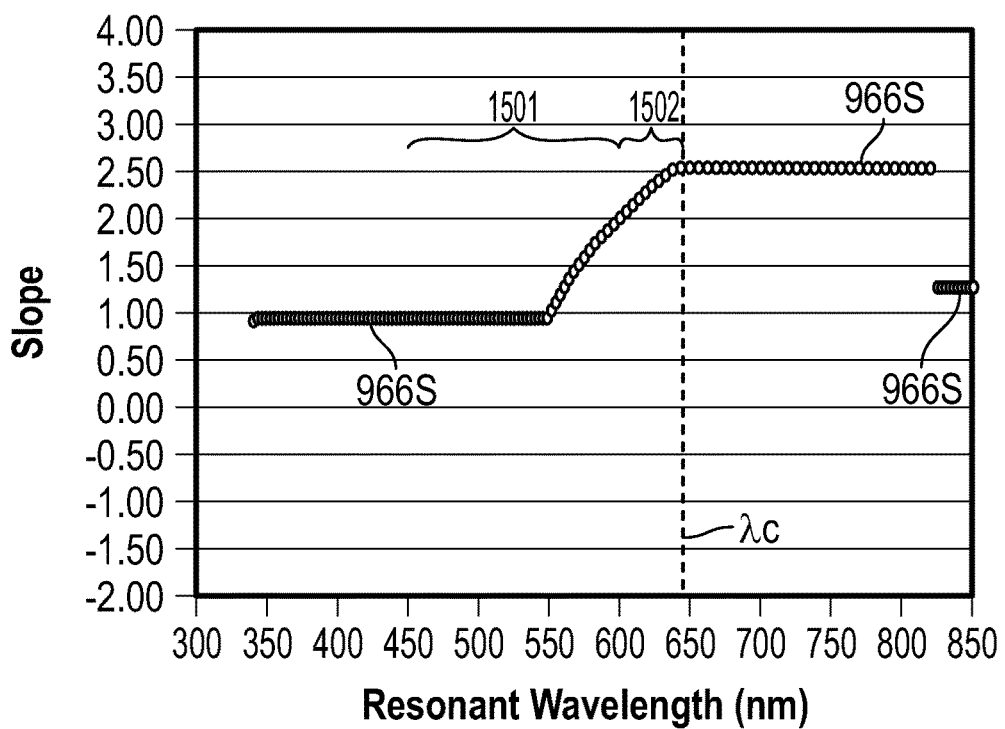

For the profile 966: FIG. 15A is a compound graph in which curve 966 is identical to the profile 966, curve 966A is the IB-smoothed thickness profile of curve 966, the curve 966W is the resonant wavelength for the IB-smoothed thickness profile at the specified oblique optical geometry, and reference line λc marks the critical wavelength at 645 nm; FIG. 15B graphs as curve 966S the slope of the IB-smoothed thickness profile 966A as a function of resonant wavelength as defined by curve 966W, and provides a first region 1501 from 450 to 600 nm and a second region 1502 from 600 to 645 nm, and the reference line λc at 645 nm; and FIG. 15C graphs the color response in a*, b* color coordinates of the reflective polarizer-absorbing polarizer laminate, with the curves φ15, φ25, φ35, and φ45 having analogous meanings to those of FIG. 10C, and with a reference circle C.

Figure 16A:
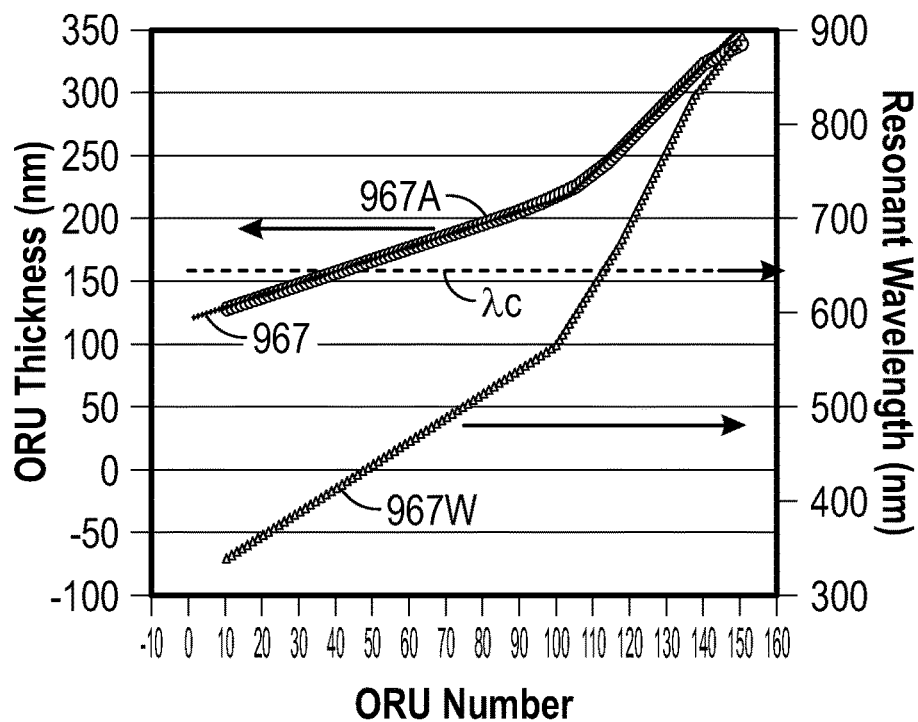
Figure 16B:
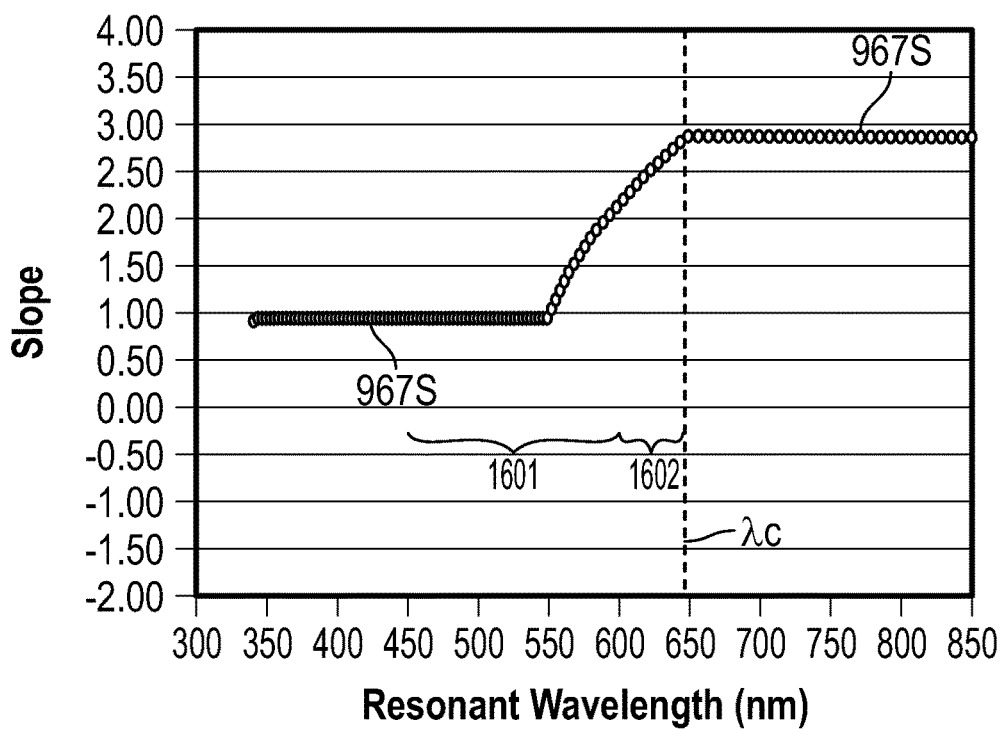

For the profile 967: FIG. 16A is a compound graph in which curve 967 is identical to the profile 967, curve 967A is the IB-smoothed thickness profile of curve 967, the curve 967W is the resonant wavelength for the IB-smoothed thickness profile at the specified oblique optical geometry, and reference line λc marks the critical wavelength at 645 nm; FIG. 16B graphs as curve 967S the slope of the IB-smoothed thickness profile 967A as a function of resonant wavelength as defined by curve 967W, and provides a first region 1601 from 450 to 600 nm and a second region 1602 from 600 to 645 nm, and the reference line λc at 645 nm; and FIG. 16C graphs the color response in a*, b* color coordinates of the reflective polarizer-absorbing polarizer laminate, with the curves φ15, φ25, φ35, and φ45 having analogous meanings to those of FIG. 10C, and with a reference circle C.

Figure 17A:
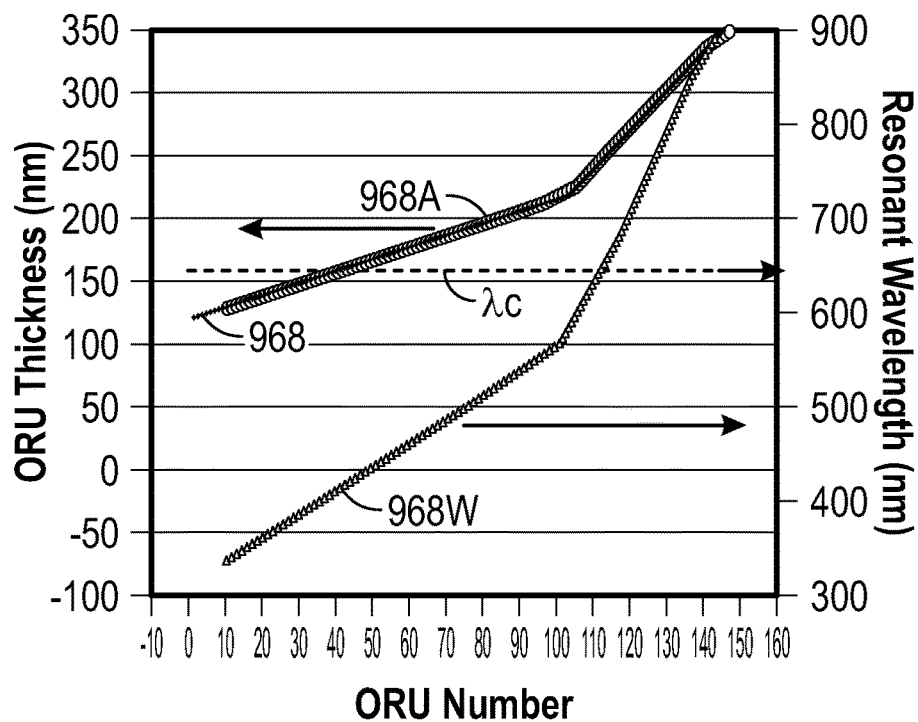
Figure 17B:
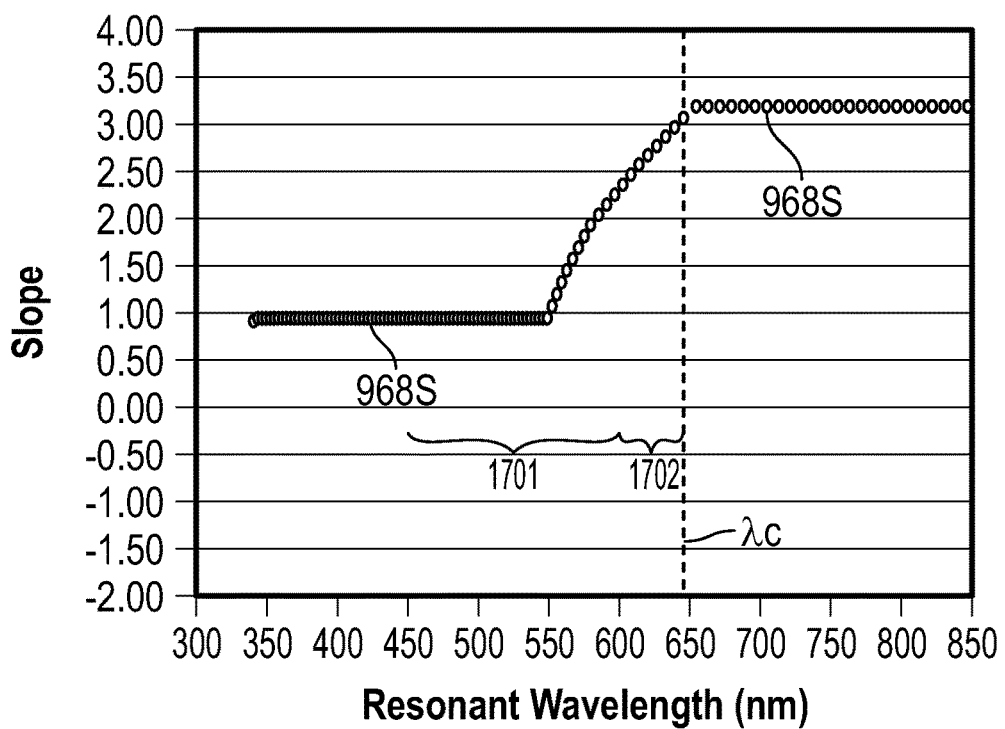

For the profile 968: FIG. 17A is a compound graph in which curve 968 is identical to the profile 968, curve 968A is the IB-smoothed thickness profile of curve 968, the curve 968W is the resonant wavelength for the IB-smoothed thickness profile at the specified oblique optical geometry, and reference line λc marks the critical wavelength at 645 nm; FIG. 17B graphs as curve 968S the slope of the IB-smoothed thickness profile 968A as a function of resonant wavelength as defined by curve 968W, and provides a first region 1701 from 450 to 600 nm and a second region 1702 from 600 to 645 nm, and the reference line λc at 645 nm; and FIG. 17C graphs the color response in a*, b* color coordinates of the reflective polarizer-absorbing polarizer laminate, with the curves φ15, φ25, φ35, and φ45 having analogous meanings to those of FIG. 10C, and with a reference circle C.

The results of the slope ratio for the embodiments of FIG. 9 are summarized in Table 2, where the "Slope Ratio" refers to the second average of the slope of the IB-smoothed thickness profile (from 600 to 645 nm) divided by the first average of the slope of that profile (from 450 to 600 nm).

TABLE 2

| thickness profile in FIG. 9 | Slope Ratio |
| --- | --- |
| 961 | 1.00 |
| 962 | 1.27 |
| 963 | 1.53 |
| 964 | 1.76 |
| 965 | 1.96 |
| 966 | 2.12 |
| 967 | 2.26 |
| 968 | 2.39 |

Figure 11C:
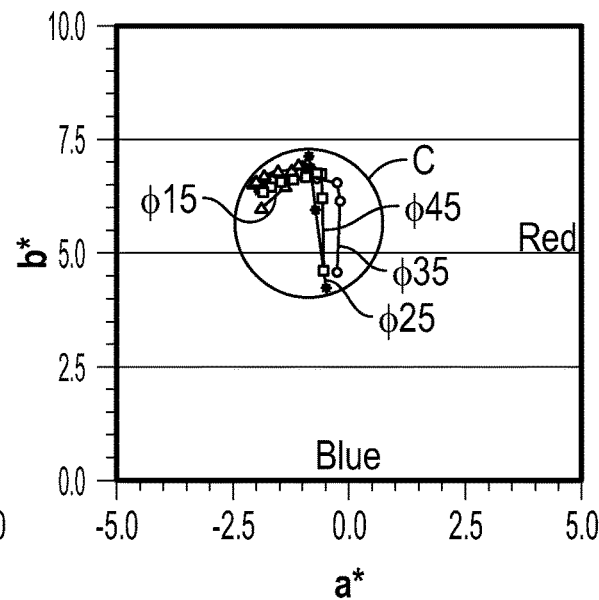
FIGS. 11C, 12C, 13C, 14C, 15C, 16C, and 17C are graphs similar to that of FIG. 10C but for such other TOP polarizer embodiments.
Figure 12C:
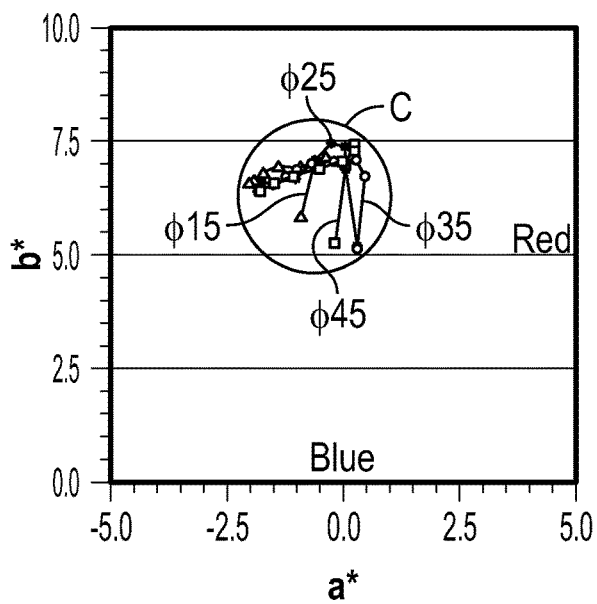
Figure 13C:
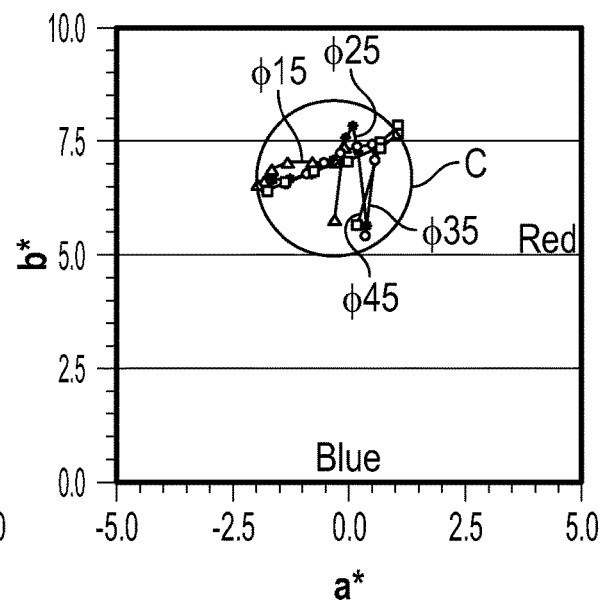
Figure 11A:
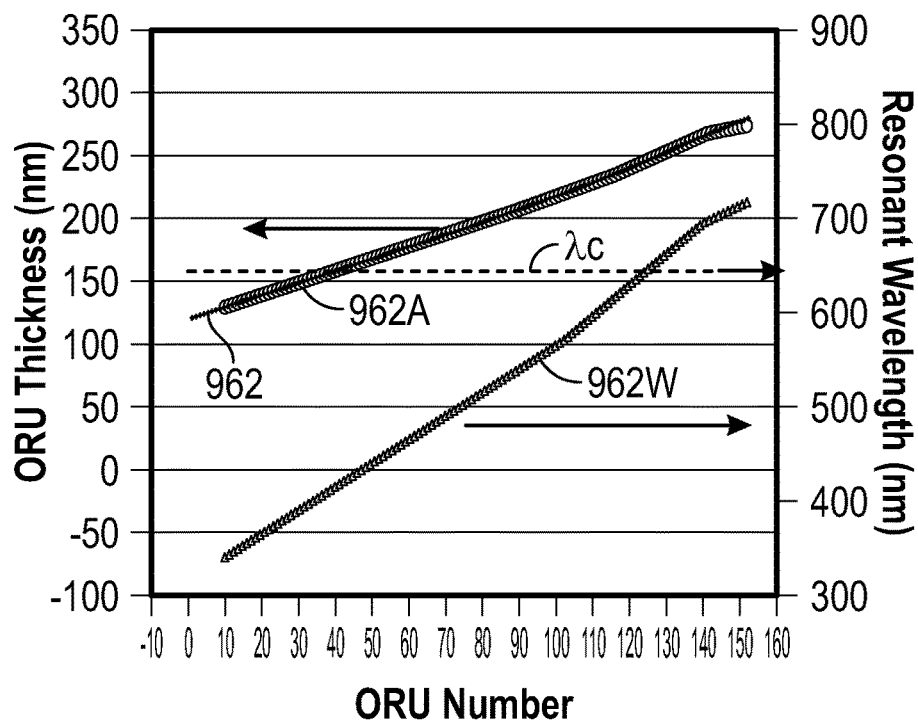
FIGS. 11A, 12A, 13A, 14A, 15A, 16A, and 17A are compound graphs similar to that of FIG. 10A but for other TOP reflective polarizer embodiments.
Figure 11B:
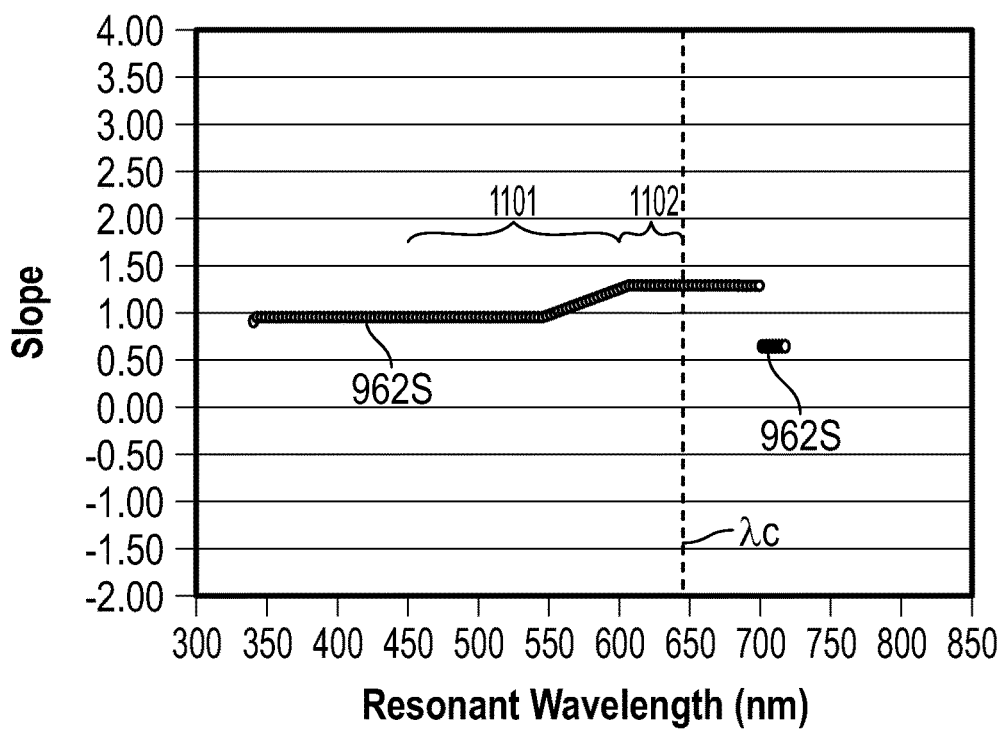
FIGS. 11B, 12B, 13B, 14B, 15B, 16B, and 17B are graphs similar to that of FIG. 10B but for such other TOP polarizer embodiments.
Figure 12A:
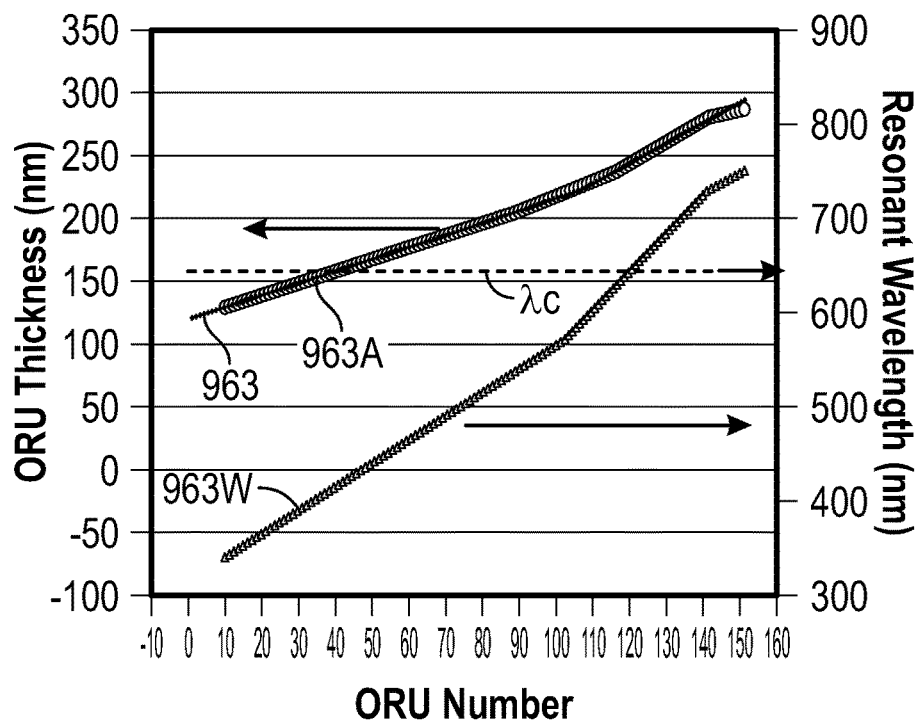
Figure 12B:
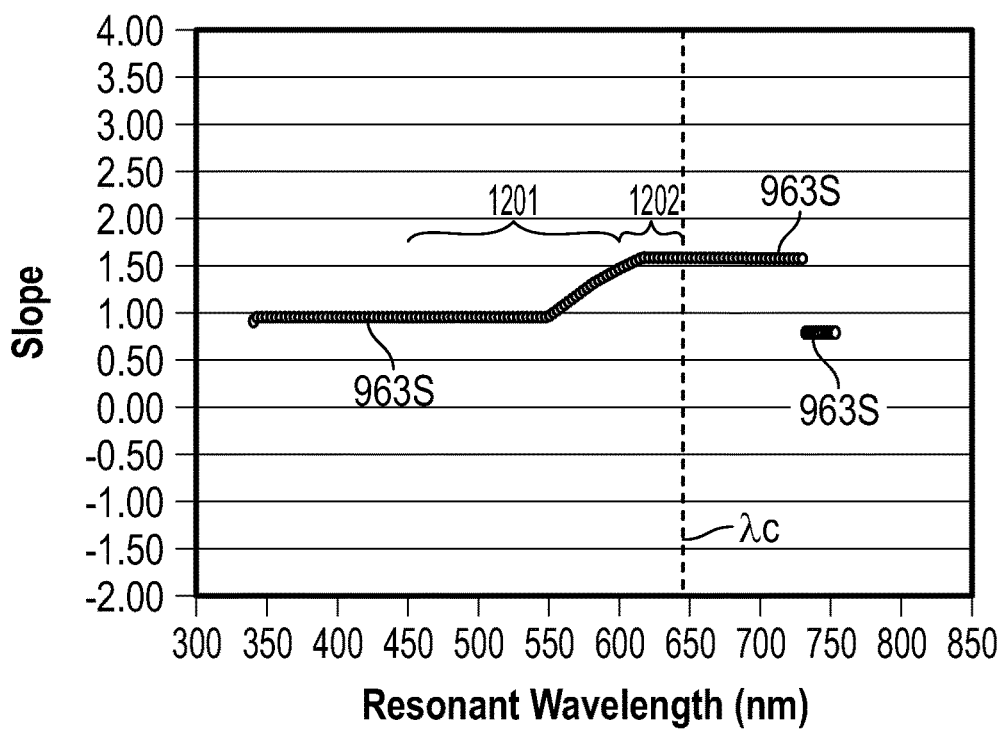

The color response of these embodiments, for a viewer at the highly oblique critical viewing angle, is best evaluated by inspection of the color response curves in FIGS. 10C, 11C, 12C, . . . 17C. In brief summary: the color trajectories of FIGS. 10C, 11C, 12C, and 13C (for ORU thickness profiles 961, 962, 963, and 964, respectively) are within acceptable color limits; but the color trajectories of FIGS. 14C, 15C, 16C, and 17C (for ORU thickness profiles 965, 966, 967, and 968 respectively) are too wide, i.e., they produce an excessive amount of color.

Figure 18:
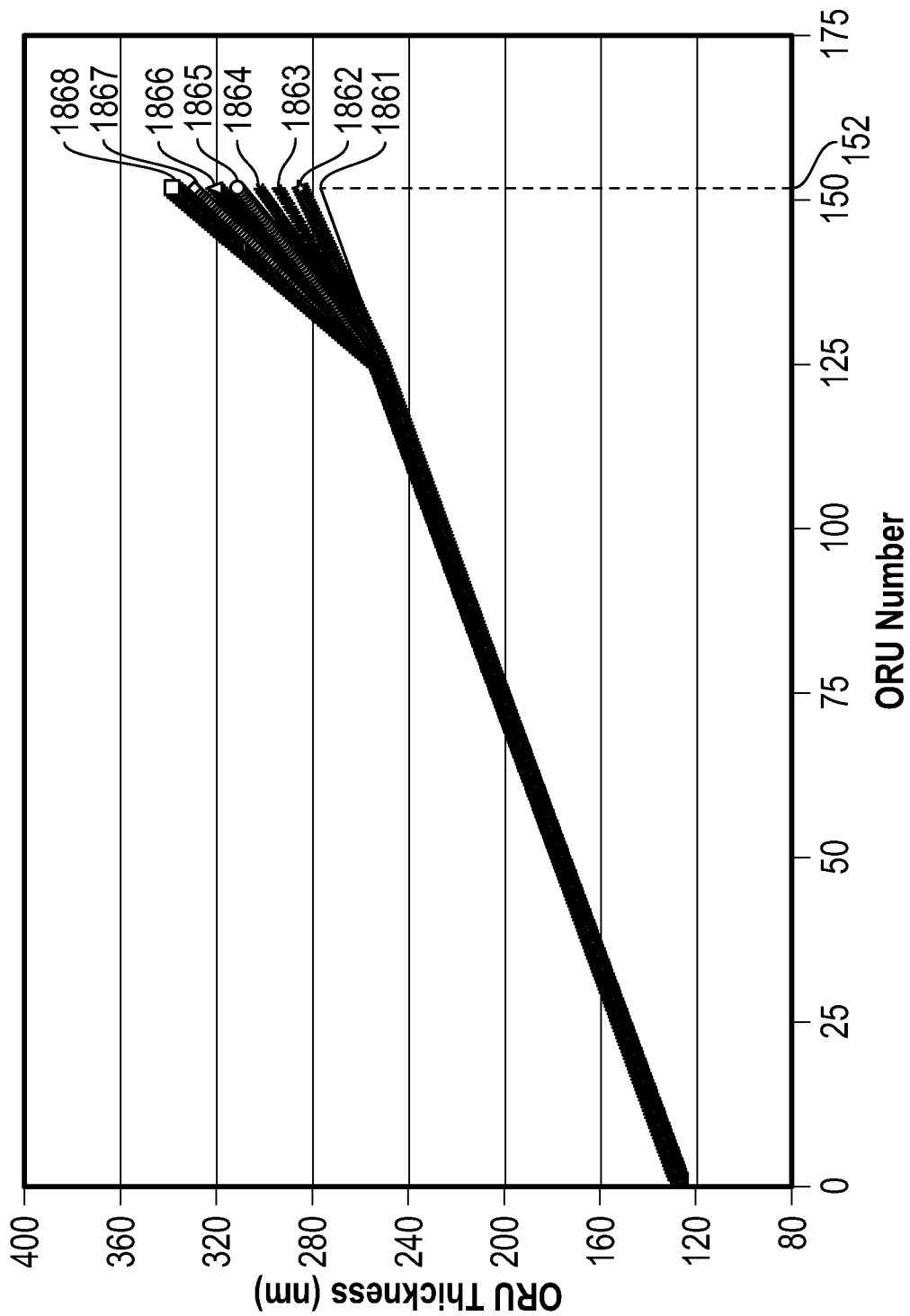
FIG. 18 is a graph of eight different but related physical thickness profiles that may be used in a TOP reflective polarizer, the performance of which was modeled and shown in FIGS. 19A through 26C.

FIG. 18 and its related FIGS. 19A through 26C demonstrate the application of these same principles to other related (modeled) embodiments of TOP reflective polarizers and laminates thereof with a high contrast absorbing polarizer. Similar to the embodiments of FIG. 9, the TOP reflective polarizer embodiments of FIG. 18 also have exactly 152 ORUs, and each ORU has only two microlayers, whose refractive indices are again as provided above in Table 1. FIG. 18 depicts eight different but related ORU physical thickness profiles 1861, 1862, 1863, 1864, 1865, 1866, 1867, and 1868, any of which may be readily employed in a TOP reflective polarizer. The thickness profile 1861 is linear in form, i.e. of constant slope, from the first ORU (#1), whose physical thickness is about 125 nm, to the last ORU (#152), whose physical thickness is about 275 nm. The other thickness profiles 1862-1868 are identical to the thickness profile 1861 from ORU #1 through ORU #125, but then at ORU #125 they undergo a step-change in the slope of thickness profile from ORU #125 to ORU #152. The step change in slope is smallest for profile 1862 and largest for profile 1868, as shown in the figure.

Each of these ORU thickness profiles was then analyzed in substantially the same way as described above in connection with FIGS. 9 through 17C, which analysis will not be repeated here to avoid needless repetition.

Figure 19A:
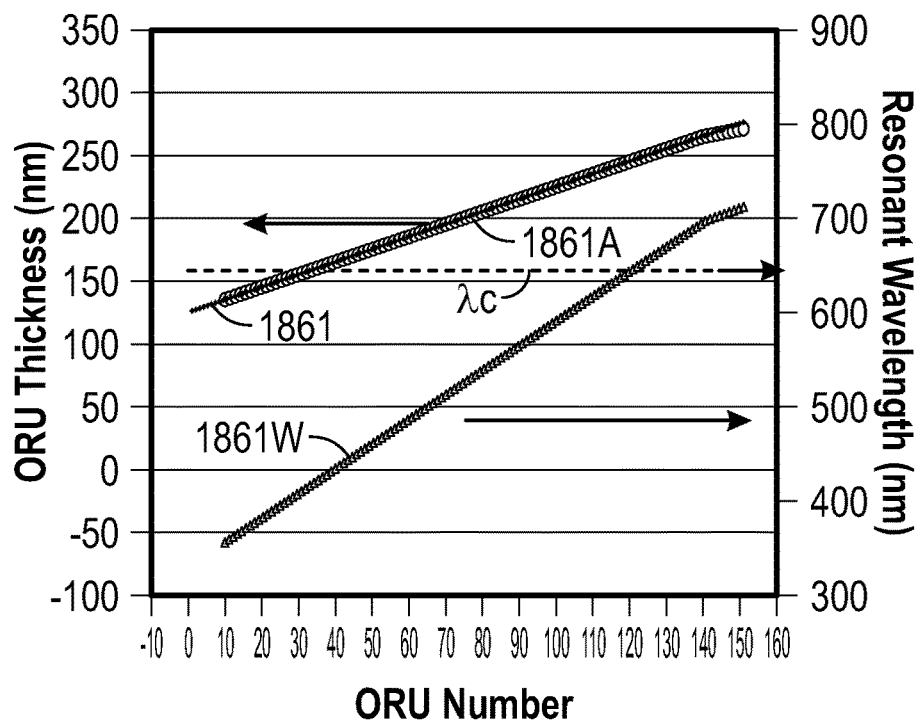
FIG. 19A is a compound graph that plots ORU thickness against ORU number, and also plots a resonant wavelength against the ORU number.
Figure 19B:
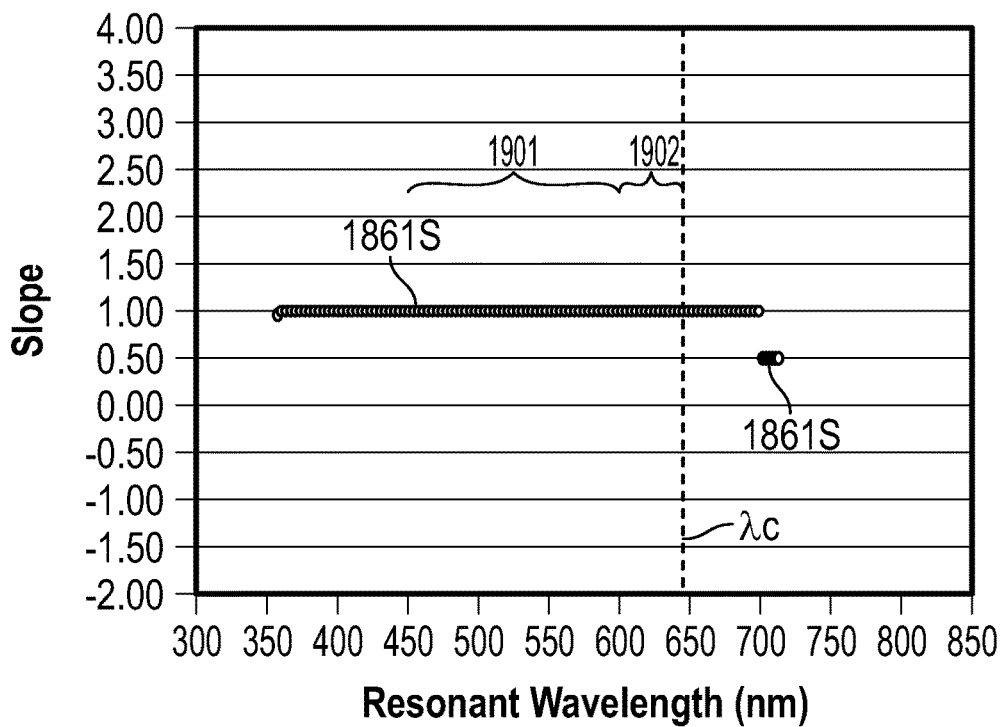
FIG. 19B is a graph of the slope of an averaged thickness profile in FIG. 19A as a function of resonant wavelength.

For the ORU thickness profile 1861: FIG. 19A is a compound graph in which curve 1861 is identical to the profile 1861, curve 1861A is the IB-smoothed thickness profile of curve 1861, the curve 1861W is the resonant wavelength for the IB-smoothed thickness profile at the specified oblique optical geometry, and reference line λc marks the critical wavelength at 645 nm; FIG. 19B graphs as curve 1861S the slope of the IB-smoothed thickness profile 1861A as a function of resonant wavelength as defined by curve 1861W, and provides a first region 1901 from 450 to 600 nm and a second region 1902 from 600 to 645 nm, and the reference line λc at 645 nm; and FIG. 19C graphs the color response in a*, b* color coordinates of the reflective polarizer-absorbing polarizer laminate, with the curves φ5, φ25, φ35, and φ45 having analogous meanings to those of FIG. 10C, and with a reference circle C.

For the ORU thickness profile 1862: FIG. 20A is a compound graph in which curve 1862 is identical to the profile 1862, curve 1862A is the IB-smoothed thickness profile of curve 1862, the curve 1862W is the resonant wavelength for the IB-smoothed thickness profile at the specified oblique optical geometry, and reference line λc marks the critical wavelength at 645 nm; FIG. 20B graphs as curve 1862S the slope of the IB-smoothed thickness profile 1862A as a function of resonant wavelength as defined by curve 1862W, and provides a first region 2001 from 450 to 600 nm and a second region 2002 from 600 to 645 nm, and the reference line λc at 645 nm; and FIG. 20C graphs the color response in a*, b* color coordinates of the reflective polarizer-absorbing polarizer laminate, with the curves φ15, φ5, φ35, and φ45 having analogous meanings to those of FIG. 10C, and with a reference circle C.

For the ORU thickness profile 1863: FIG. 21A is a compound graph in which curve 1863 is identical to the profile 1863, curve 1863A is the IB-smoothed thickness profile of curve 1863, the curve 1863W is the resonant wavelength for the IB-smoothed thickness profile at the specified oblique optical geometry, and reference line λc marks the critical wavelength at 645 nm; FIG. 21B graphs as curve 1863S the slope of the IB-smoothed thickness profile 1863A as a function of resonant wavelength as defined by curve 1863W, and provides a first region 2101 from 450 to 600 nm and a second region 2102 from 600 to 645 nm, and the reference line λc at 645 nm; and FIG. 21C graphs the color response in a*, b* color coordinates of the reflective polarizer-absorbing polarizer laminate, with the curves φ15, φ25, φ35, and φ45 having analogous meanings to those of FIG. 10C, and with a reference circle C.

Figure 22A:
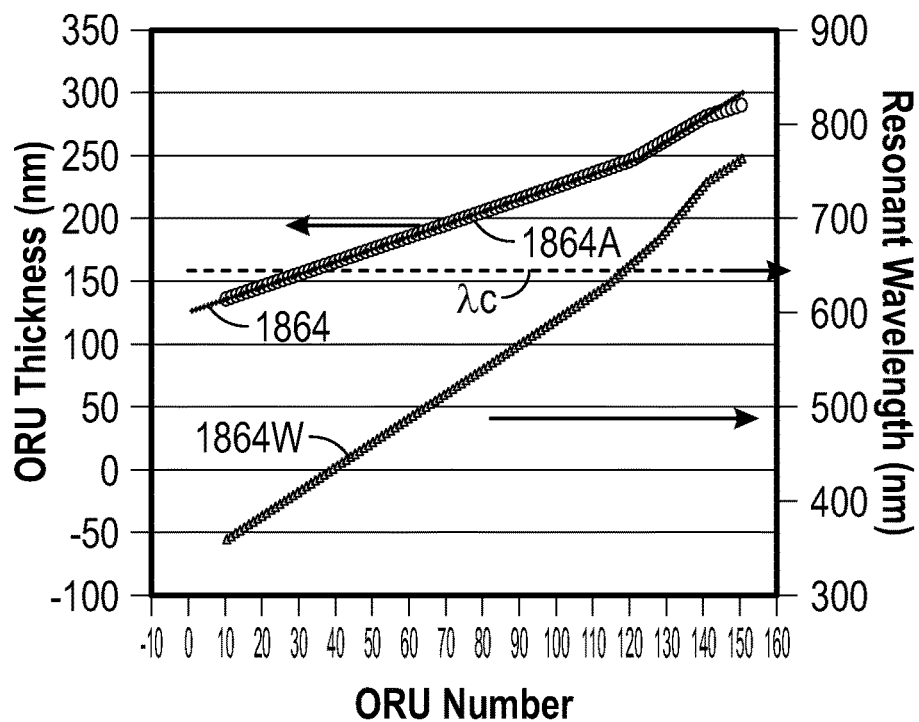
Figure 22B:
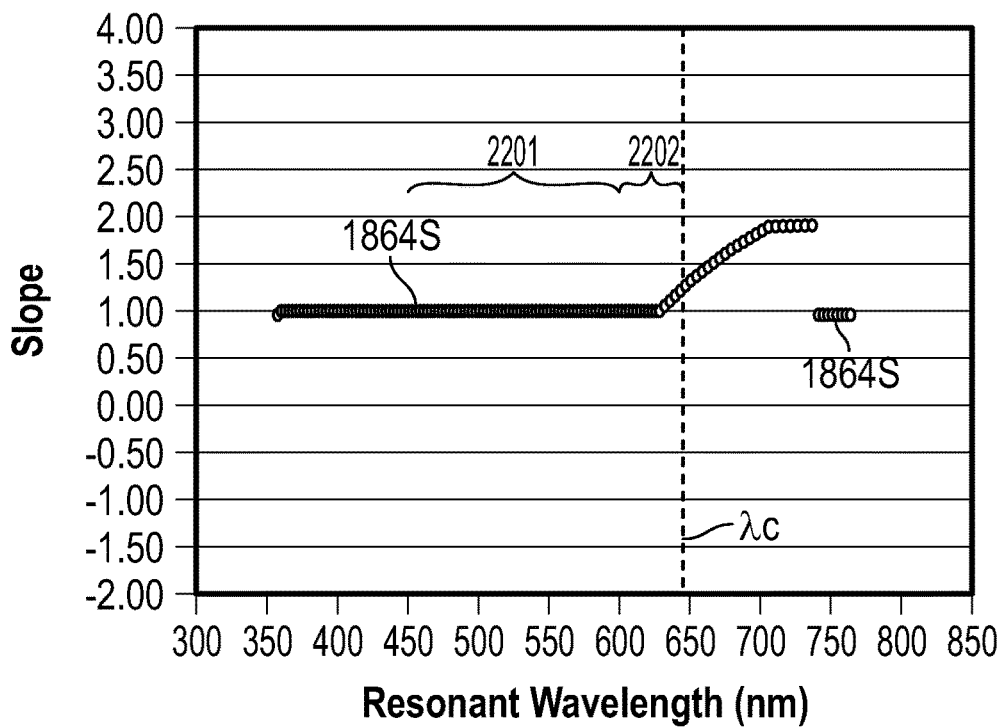

For the ORU thickness profile 1864: FIG. 22A is a compound graph in which curve 1864 is identical to the profile 1864, curve 1864A is the IB-smoothed thickness profile of curve 1864, the curve 1864W is the resonant wavelength for the IB-smoothed thickness profile at the specified oblique optical geometry, and reference line λc marks the critical wavelength at 645 nm; FIG. 22B graphs as curve 1864S the slope of the IB-smoothed thickness profile 1864A as a function of resonant wavelength as defined by curve 1864W, and provides a first region 2201 from 450 to 600 nm and a second region 2202 from 600 to 645 nm, and the reference line λc at 645 nm; and FIG. 22C graphs the color response in a*, b* color coordinates of the reflective polarizer-absorbing polarizer laminate, with the curves φ5, φ25, φ35, and φ45 having analogous meanings to those of FIG. 10C, and with a reference circle C.

Figure 23A:
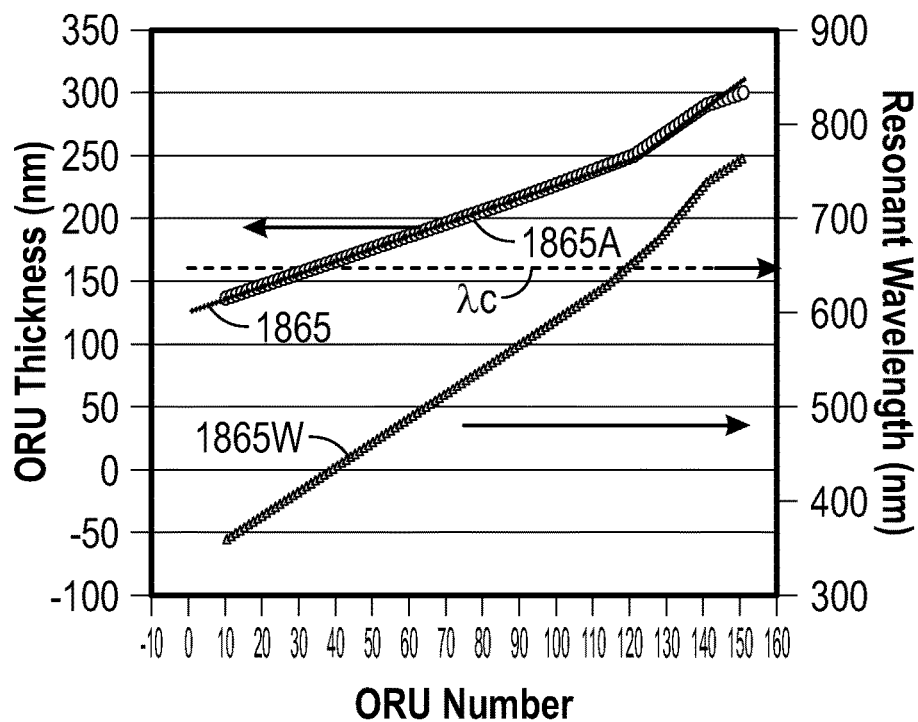
Figure 23B:
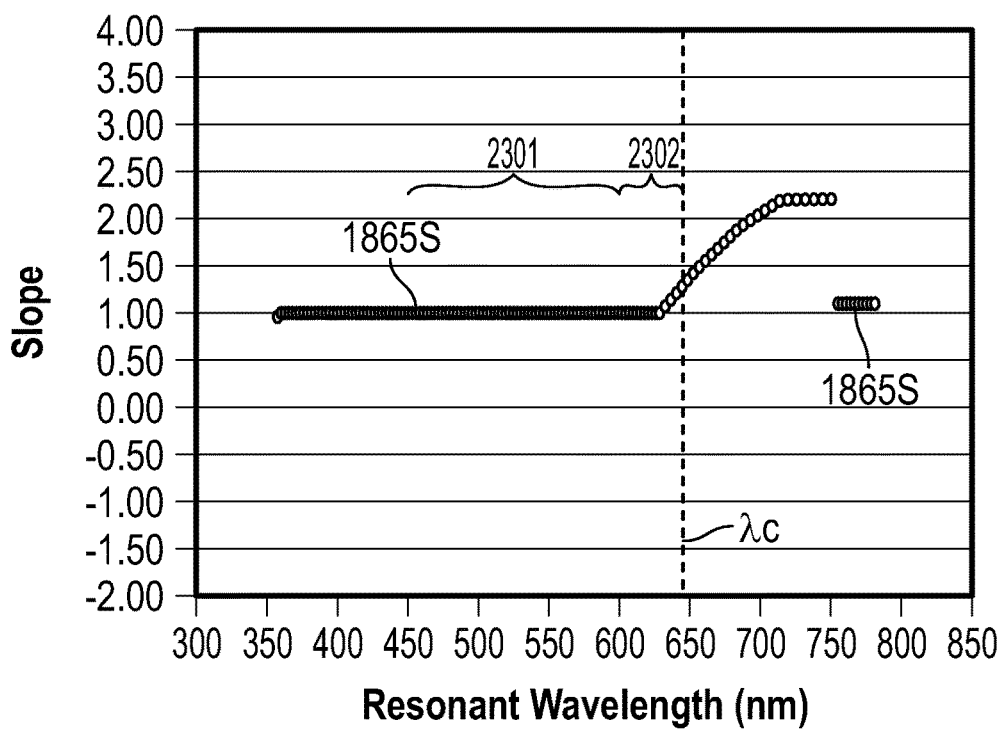
Figure 23C:
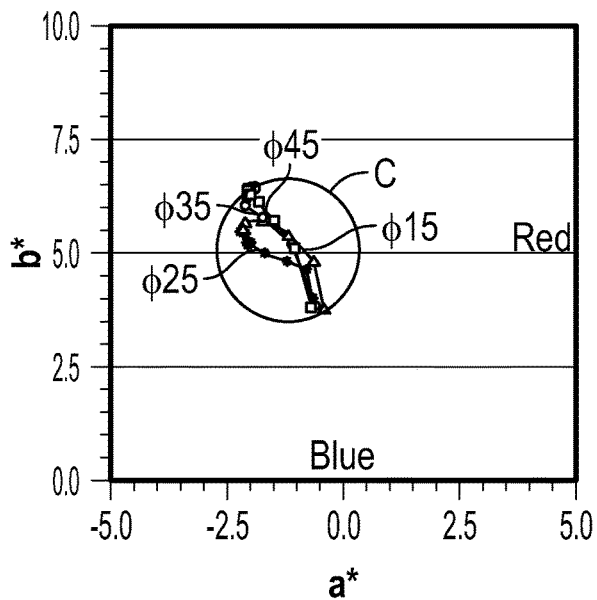
Figure 25C:
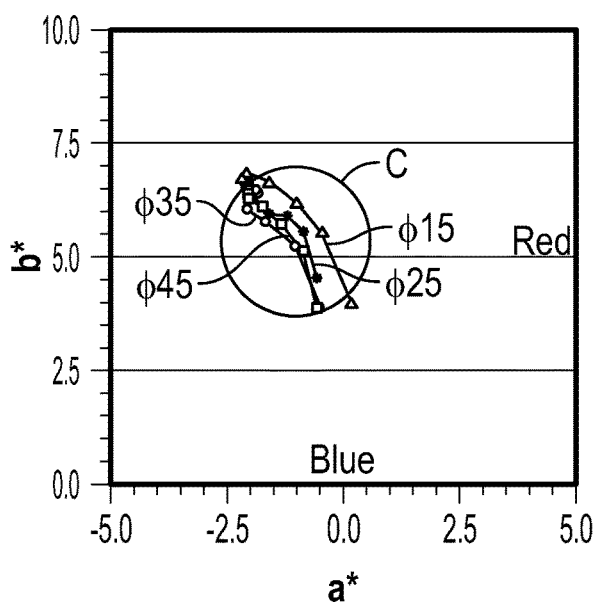
Figure 26C:
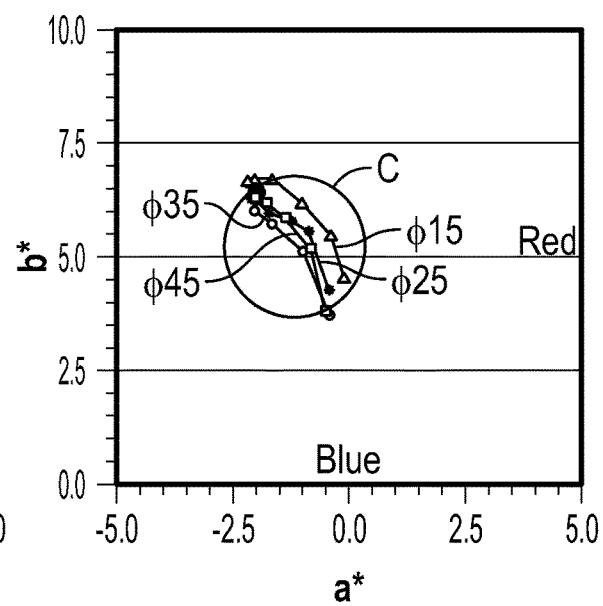

For the ORU thickness profile 1865: FIG. 23A is a compound graph in which curve 1865 is identical to the profile 1865, curve 1865A is the IB-smoothed thickness profile of curve 1865, the curve 1865W is the resonant wavelength for the IB-smoothed thickness profile at the specified oblique optical geometry, and reference line λc marks the critical wavelength at 645 nm; FIG. 23B graphs as curve 1865S the slope of the IB-smoothed thickness profile 1865A as a function of resonant wavelength as defined by curve 1865W, and provides a first region 2301 from 450 to 600 nm and a second region 2302 from 600 to 645 nm, and the reference line λc at 645 nm; and FIG. 23C graphs the color response in a*, b* color coordinates of the reflective polarizer-absorbing polarizer laminate, with the curves φ15, φ25, φ35, and φ45 having analogous meanings to those of FIG. 10C, and with a reference circle C.

Figure 24C:
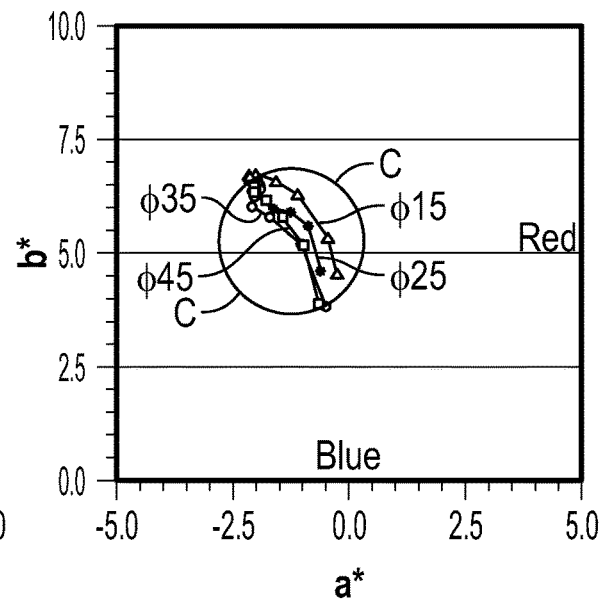
Figure 24A:
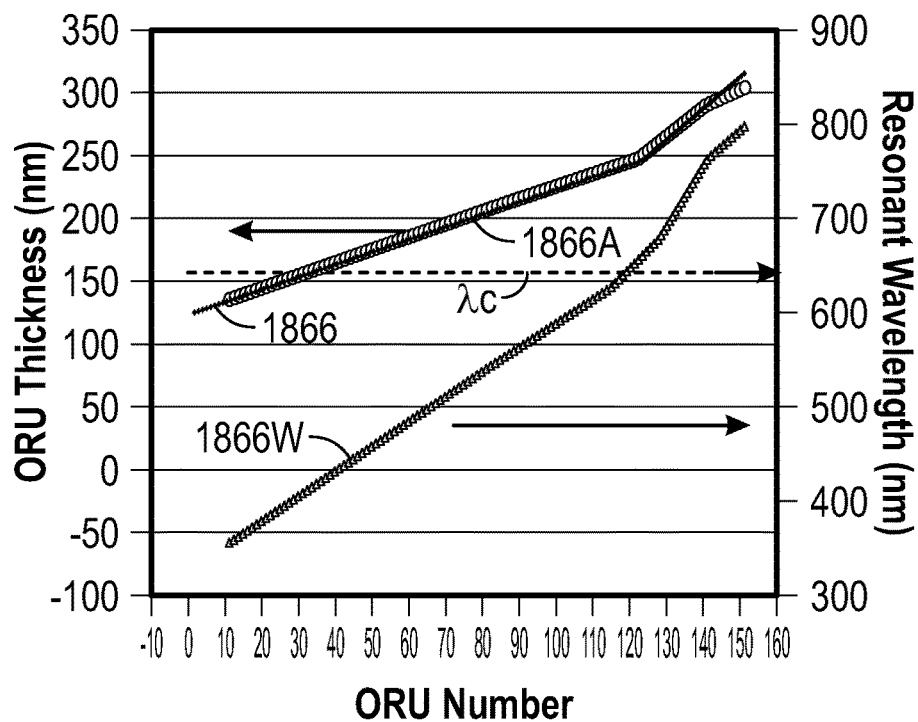
Figure 24B:
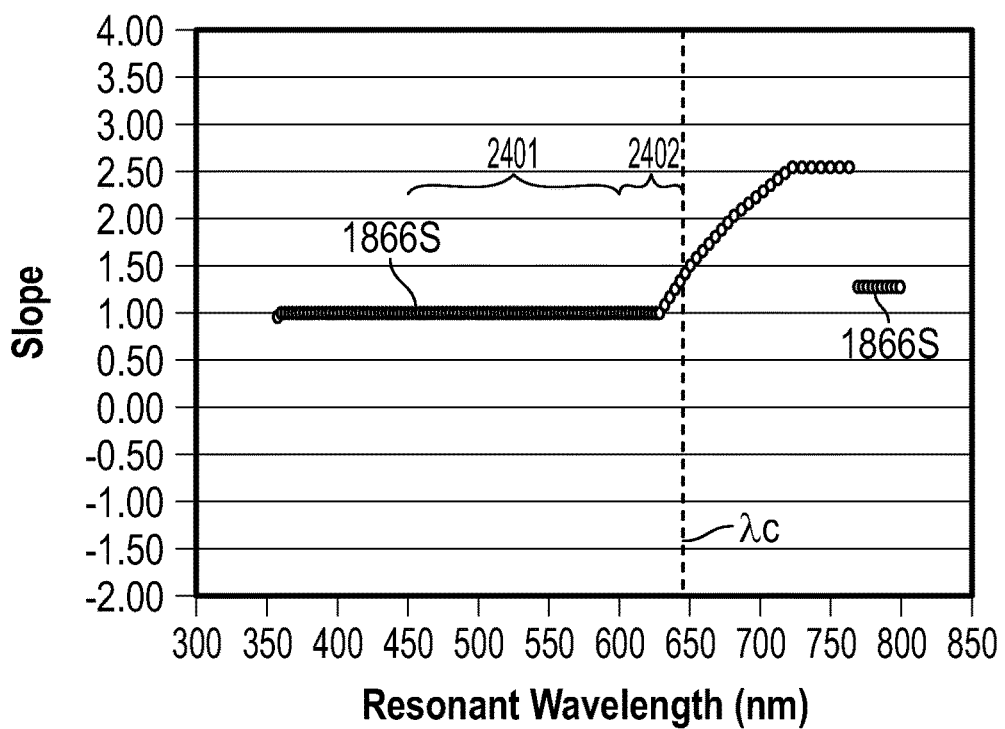

For the ORU thickness profile 1866: FIG. 24A is a compound graph in which curve 1866 is identical to the profile 1866, curve 1866A is the IB-smoothed thickness profile of curve 1866, the curve 1866W is the resonant wavelength for the IB-smoothed thickness profile at the specified oblique optical geometry, and reference line λc marks the critical wavelength at 645 nm; FIG. 24B graphs as curve 1866S the slope of the IB-smoothed thickness profile 1866A as a function of resonant wavelength as defined by curve 1866W, and provides a first region 2401 from 450 to 600 nm and a second region 2402 from 600 to 645 nm, and the reference line λc at 645 nm; and FIG. 24C graphs the color response in a*, b* color coordinates of the reflective polarizer-absorbing polarizer laminate, with the curves φ15, φ25, φ35, and φ45 having analogous meanings to those of FIG. 10C, and with a reference circle C.

Figure 25A:
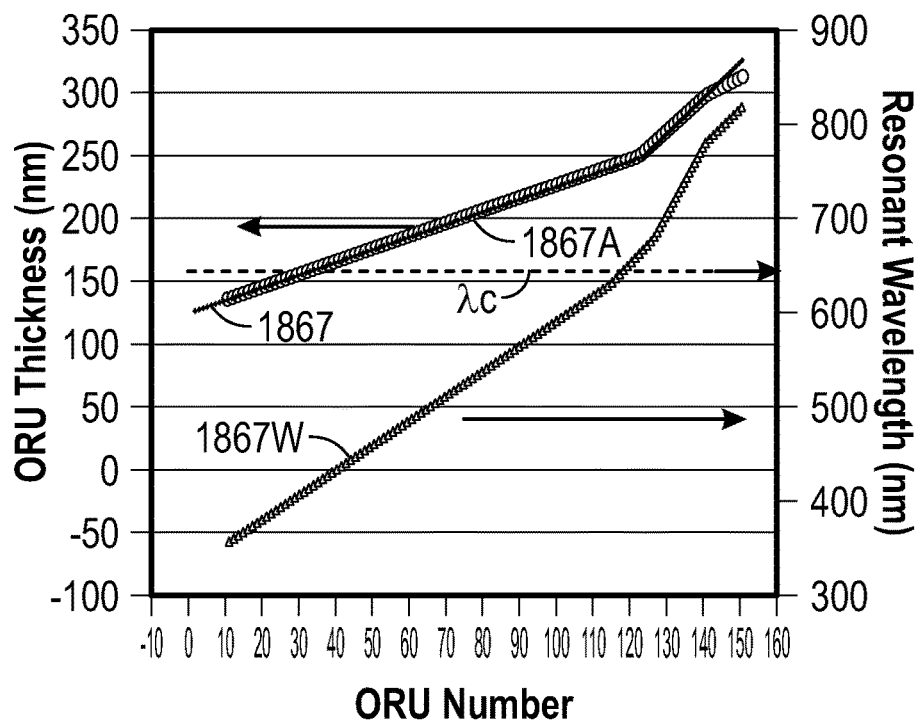
Figure 25B:
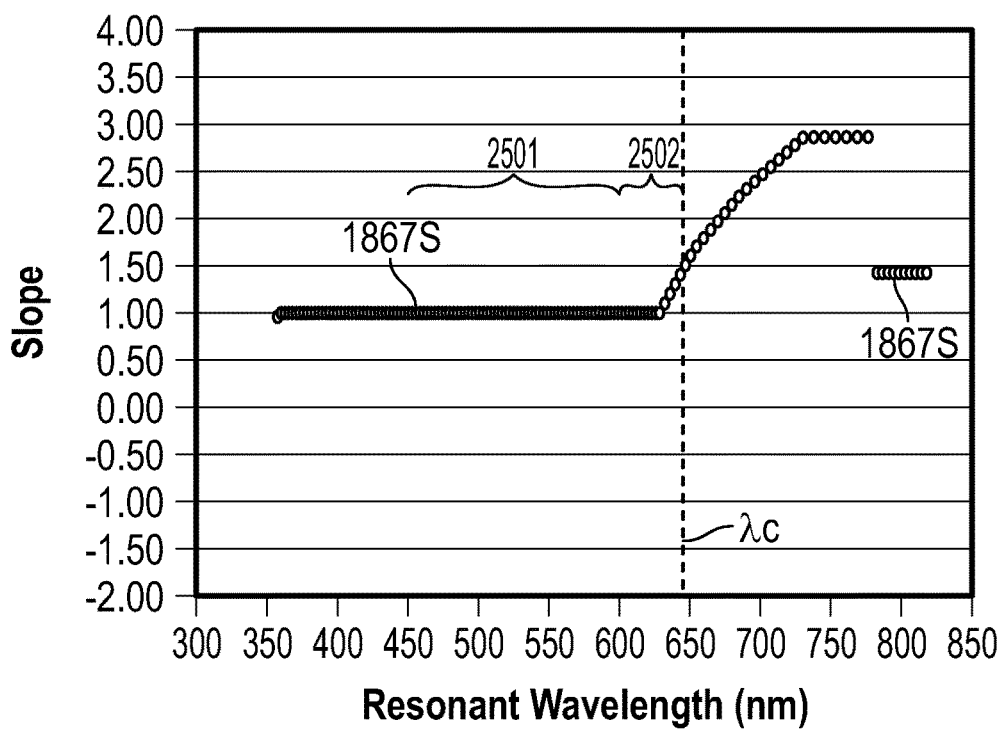

For the ORU thickness profile 1867: FIG. 25A is a compound graph in which curve 1867 is identical to the profile 1867, curve 1867A is the IB-smoothed thickness profile of curve 1867, the curve 1867W is the resonant wavelength for the IB-smoothed thickness profile at the specified oblique optical geometry, and reference line λc marks the critical wavelength at 645 nm; FIG. 25B graphs as curve 1867S the slope of the IB-smoothed thickness profile 1867A as a function of resonant wavelength as defined by curve 1867W, and provides a first region 2501 from 450 to 600 nm and a second region 2502 from 600 to 645 nm, and the reference line λc at 645 nm; and FIG. 25C graphs the color response in a*, b* color coordinates of the reflective polarizer-absorbing polarizer laminate, with the curves φ15, φ25, φ35, and φ45 having analogous meanings to those of FIG. 10C, and with a reference circle C.

Figure 26A:
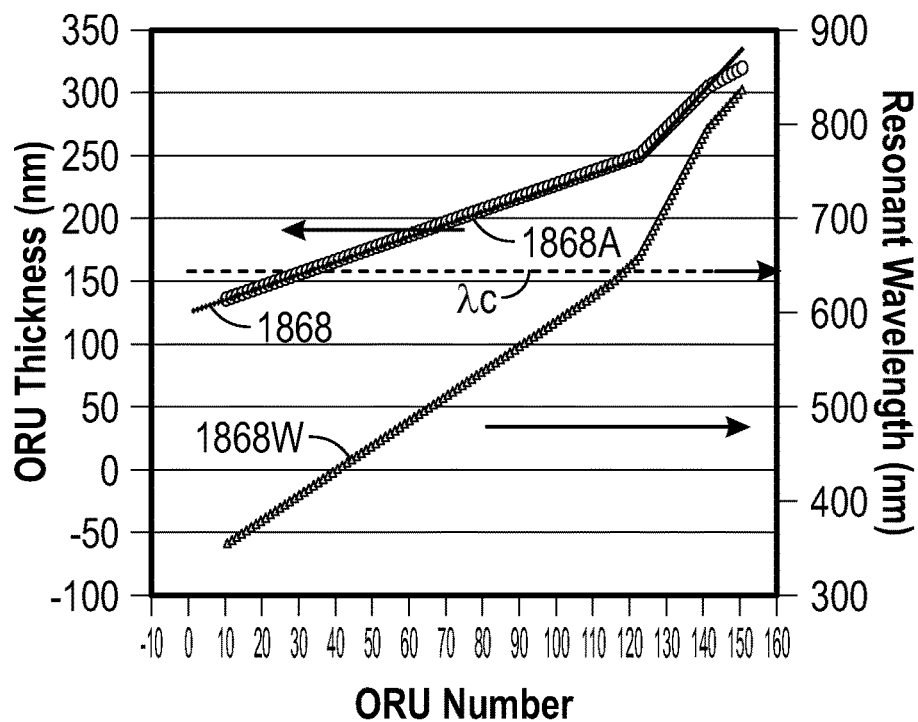
Figure 26B:
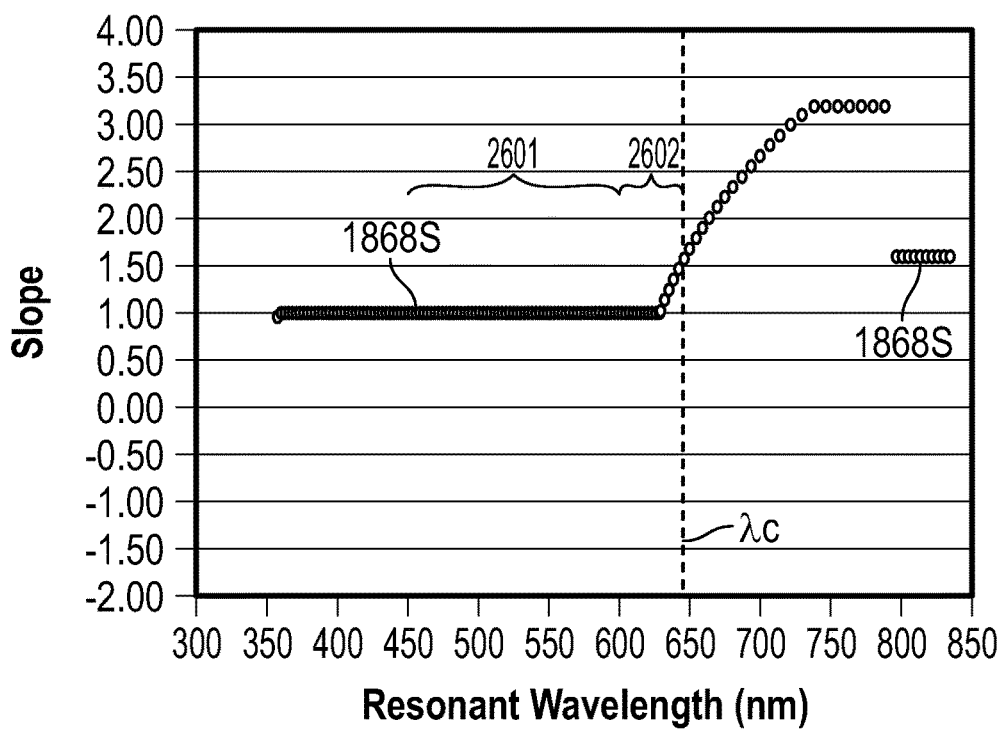

For the ORU thickness profile 1868: FIG. 26A is a compound graph in which curve 1868 is identical to the profile 1868, curve 1868A is the IB-smoothed thickness profile of curve 1868, the curve 1868W is the resonant wavelength for the IB-smoothed thickness profile at the specified oblique optical geometry, and reference line λc marks the critical wavelength at 645 nm; FIG. 26B graphs as curve 1868S the slope of the IB-smoothed thickness profile 1868A as a function of resonant wavelength as defined by curve 1868W, and provides a first region 2601 from 450 to 600 nm and a second region 2602 from 600 to 645 nm, and the reference line λc at 645 nm; and FIG. 26C graphs the color response in a*, b* color coordinates of the reflective polarizer-absorbing polarizer laminate, with the curves φ5, φ25, φ35, and φ45 having analogous meanings to those of FIG. 10C, and with a reference circle C.

The results of the slope ratio for the embodiments of FIG. 18 are summarized in Table 3, where the "Slope Ratio" has the same meaning as in Table 2 above.

TABLE 3

| thickness profile in FIG. 18 | Slope Ratio |
| --- | --- |
| 1861 | 1.00 |
| 1862 | 1.01 |
| 1863 | 1.03 |
| 1864 | 1.04 |
| 1865 | 1.06 |
| 1866 | 1.05 |
| 1867 | 1.07 |
| 1868 | 1.08 |

Figure 19C:
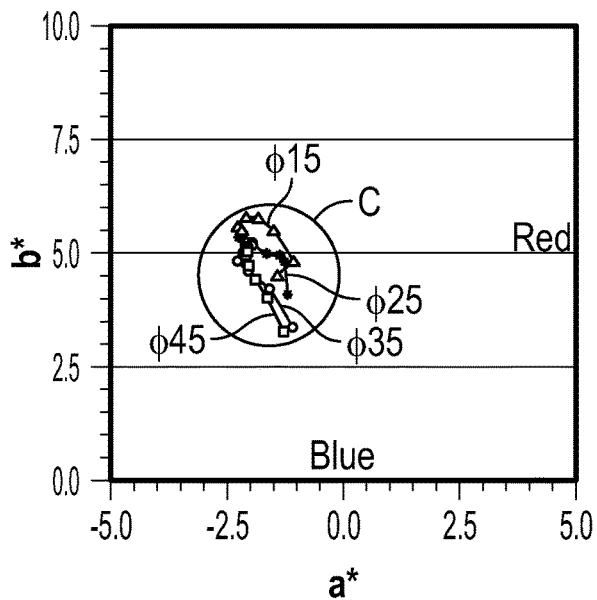
FIG. 19C is a graph of the calculated color of light transmitted through a laminate of a TOP reflective polarizer and a high contrast absorbing polarizer over a range of azimuthal ($\phi$) and polar ($\theta$) angles, the TOP polarizer having the thickness profile of FIG. 19A.
Figure 20C:
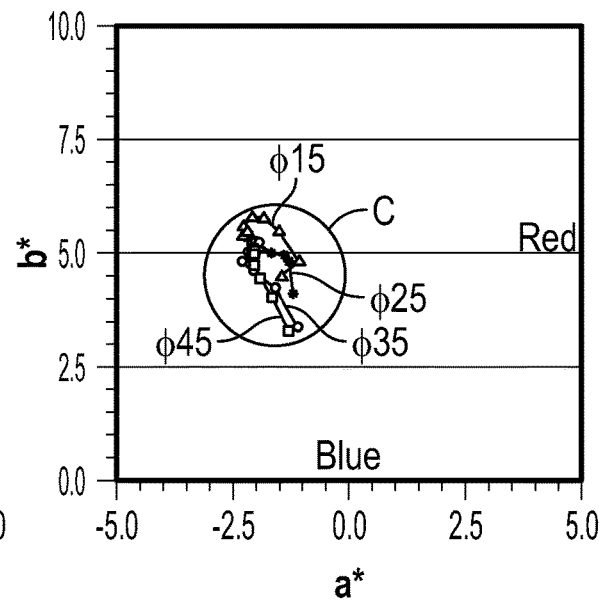
FIGS. 20C, 21C, 22C, 23C, 24C, 25C, and 26C are graphs similar to that of FIG. 19C but for such other TOP polarizer embodiments.
Figure 21C:
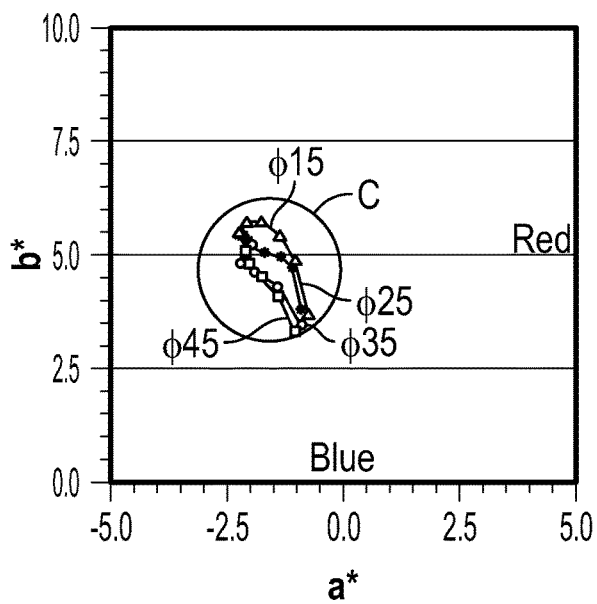
Figure 22C:
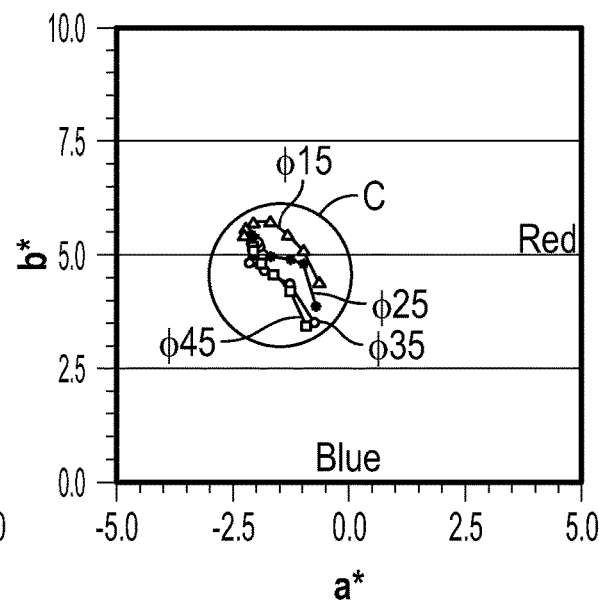
Figure 20A:
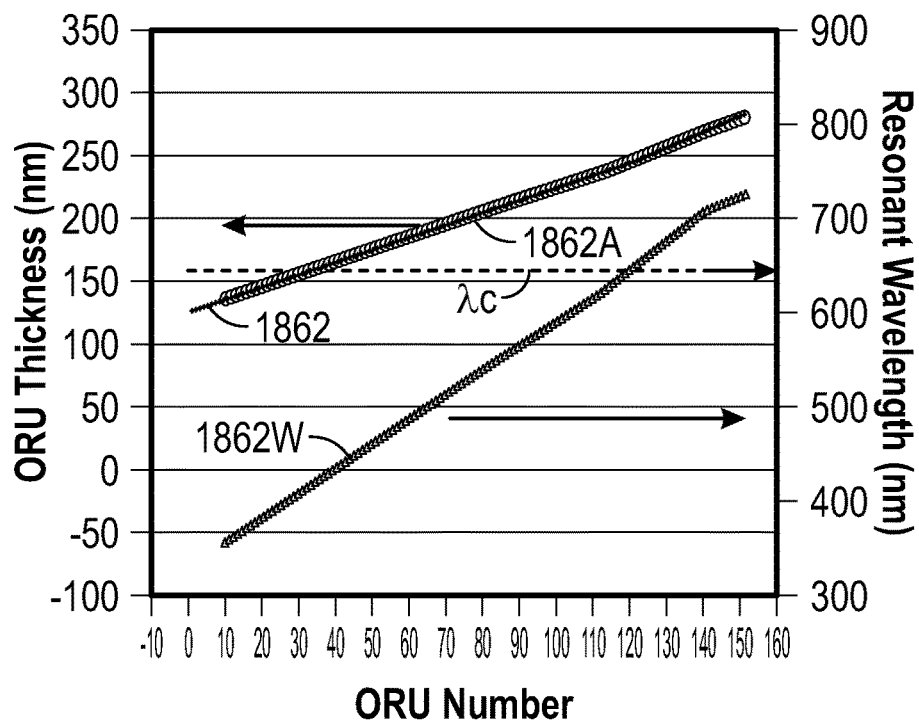
FIGS. 20A, 21A, 22A, 23A, 24A, 25A, and 26A are compound graphs similar to that of FIG. 19A but for other TOP reflective polarizer embodiments.
Figure 20B:
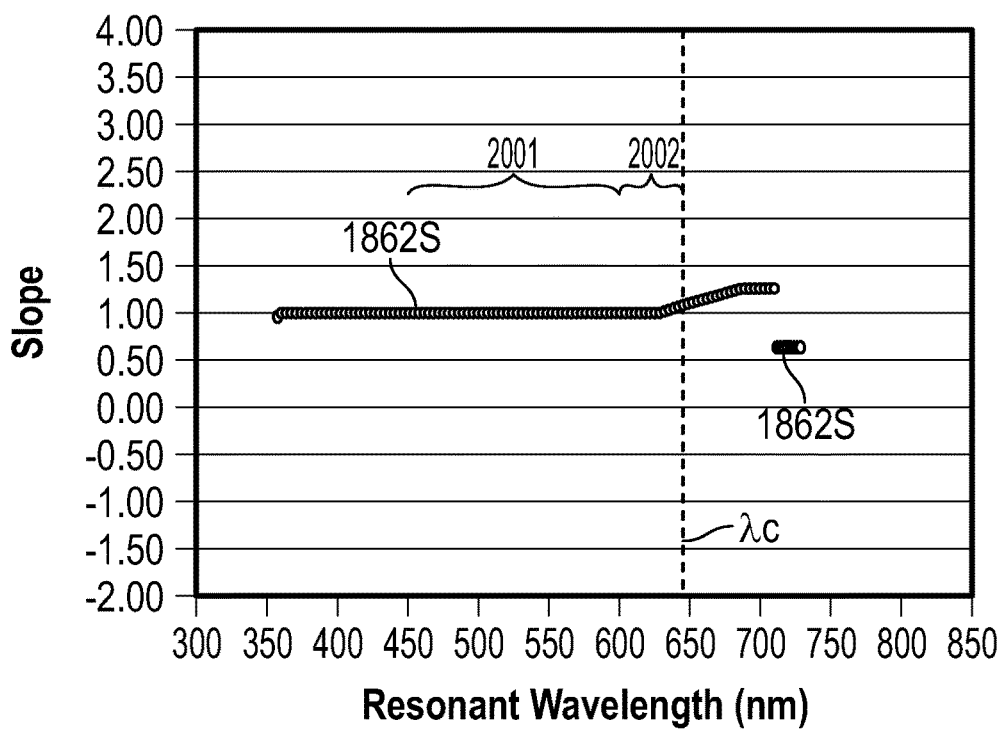
FIGS. 20B, 21B, 22B, 23B, 24B, 25B, and 26B are graphs similar to that of FIG. 19B but for such other TOP polarizer embodiments.
Figure 21A:
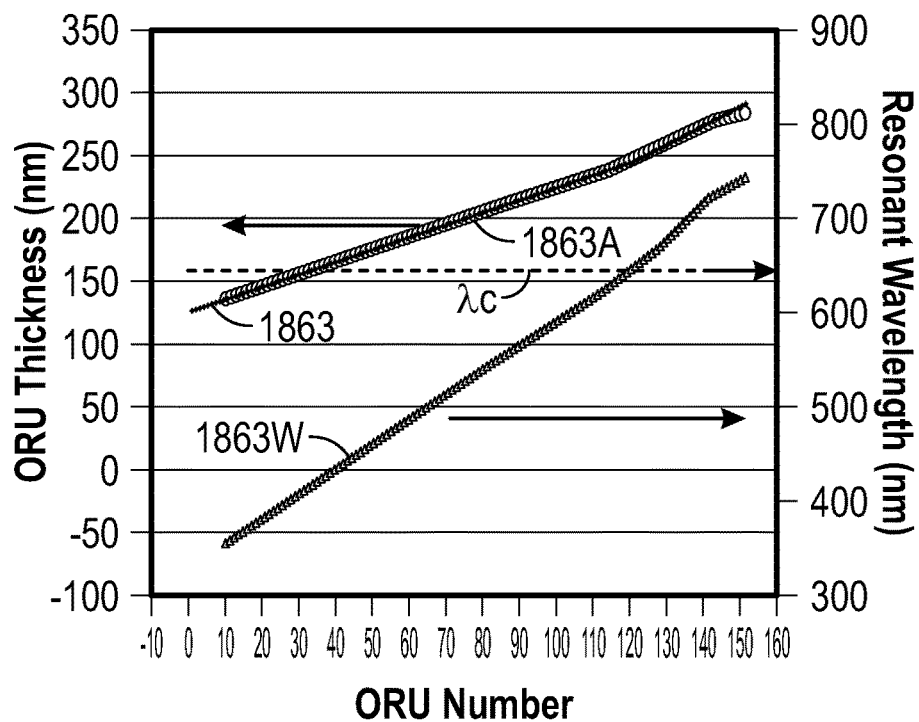
Figure 21B:
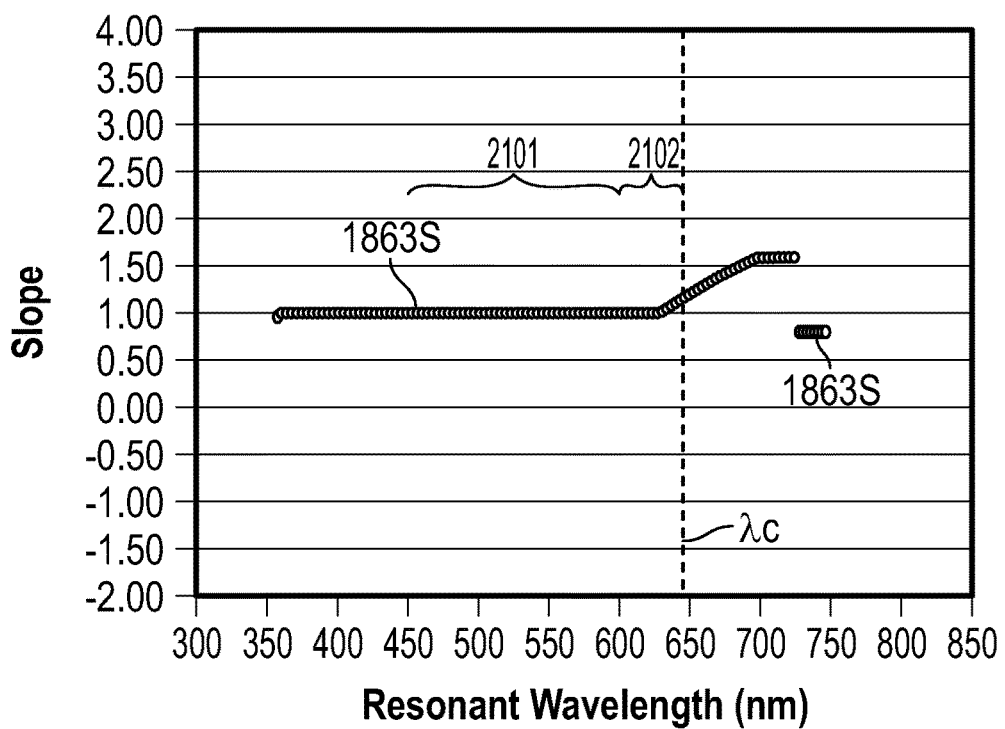

The color response of these embodiments, for a viewer at the highly oblique critical viewing angle, is best evaluated by inspection of the color response curves in FIGS. 19C, 20C, 21C, . . . 26C. In brief summary, the color trajectories for all of these embodiments remain within acceptable limits.

Figure 27:
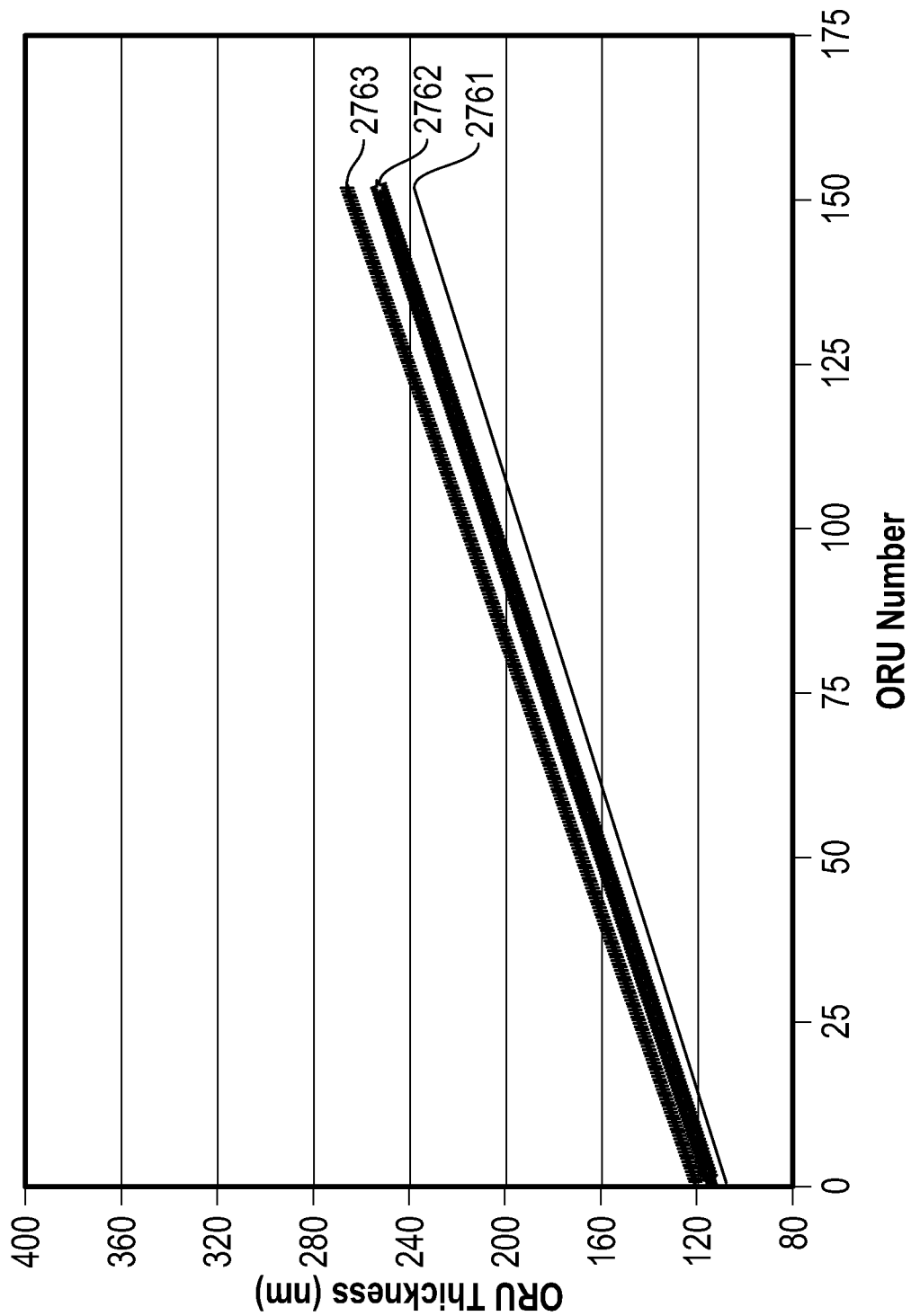
FIG. 27 is a graph of three different but related physical thickness profiles that may be used in a TOP reflective polarizer, the performance of which was modeled and shown in FIGS. 28A through 30C.

FIG. 27 and its related FIGS. 28A through 30C demonstrate the application of these same principles to still more related (modeled) embodiments of TOP reflective polarizers and laminates thereof with a high contrast absorbing polarizer. Similar to the embodiments of FIGS. 9 and 18, the TOP reflective polarizer embodiments of FIG. 27 also have exactly 152 ORUs, and each ORU has only two microlayers, whose refractive indices are again as provided above in Table 1. FIG. 27 depicts three different but related ORU physical thickness profiles 2761, 2762, and 2763, any of which may be readily employed in a TOP reflective polarizer. The thickness profile 2762 is linear in form, i.e. of constant slope, from the first ORU (#1), whose physical thickness is about 108 nm, to the last ORU (#152), whose physical thickness is about 255 nm. The other thickness profiles 2761 and 2763 are also linear in form, but related to the thickness profile 2762 by a simple scaling factor. The profile 2761 is derived by multiplying the profile 2762 by a scaling factor of 95%. The profile 2763 is derived by multiplying the profile 2762 by a scaling factor of 105%.

Each of these ORU thickness profiles was then analyzed in substantially the same way as described above in connection with FIGS. 9 through 26C, which analysis will not be repeated here to avoid needless repetition.

Figure 28A:
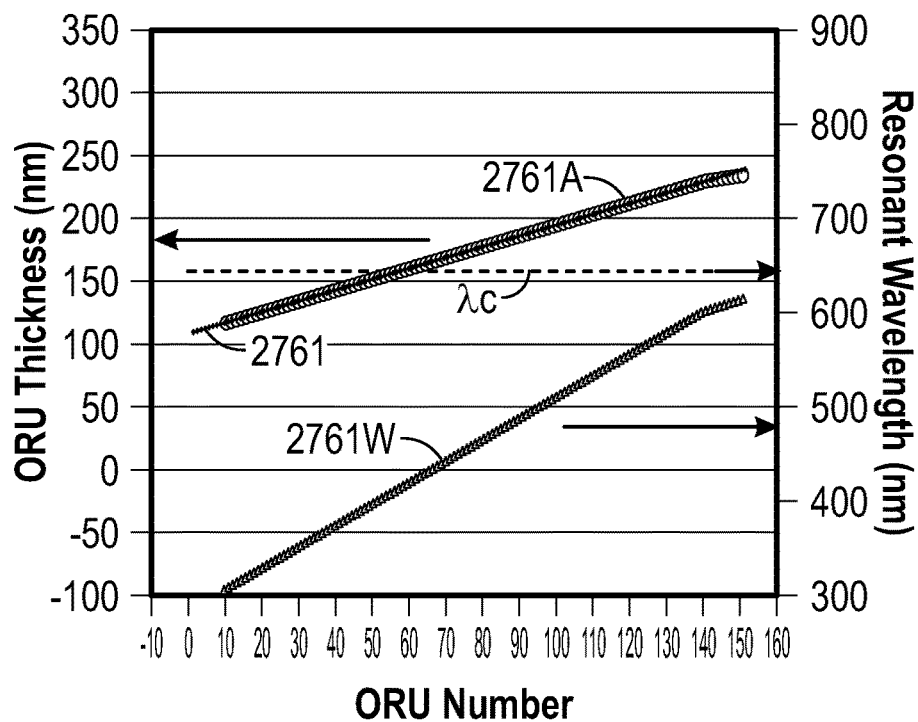
FIG. 28A is a compound graph that plots ORU thickness against ORU number, and also plots a resonant wavelength against the ORU number.
Figure 28B:
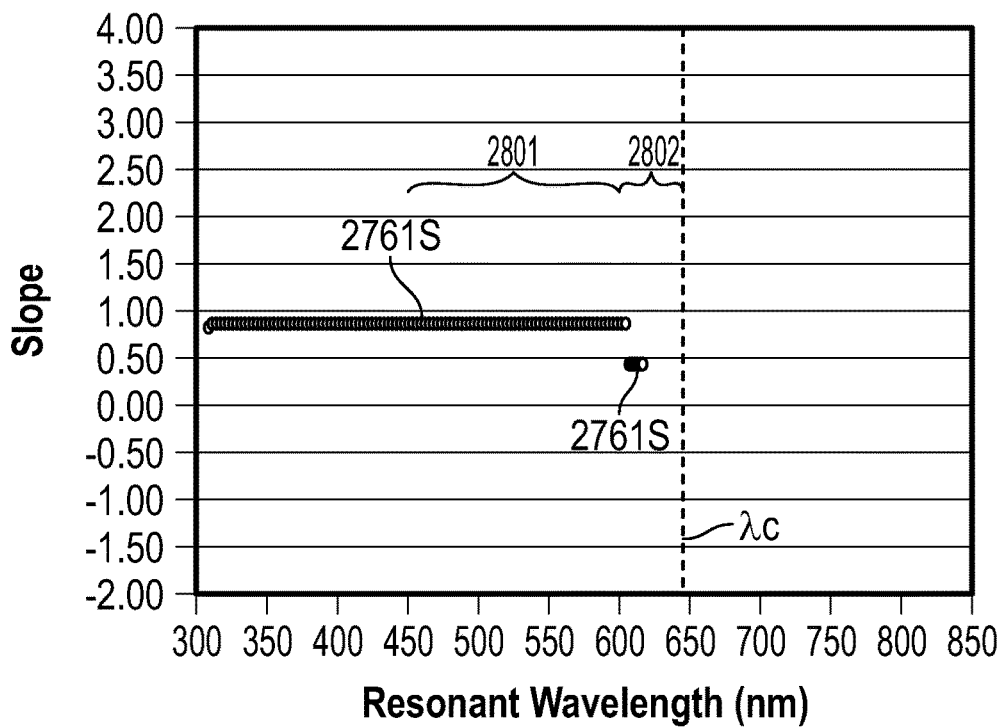
FIG. 28B is a graph of the slope of an averaged thickness profile in FIG. 28A as a function of resonant wavelength.

For the ORU thickness profile 2761: FIG. 28A is a compound graph in which curve 2761 is identical to the profile 2761, curve 2761A is the IB-smoothed thickness profile of curve 2761, the curve 2761W is the resonant wavelength for the IB-smoothed thickness profile at the specified oblique optical geometry, and reference line λc marks the critical wavelength at 645 nm; FIG. 28B graphs as curve 2761S the slope of the IB-smoothed thickness profile 2761A as a function of resonant wavelength as defined by curve 2761W, and provides a first region 2801 from 450 to 600 nm and a second region 2802 from 600 to 645 nm, and the reference line λc at 645 nm; and FIG. 28C graphs the color response in a*, b* color coordinates of the reflective polarizer-absorbing polarizer laminate, with the curves φ5, φ25, and φ35 having analogous meanings to those of FIG. 10C, and with a reference circle C.

For the ORU thickness profile 2762: FIG. 29A is a compound graph in which curve 2762 is identical to the profile 2762, curve 2762A is the IB-smoothed thickness profile of curve 2762, the curve 2762W is the resonant wavelength for the IB-smoothed thickness profile at the specified oblique optical geometry, and reference line λc marks the critical wavelength at 645 nm; FIG. 29B graphs as curve 2762S the slope of the IB-smoothed thickness profile 2762A as a function of resonant wavelength as defined by curve 2762W, and provides a first region 2901 from 450 to 600 nm and a second region 2902 from 600 to 645 nm, and the reference line λc at 645 nm; and FIG. 29C graphs the color response in a*, b* color coordinates of the reflective polarizer-absorbing polarizer laminate, with the curves φ15, φ25, and φ35 having analogous meanings to those of FIG. 10C, and with a reference circle C.

For the ORU thickness profile 2763: FIG. 30A is a compound graph in which curve 2763 is identical to the profile 2763, curve 2763A is the IB-smoothed thickness profile of curve 2763, the curve 2763W is the resonant wavelength for the IB-smoothed thickness profile at the specified oblique optical geometry, and reference line λc marks the critical wavelength at 645 nm; FIG. 30B graphs as curve 2763S the slope of the IB-smoothed thickness profile 2763A as a function of resonant wavelength as defined by curve 2763W, and provides a first region 3001 from 450 to 600 nm and a second region 3002 from 600 to 645 nm, and the reference line λc at 645 nm; and FIG. 30C graphs the color response in a*, b* color coordinates of the reflective polarizer-absorbing polarizer laminate, with the curves φ5, φ25, φ35, and φ45 having analogous meanings to those of FIG. 10C, and with a reference circle C.

The results of the slope ratio for the embodiments of FIG. 27 are summarized in Table 4, where the "Slope Ratio" has the same meaning as in Tables 2 and 3 above.

TABLE 4

| thickness profile in FIG. 27 | Slope Ratio |
| --- | --- |
| 2761 | undefined |
| 2762 | 0.84 |
| 2763 | 1.0 |

Figure 28C:
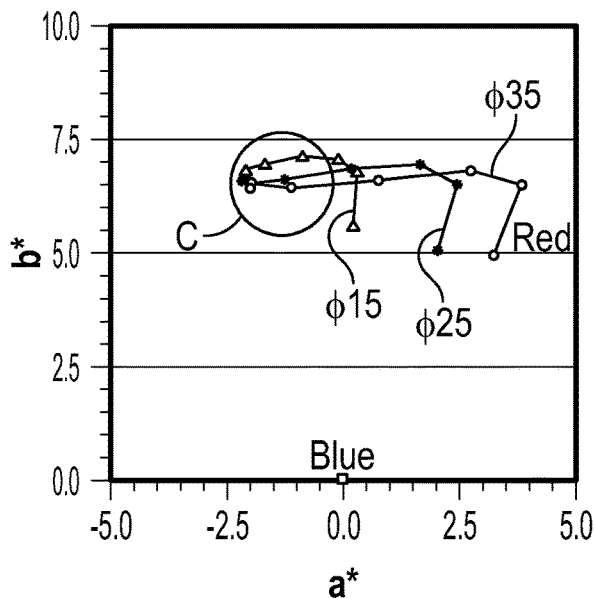
FIG. 28C is a graph of the calculated color of light transmitted through a laminate of a TOP reflective polarizer and a high contrast absorbing polarizer over a range of azimuthal ($\phi$) and polar ($\theta$) angles, the TOP polarizer having the thickness profile of FIG. 28A.
Figure 29C:
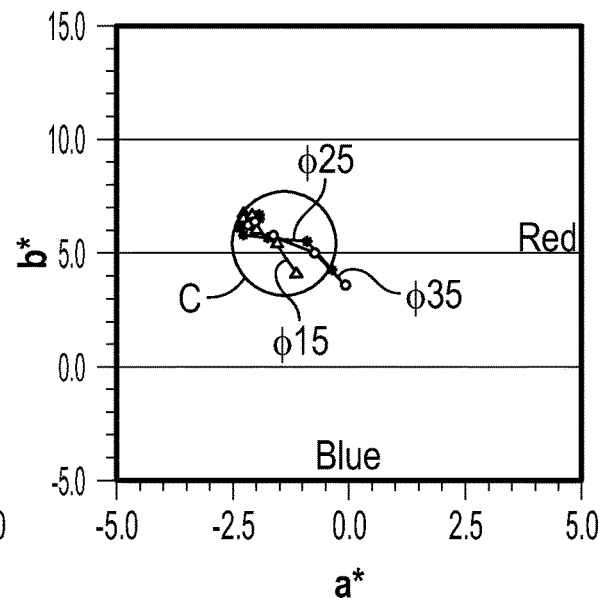
FIGS. 29B and 29C, and 30B and 30C are graphs similar to those of FIGS. 28B and 29C, respectively, but for such other TOP polarizer embodiments.
Figure 30C:
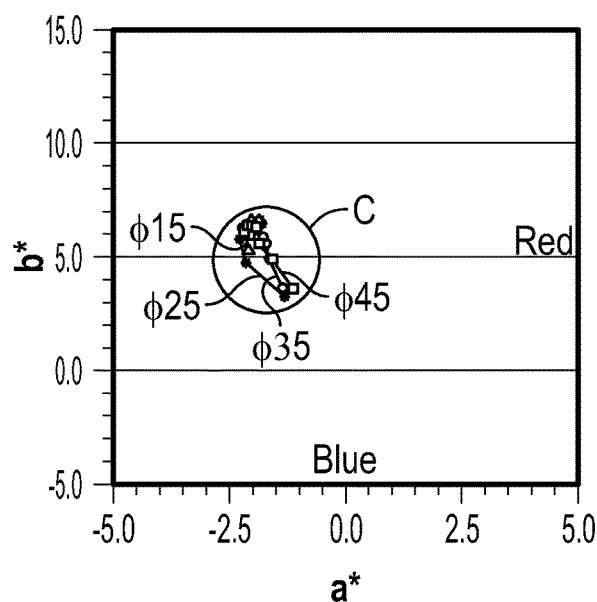
Figure 29A:
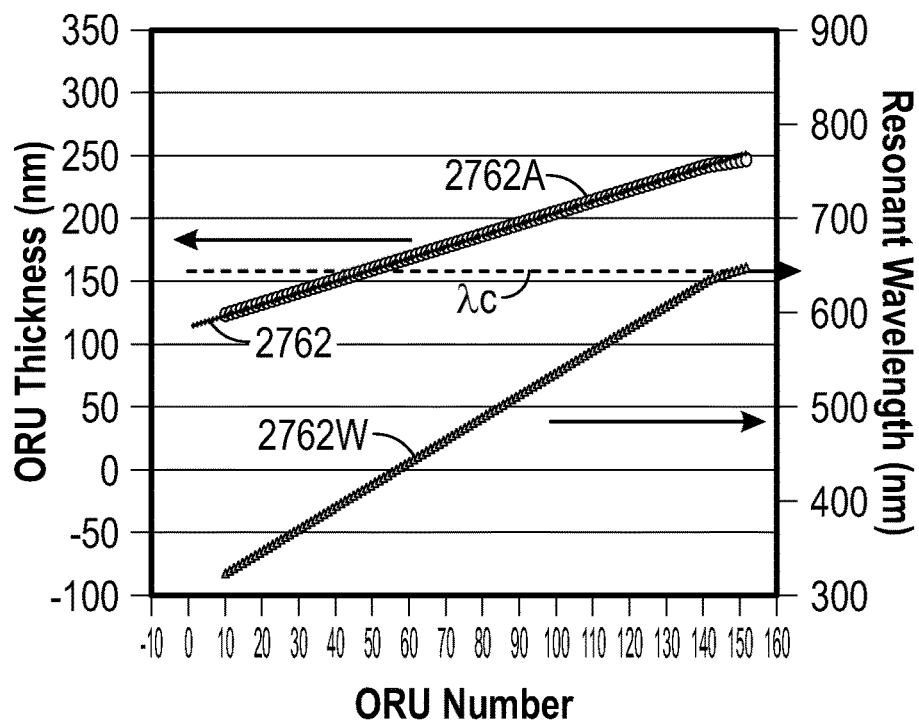
FIGS. 29A and 30A are compound graphs similar to that of FIG. 28A but for other TOP multilayer optical film reflective polarizer embodiments.
Figure 29B:
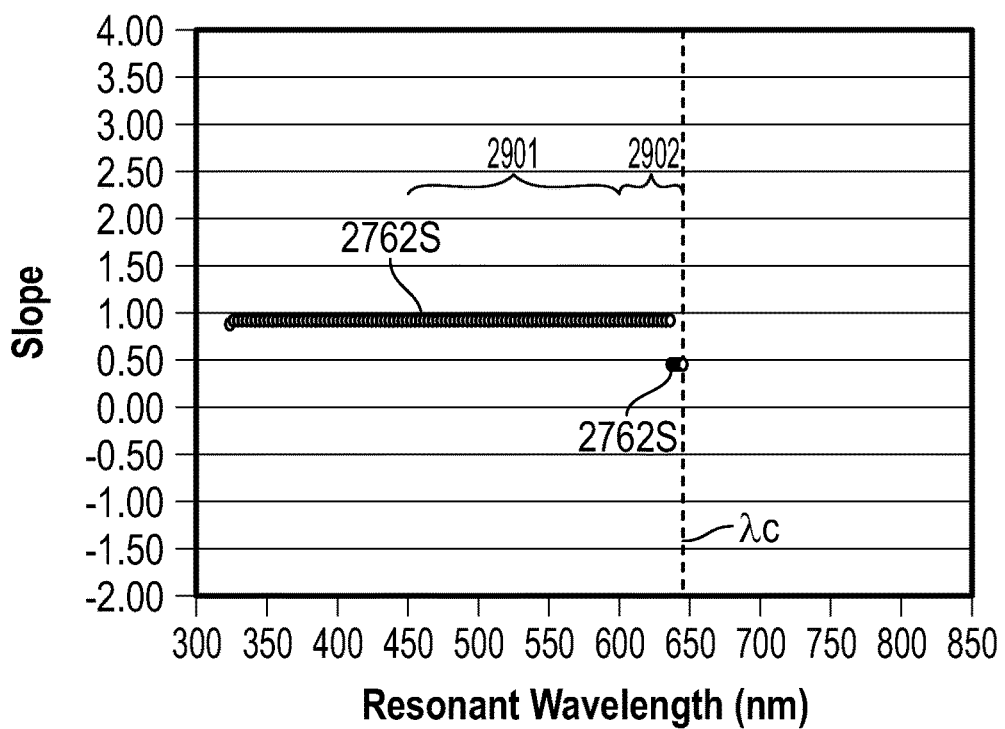
Figure 30A:
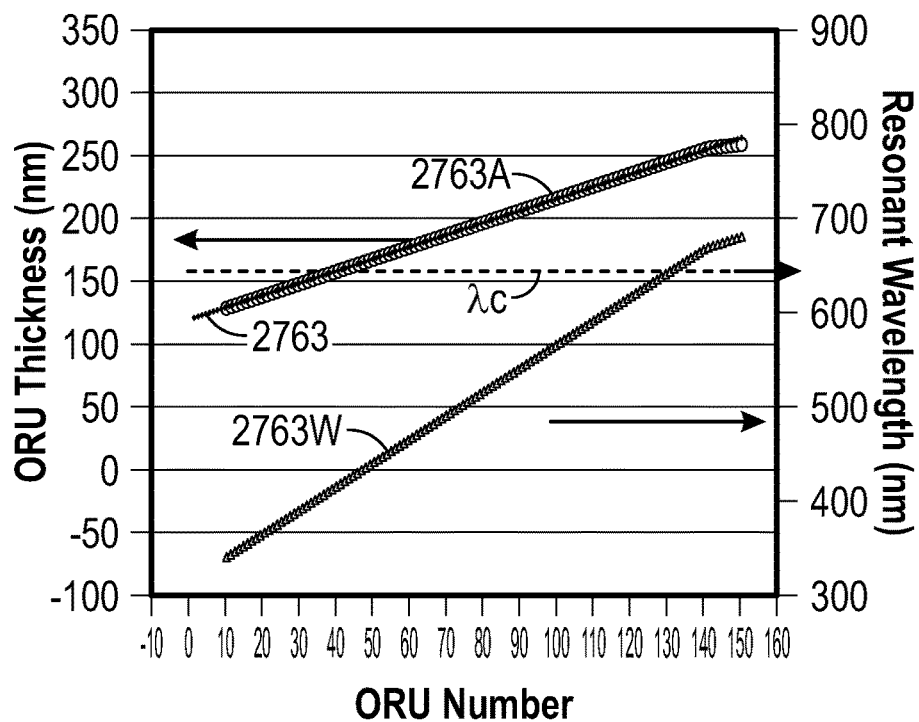
Figure 30B:
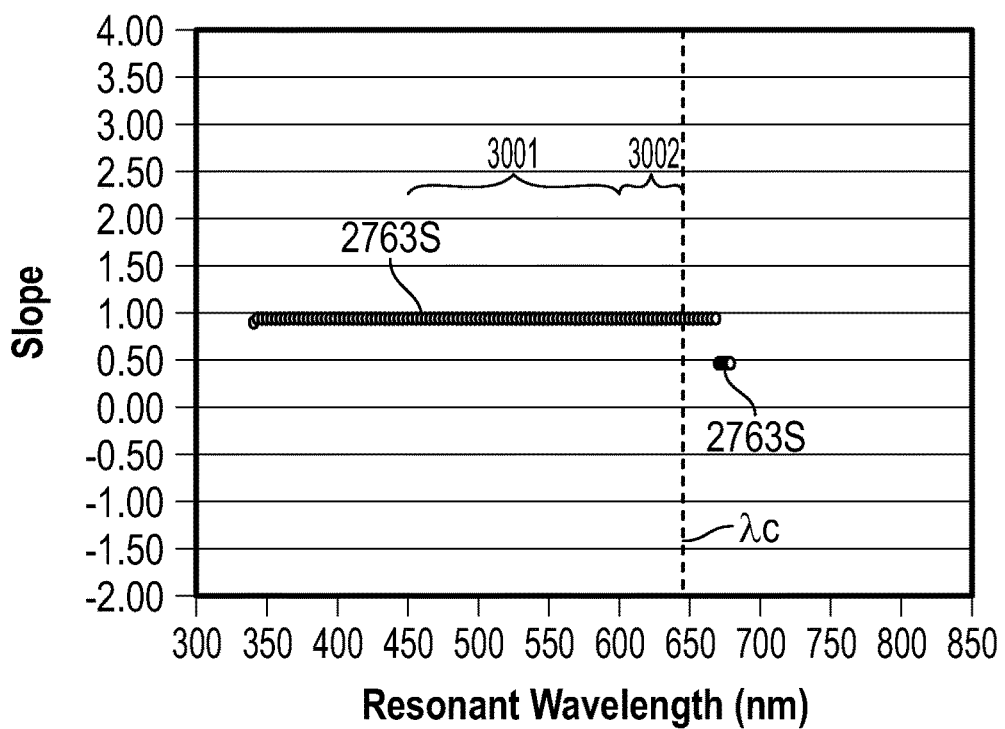
Figure 31:
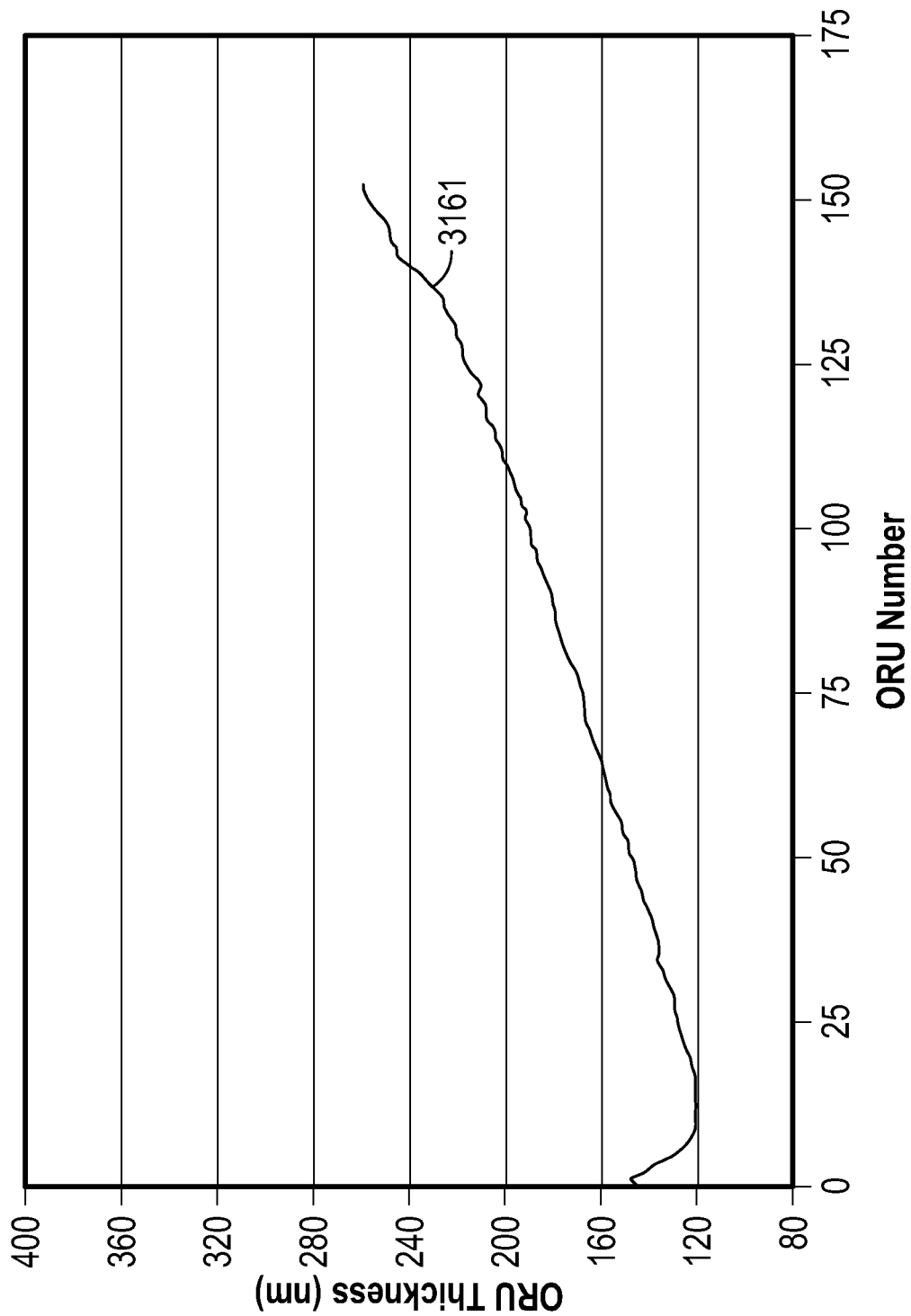
FIG. 31 is a graph of a measured physical thickness profile for an example TOP multilayer optical film reflective polarizer that was made and tested.

The color response of these embodiments, for a viewer at the highly oblique critical viewing angle, is best evaluated by inspection of the color response curves in FIGS. 28C, 29C, and 30C. In brief summary: the color trajectory of FIG. 28C (for ORU thickness profile 2761) produces a significant unacceptable red color; but the color trajectories of FIGS. 29C and 30C (for ORU thickness profiles 2762, 2763 respectively) remain within acceptable limits.

EXAMPLE AND COMPARATIVE EXAMPLES

Some polymer-based TOP reflective polarizer films were fabricated on continuous film lines by procedures that included polymer coextrusion through a feedblock, quenching, and tentering. Such films, and in some cases laminates of such films with an aligned high contrast absorbing polarizer, were also tested. Some of the testing involved measuring the thickness profile of the microlayer stack with an AFM device. Other testing involved observing a piece of the polarizer film, or laminate thereof, on a light table at highly oblique optical geometries.

In a first case, referred to herein as the "Example", a TOP reflective polarizer film was made in accordance with known multilayer optical film fabrication techniques in which the biaxially birefringent microlayers of the microlayer packet comprised LmPEN as described above, and the isotropic microlayers of the microlayer packet comprised an amorphous blend of PETg GN071 (Eastman Chemicals, Knoxville, Tenn.) and LmPEN at the weight fraction of 58% and 42%, respectively. The refractive indices of these polymers were similar to those in Table 1. An axial rod heater, as described for example in U.S. Pat. No. 6,783,349 (Neavin et al.), was employed in the feedblock, and the temperature profile along the axial rod heater was used to provide some control over the polymer flowstreams, and hence also over the ORU thickness profile in the finished TOP reflective polarizer film. The microlayer packet in such film contained 152 ORUs, each ORU having one biaxially birefringent microlayer and one isotropic microlayer. The physical thickness of the TOP reflective polarizer was about 31 microns. The Example TOP reflective polarizer provided a block axis and a pass axis, and a wide band reflectivity for normally incident light polarized along the block axis, the reflectivity for such normally incident polarized light being greater than 90% from 430 nm to 650 nm.

Layer thicknesses in the finished film were measured with an AFM device. The raw AFM thickness output was conditioned using an averaging technique to filter out noise and obtain more accurate thickness values. The resulting measured thicknesses of the ORUs are plotted as ORU physical thickness profile 3161 in FIG. 31. Inspection of the graph reveals the microlayer packet had a first end, at ORU #1, and a second end, at ORU #151, and ORUs proximate the second end had an average physical thickness greater than that of ORUs proximate the first end.

Figure 32A:
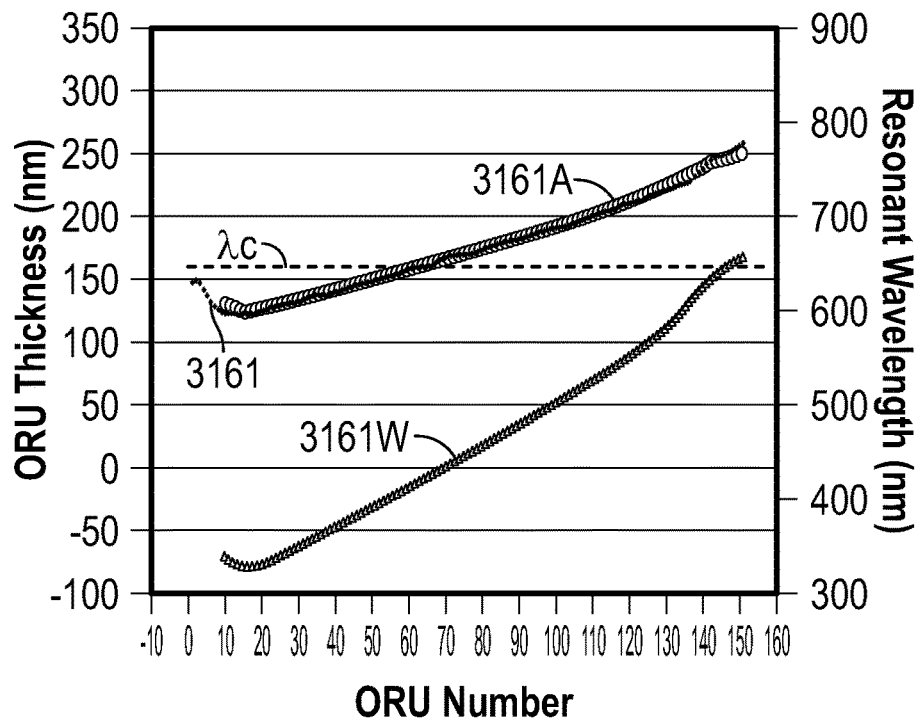
FIG. 32A is a compound graph that plots ORU thickness against ORU number, and also plots a resonant wavelength against the ORU number.
Figure 32B:
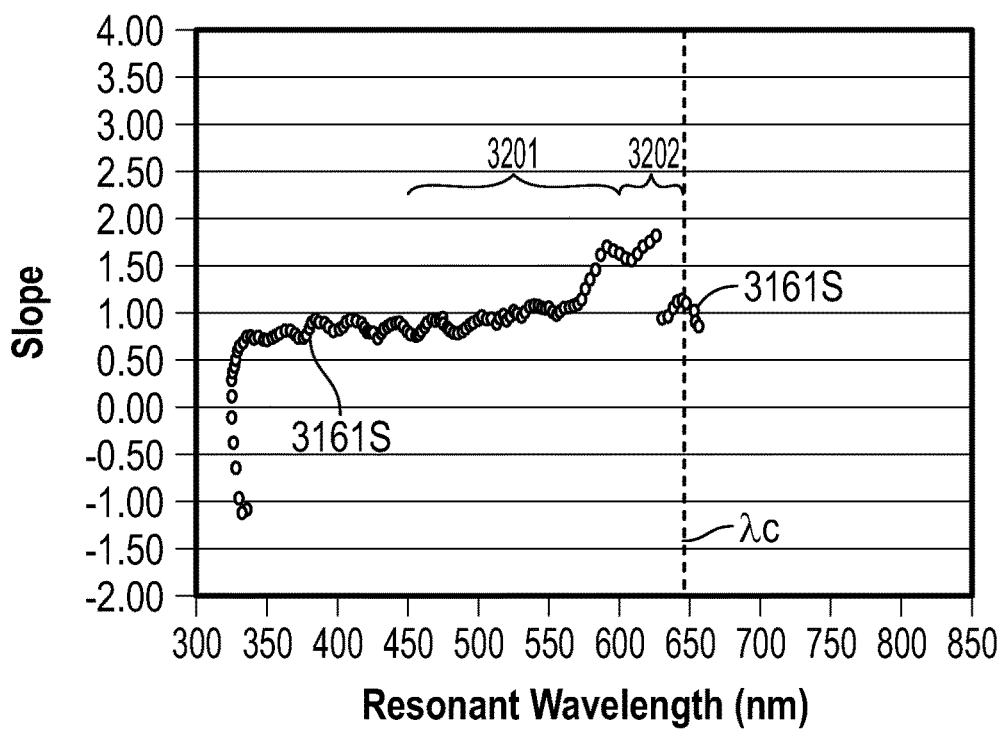
FIG. 32B is a graph of the slope of an averaged thickness profile in FIG. 32A as a function of resonant wavelength.
Figure 32C:
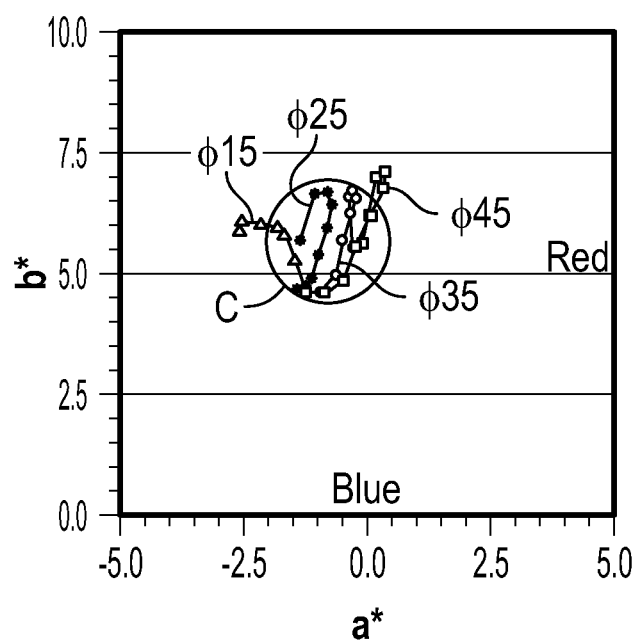
FIG. 32C is a graph of the calculated color of light transmitted through a laminate of a TOP reflective polarizer and a high contrast absorbing polarizer over a range of azimuthal ($\phi$) and polar ($\theta$) angles, the TOP polarizer having the thickness profile of FIG. 32A.
Figure 33:
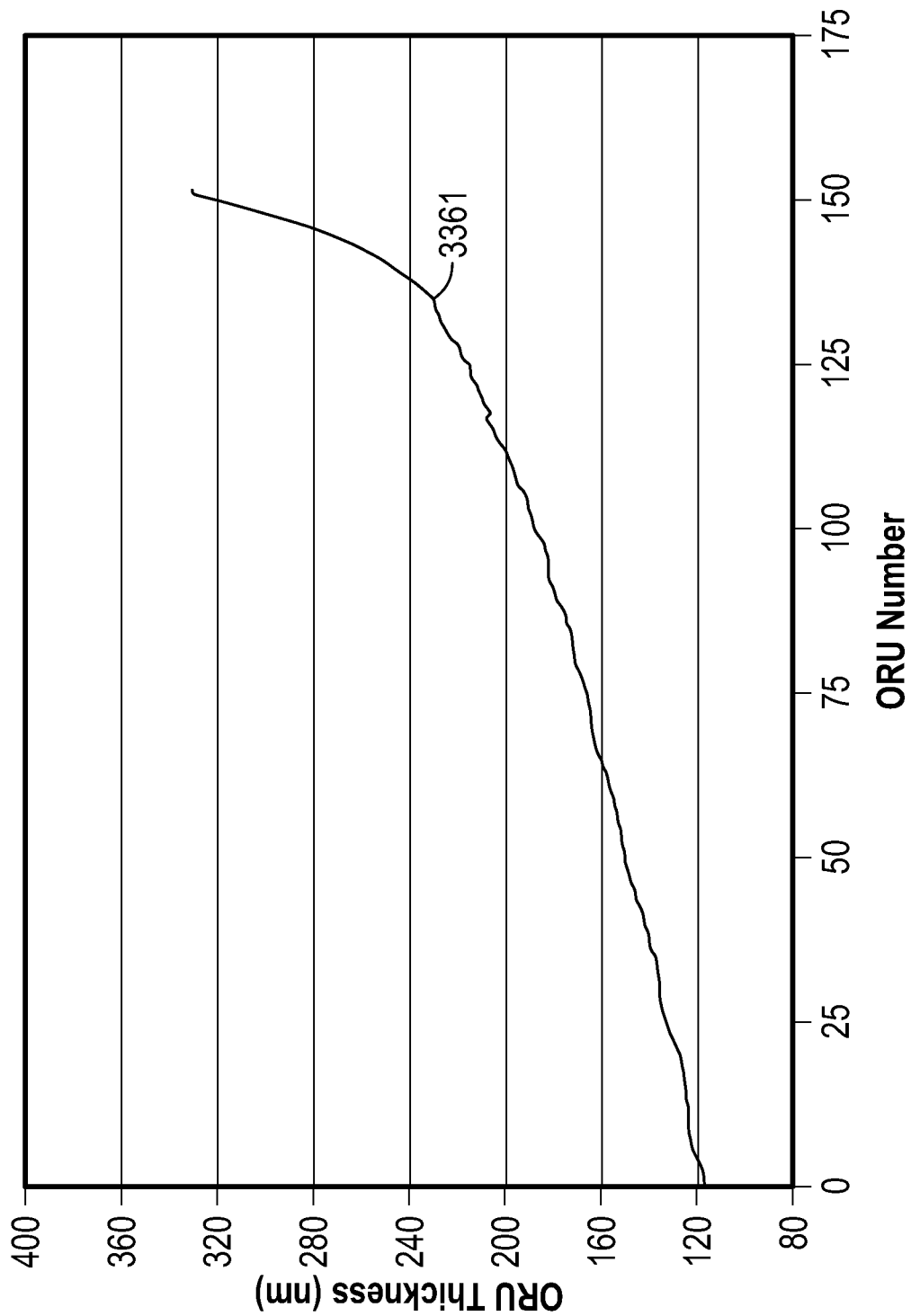
FIG. 33 is a graph of a measured physical thickness profile for a comparative example (known) TOP reflective polarizer.

An analysis was done on the profile 3161 in substantially the same manner as described in connection with the other embodiments above. In that regard: FIG. 32A is a compound graph in which curve 3161 is identical to the profile 3161, curve 3161A is the IB-smoothed thickness profile of curve 3161, the curve 3161W is the resonant wavelength for the IB-smoothed thickness profile at the specified oblique optical geometry, and reference line λc marks the critical wavelength at 645 nm; FIG. 32B graphs as curve 3161S the slope of the IB-smoothed thickness profile 3161A as a function of resonant wavelength as defined by curve 3161W, and provides a first region 3201 from 450 to 600 nm and a second region 3202 from 600 to 645 nm, and the reference line λc at 645 nm; and FIG. 32C graphs the color response in a*, b* color coordinates of a (modeled) laminate of a reflective polarizer (as characterized by the profile 3161) with an aligned, high contrast absorbing polarizer (contrast=1000), and with the TOP reflective polarizer oriented so that the end of the packet with generally thicker ORUs is closer to the absorbing polarizer than the end of the packet with generally thinner ORUs, with the curves φ15, φ25, φ35, and φ45 having analogous meanings to those of FIG. 10C, and with a reference circle C.

The slope ratio for the Example, calculated in the same fashion as the Slope Ratio in Tables 2, 3, and 4 above, was equal to 1.34. This value, being less than 1.8, is consistent with the observation that the color response curves in FIG. 32C remain substantially within acceptable limits, exhibiting acceptable color uniformity behavior and remaining substantially white in color within the critical high angle viewing range.

A physical sample of the Example TOP reflective polarizer film was also visually tested and observed on a light table. Clear glass was laminated to a San Ritz 5618 absorbing polarizer (San Ritz, Tokyo, Japan) using the adhesive that is a component of the San Ritz 5618 polarizer. The TOP reflective polarizer film was then laminated using an optically clear adhesive (OCA 8171 from 3M, Saint Paul, Minn.) to the absorbing polarizer. In order to view the color characteristics of this laminate at a variety of angles, a diffuse light table was utilized using the type of white LEDs commonly found in LCD backlights. The laminate was placed on the light table with the reflective polarizer side down. The laminate was then viewed over the entire hemisphere. The example film showed no objectionable colors or color uniformity even when viewed at the most severe angles (θ=80 degrees and φ=15, 25, 35, and 45 degrees). The example laminate was compared to another laminate made using the reflective polarizer contained within a commercialized on-glass reflective polarizer (APCF from Nitto Denko, Tokyo, Japan). The laminate made using the APCF reflective polarizer was constructed of the same layers as the Example laminate: glass/adhesive/absorbing polarizer/adhesive/reflecting polarizer, with the absorbing polarizer being the same as that used in the Example laminate (but where the reflective polarizer was the APCF reflective polarizer). When viewed at the angles described above, both laminates had very small color shifts with angle and very small spatial color uniformity that were judged to be similar in intensity.

In another case, referred to herein as "Comparative Example 1", a TOP reflective polarizer film was made in accordance with known multilayer optical film fabrication techniques in which the biaxially birefringent microlayers of the microlayer packet comprised LmPEN as described above, and the isotropic microlayers of the microlayer packet comprised an amorphous blend of PETg GN071 (Eastman Chemicals, Knoxville, Tenn.) and LmPEN at the weight fraction of 58% and 42%, respectively. The refractive indices of these polymers were similar to those in Table 1. The microlayer packet in such film contained 152 ORUs, each ORU having one biaxially birefringent microlayer and one isotropic microlayer. The physical thickness of the TOP reflective polarizer was about 31 microns.

Figure 34A:
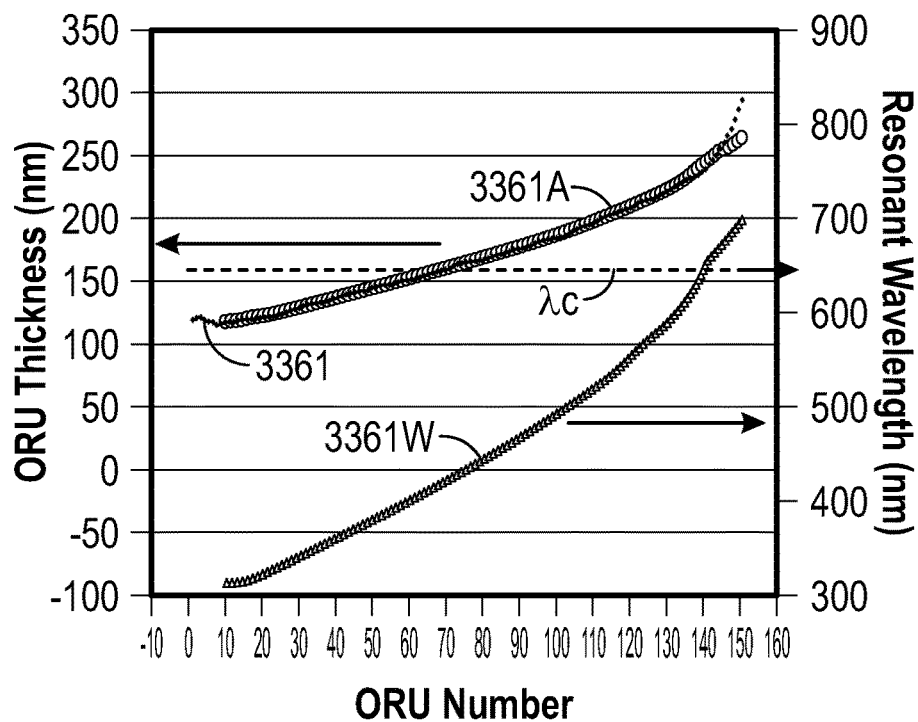
FIG. 34A is a compound graph that plots ORU thickness against ORU number, and also plots a resonant wavelength against the ORU number.
Figure 34B:
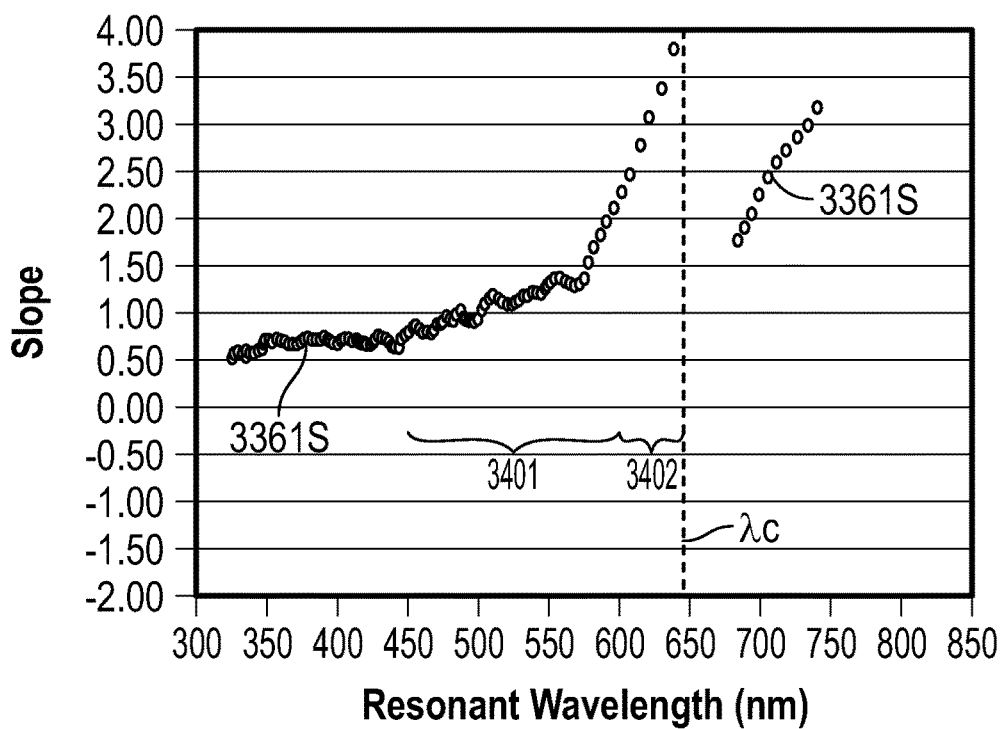
FIG. 34B is a graph of the slope of an averaged thickness profile in FIG. 34A as a function of resonant wavelength.
Figure 34C:
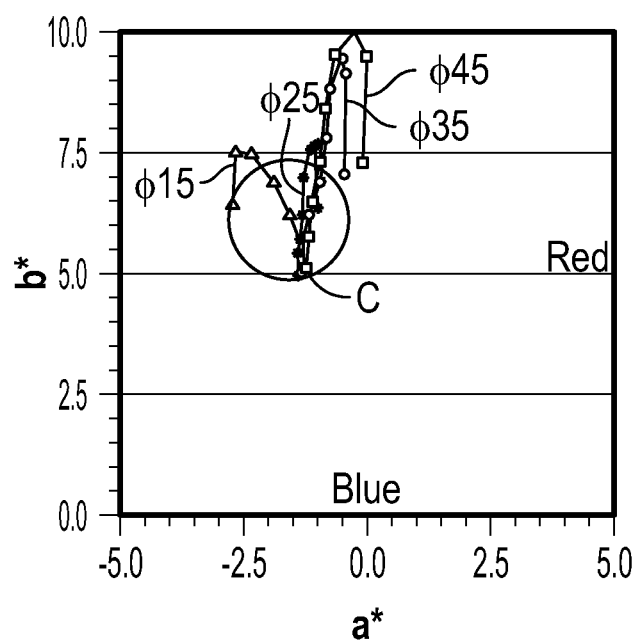
FIG. 34C is a graph of the calculated color of light transmitted through a laminate of a TOP reflective polarizer and a high contrast absorbing polarizer over a range of azimuthal ($\phi$) and polar ($\theta$) angles, the TOP polarizer having the thickness profile of FIG. 34A.
Figure 35:
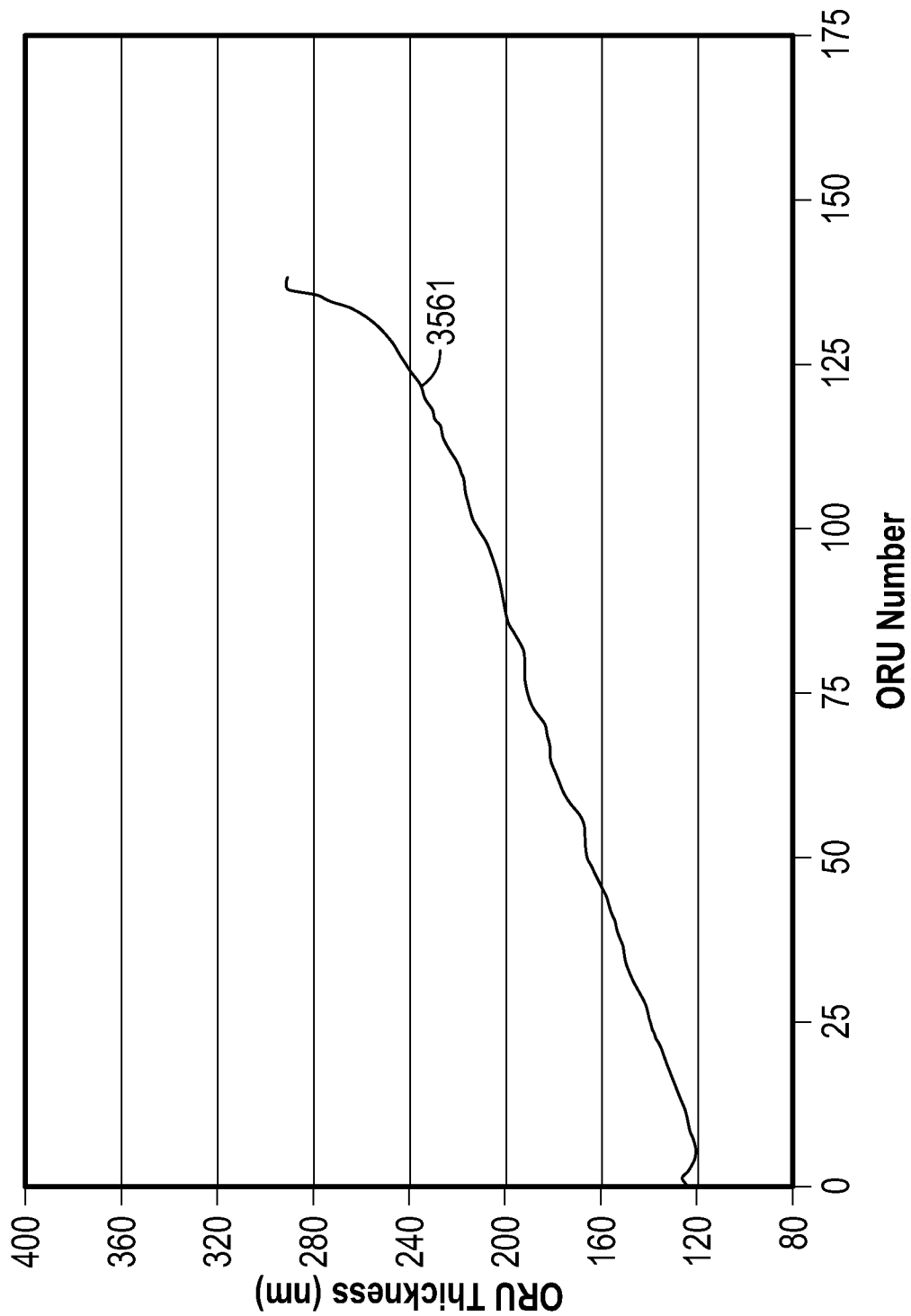
FIG. 35 is a graph of a measured physical thickness profile for another comparative example (known) TOP multilayer optical film reflective polarizer.

Layer thicknesses in the finished film were measured with an AFM device. The raw AFM thickness output was conditioned using an averaging technique to filter out noise and obtain more accurate thickness values. The resulting measured thicknesses of the ORUs are plotted as ORU physical thickness profile 3361 in FIG. 33. Inspection of the graph reveals the microlayer packet had a first end, at ORU #1, and a second end, at ORU #151, and ORUs proximate the second end had an average physical thickness greater than that of ORUs proximate the first end. An analysis was done on the profile 3361 in substantially the same manner as described in connection with the other embodiments above. In that regard: FIG. 34A is a compound graph in which curve 3361 is identical to the profile 3361, curve 3361A is the IB-smoothed thickness profile of curve 3361, the curve 3361W is the resonant wavelength for the IB-smoothed thickness profile at the specified oblique optical geometry, and reference line λc marks the critical wavelength at 645 nm; FIG. 34B graphs as curve 3361S the slope of the IB-smoothed thickness profile 3361A as a function of resonant wavelength as defined by curve 3361W, and provides a first region 3401 from 450 to 600 nm and a second region 3402 from 600 to 645 nm, and the reference line λc at 645 nm; and FIG. 34C graphs the color response in a*, b* color coordinates of a (modeled) laminate of a reflective polarizer (as characterized by the profile 3361) with an aligned, high contrast absorbing polarizer (contrast=1000), and with the TOP reflective polarizer oriented so that the end of the packet with generally thicker ORUs is closer to the absorbing polarizer than the end of the packet with generally thinner ORUs, with the curves φ15, φ25, φ35, and φ45 having analogous meanings to those of FIG. 10C, and with a reference circle C.

The slope ratio for the Comparative Example 1, calculated in the same fashion as the Slope Ratio in Tables 2, 3, and 4 above, was equal to 2.62. This value, being greater than 1.8, is consistent with the observation that the color response curves in FIG. 34C exhibit unacceptable color uniformity behavior, creating a white-to-yellow effect, within the critical high angle viewing range.

A physical sample of the Comparative Example 1 TOP reflective polarizer film was also visually tested and observed on a light table. Clear glass was laminated to a San Ritz 5618 absorbing polarizer (San Ritz, Tokyo, Japan) using the adhesive that is a component of the San Ritz 5618 polarizer. The Comparative Example 1 film was then laminated using an optically clear adhesive (OCA 8171 from 3M, Saint Paul, Minn.) to the absorbing polarizer. In order to view the color characteristics of this laminate at a variety of angles, a diffuse light table was utilized using the type of white LEDs commonly found in LCD backlights. The laminate was placed on the light table with the reflective polarizer side down. The laminate was then viewed over the entire hemisphere. The Comparative Example 1 laminate showed objectionable colors, at least when viewed at some of the most severe angles (θ=80 degrees and φ=15, 25, 35, and 45 degrees). When the Comparative Example 1 laminate was compared to the laminate made using the APCF reflective polarizer (described above), it was judged that the Comparative Example 1 laminate had much more severe color shift with angle and spatial color variation, and was too severe to be considered for use in a high fidelity display.

In still another case, referred to herein as "Comparative Example 2", a TOP reflective polarizer film was made in accordance with known multilayer optical film fabrication techniques in which the biaxially birefringent microlayers of the microlayer packet comprised LmPEN, and the isotropic microlayers of the microlayer packet comprised an amorphous blend of PETg GN071 (Eastman Chemicals, Knoxville, Tenn.) and LmPEN at the weight fraction of 58% and 42%, respectively. This Comparative Example 2 TOP reflective polarizer film is substantially similar to the reflective polarizer film described in U.S. Pat. No. 7,791,687 (Weber et al.), at column 10, lines 9-46 and in FIG. 9 thereof. The refractive indices of the birefringent polymer were nx=1.820, ny=1.575, and nz=1.560, and the refractive index of the isotropic polymer was 1.595. The microlayer packet in such film contained 138 ORUs, each ORU having one biaxially birefringent microlayer and one isotropic microlayer. The physical thickness of the TOP reflective polarizer was 31 microns.

Layer thicknesses in the finished film were measured with an AFM device. The raw AFM thickness output was conditioned using an averaging technique to filter out noise and obtain more accurate thickness values. The resulting measured thicknesses of the ORUs are plotted as ORU physical thickness profile 3561 in FIG. 35, which is substantially similar to FIG. 9 of the '687 Weber et al. patent. Inspection of the graph reveals the microlayer packet had a first end, at ORU #1, and a second end, at ORU #137, and ORUs proximate the second end had an average physical thickness greater than that of ORUs proximate the first end.

Figure 36A:
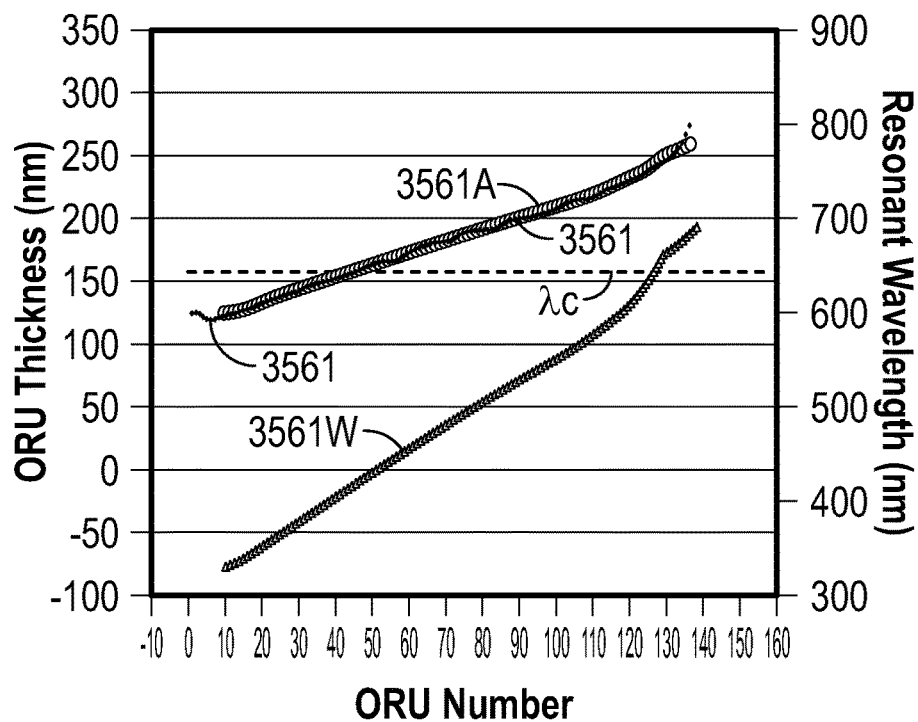
FIG. 36A is a compound graph that plots ORU thickness against ORU number, and also plots a resonant wavelength against the ORU number.
Figure 36B:
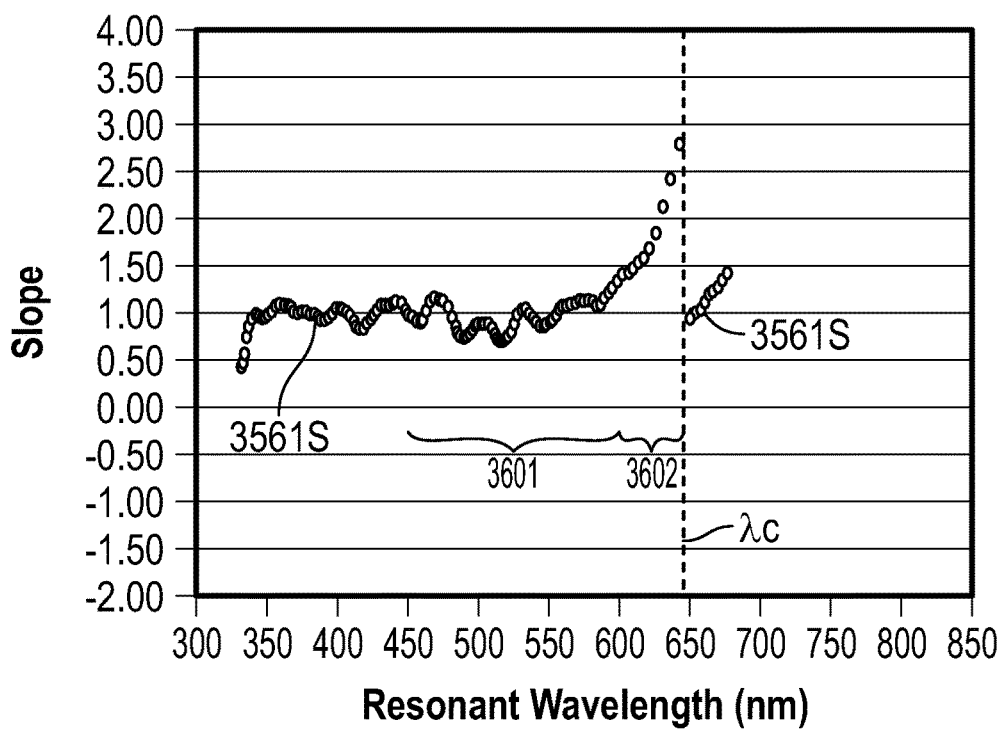
FIG. 36B is a graph of the slope of an averaged thickness profile in FIG. 36A as a function of resonant wavelength.
Figure 36C:
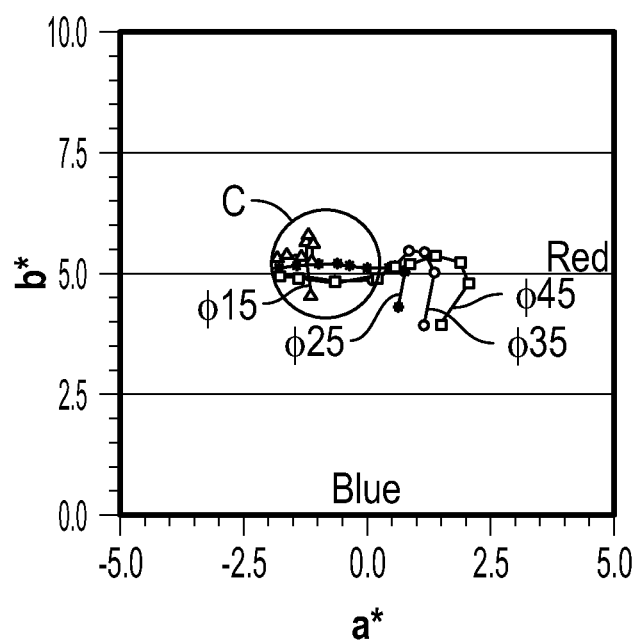
FIG. 36C is a graph of the calculated color of light transmitted through a laminate of a TOP multilayer optical film reflective polarizer and a high contrast absorbing polarizer over a range of azimuthal ($\phi$) and polar ($\theta$) angles, the TOP polarizer having the thickness profile of FIG. 36A.

An analysis was done on the profile 3561 in substantially the same manner as described in connection with the other embodiments above. In that regard: FIG. 36A is a compound graph in which curve 3561 is identical to the profile 3561, curve 3561A is the IB-smoothed thickness profile of curve 3561, the curve 3561W is the resonant wavelength for the IB-smoothed thickness profile at the specified oblique optical geometry, and reference line $\lambda c$ marks the critical wavelength at 645 nm; FIG. 36B graphs as curve 3561S the slope of the IB-smoothed thickness profile 3561A as a function of resonant wavelength as defined by curve 3561W, and provides a first region 3601 from 450 to 600 nm and a second region 3602 from 600 to 645 nm, and the reference line $\lambda c$ at 645 nm; and FIG. 36C graphs the color response in a*, b* color coordinates of a (modeled) laminate of a reflective polarizer (as characterized by the profile 3561) with an aligned, high contrast absorbing polarizer (contrast=1000), and with the TOP reflective polarizer oriented so that the end of the packet with generally thicker ORUs is closer to the absorbing polarizer than the end of the packet with generally thinner ORUs, with the curves $\phi 15$, $\phi 25$, $\phi 35$, and $\phi 45$ having analogous meanings to those of FIG. 10C, and with a reference circle C.

The slope ratio for the Comparative Example 2, calculated in the same fashion as the Slope Ratio in Tables 2, 3, and 4 above, was equal to 1.91. This value, being greater than 1.8, is consistent with the observation that the color response curves in FIG. 36C exhibit unacceptable color uniformity behavior, creating a white-to-red effect, within the critical high angle viewing range.

A physical sample of the Comparative Example 2 TOP reflective polarizer film was also visually tested and observed on a light table. Clear glass was laminated to a San Ritz 5618 absorbing polarizer (San Ritz, Tokyo, Japan) using the adhesive that is a component of the San Ritz 5618 polarizer. The Comparative Example 2 film was then laminated using an optically clear adhesive (OCA 8171 from 3M, Saint Paul, Minn.) to the absorbing polarizer. In order to view the color characteristics of this laminate at a variety of angles, a diffuse light table was utilized using the type of white LEDs commonly found in LCD backlights. The laminate was placed on the light table with the reflective polarizer side down. The laminate was then viewed over the entire hemisphere. The Comparative Example 2 laminate showed objectionable colors, at least when viewed at some of the most severe angles ($\theta$=80 degrees and $\phi$=15, 25, 35, and 45 degrees). When the Comparative Example 2 laminate was compared to the laminate made using the APCF reflective polarizer (described above), it was judged that the Comparative Example 2 laminate had much more severe color shift with angle and spatial color variation, and was too severe to be considered for use in a high fidelity display.

We also wish to address the issue of how the reflective polarizer should be oriented relative to the absorbing polarizer in the laminate to achieve the lowest levels of unwanted visible color at high oblique angles in the white state of the display (in additional to low color at normal incidence and intermediate oblique angles). We state above that such unwanted visible color can be substantially reduced to acceptable levels by orienting the TOP polarizer such that the thick microlayer end of the microlayer packet (the side of the TOP polarizer with the thicker ORUs, given that there is a gradient along the thickness axis of the polarizer from predominantly thinner to predominantly thicker ORUs) is adjacent to, and faces, the absorbing polarizer (and the front of the display), and the thinner microlayer end faces the back of the display and away from the absorbing polarizer. Referring to this as the thick-layers-up orientation, and the opposite orientation as the thin-layers-up orientation, the Example laminate, the Comparative Example 1 laminate, and the Comparative Example 2 laminate all used the thick-layers-up orientation. Each of those three laminates was however also investigated in a reconfigured thin-layers-up orientation using the diffuse light table. In each case, the color performance at the most severe observation geometry (for example, $\theta$=80 degrees and $\phi$=15, 25, 35, and 45 degrees) was inferior to the color performance in the thick-layers-up orientation.

Following is a non-comprehensive list of some items discussed and described in the present disclosure.

Item 1 is a laminate, comprising:
a reflective polarizer having only one packet of microlayers that reflects and transmits light by optical interference, the packet of microlayers configured to define a first pass axis (y), a first block axis (x), and a first thickness axis (z) perpendicular to the first pass axis and the first block axis, the first block axis and the first thickness axis forming an x-z plane, the packet of microlayers comprising alternating first and second microlayers, the first microlayers being biaxially birefringent; and
an absorbing polarizer having a second pass axis and a second block axis, the absorbing polarizer attached to the reflective polarizer with no air gap therebetween and such that the first and second pass axes are substantially aligned, the absorbing polarizer having a contrast ratio of at least 1000;
wherein adjacent pairs of the first and second microlayers form optical repeat units (ORUs) along the packet of microlayers, the ORUs defining a physical thickness profile having a gradient that provides a wide band reflectivity for normally incident light polarized along the first block axis, the ORUs having respective resonant wavelengths as a function of the physical thickness profile and optical geometry;

wherein the ORUs include a first ORU and a last ORU defining opposite ends of the packet, the last ORU being closer than the first ORU to the absorbing polarizer, and wherein the physical thickness profile is such that ORUs proximate the last ORU have an average physical thickness greater than that of ORUs proximate the first ORU;

wherein an intrinsic-bandwidth based boxcar average of the physical thickness profile yields an IB-smoothed thickness profile, the IB-smoothed thickness profile being defined at each of the ORUs;

wherein the ORUs further include:
- an ORU(450) having a resonant wavelength, for the IB-smoothed thickness profile, of at least 450 nm for an oblique optical geometry in which p-polarized light is incident in the x-z plane at a polar angle ($\theta$) of 80 degrees, all of the ORUs disposed on a side of the ORU(450) that includes the first ORU having resonant wavelengths less than 450 nm for the IB-smoothed thickness profile at the oblique optical geometry;
- an ORU(600) having a resonant wavelength, for the IB-smoothed thickness profile, of at least 600 nm for the oblique optical geometry, all of the ORUs disposed on a side of the ORU(600) that includes the first ORU having resonant wavelengths less than 600 nm for the IB-smoothed thickness profile at the oblique optical geometry; and
- an ORU(645) which optionally may be the same as the last ORU, the ORU(645) having a resonant wavelength, for the IB-smoothed thickness profile, of at least 645 nm for the oblique optical geometry, all of the ORUs disposed on a side of the ORU(645) that includes the first ORU having resonant wavelengths less than 645 nm for the IB-smoothed thickness profile at the oblique optical geometry; and wherein the IB-smoothed thickness profile has a first average slope over a range from ORU(450) to ORU(600), and a second average slope over a range from ORU(600) to ORU(645), and a ratio of the second average slope to the first average slope is no more than 1.8.

Item 2 is the laminate of item 1, wherein the IB-smoothed thickness profile, as evaluated at any given ORU, encompasses substantially only those ORUs that coherently contribute to a reflectivity of the packet at a resonant wavelength of the given ORU.

Item 3 is the laminate of item 1, wherein the IB-smoothed thickness profile, as evaluated at any given ORU, encompasses a predetermined number of the ORUs that are nearest neighbors on each side of the given ORU.

Item 4 is the laminate of item 3, wherein the predetermined number is no more than 20.

Item 5 is the laminate of item 3, wherein the predetermined number is at least 5.

Item 6 is the laminate of item 3, wherein the predetermined number is 10.

Item 7 is the laminate of any preceding item, wherein the resonant wavelength of the ORU(450), for the IB-smoothed thickness profile, is less than 455 nm, and the resonant wavelength of the ORU(600), for the IB-smoothed thickness profile, is less than 605 nm, and the resonant wavelength of the ORU(645), for the IB-smoothed thickness profile, is less than 650 nm.

Item 8 is the laminate of any preceding item, wherein the second microlayers are substantially isotropic.

Item 9 is the laminate of any preceding item, wherein first and second microlayers respectively comprise different first and second polymer materials.

Item 10 is the laminate of any preceding item, wherein the reflective polarizer has a physical thickness of less than 50 microns.

Item 11 is the laminate of item 10, wherein the physical thickness of the reflective polarizer is in a range from 20 to 40 microns.

Item 12 is the laminate of any preceding item, wherein the laminate consists essentially of the reflective polarizer, the absorbing polarizer, and an adhesive layer that bonds the reflective polarizer to the absorbing polarizer.

Item 13 is the laminate of any preceding item, wherein the packet of microlayers provides the reflective polarizer with a normal incidence transmission, on average over a wavelength range from 400-700 nm, of at least 80% for a pass state polarization and less than 15% for a block state polarization.

Item 14 is a reflective polarizer having only one packet of microlayers that reflects and transmits light by optical interference, the packet of microlayers configured to define a pass axis (y), a block axis (x), and a thickness axis (z) perpendicular to the pass axis and the block axis, the block axis and the thickness axis forming an x-z plane, the packet of microlayers comprising alternating first and second microlayers, the first microlayers being biaxially birefringent;

wherein adjacent pairs of the first and second microlayers form optical repeat units (ORUs) along the packet of microlayers, the ORUs defining a physical thickness profile having a gradient that provides a wide band reflectivity for normally incident light polarized along the block axis, the ORUs having respective resonant wavelengths as a function of the physical thickness profile and optical geometry;

wherein the ORUs include a first ORU and a last ORU defining opposite ends of the packet, and wherein the physical thickness profile is such that ORUs proximate the last ORU have an average physical thickness greater than that of ORUs proximate the first ORU;

wherein an intrinsic-bandwidth based boxcar average of the physical thickness profile yields an IB-smoothed thickness profile, the IB-smoothed thickness profile being defined at each of the ORUs;

wherein the ORUs further include:
- an ORU(450) having a resonant wavelength, for the IB-smoothed thickness profile, of at least 450 nm for an oblique optical geometry in which p-polarized light is incident in the x-z plane at a polar angle ($\theta$) of 80 degrees, all of the ORUs disposed on a side of the ORU(450) that includes the first ORU having resonant wavelengths less than 450 nm for the IB-smoothed thickness profile at the oblique optical geometry;
- an ORU(600) having a resonant wavelength, for the IB-smoothed thickness profile, of at least 600 nm for the oblique optical geometry, all of the ORUs disposed on a side of the ORU(600) that includes the first ORU having resonant wavelengths less than 600 nm for the IB-smoothed thickness profile at the oblique optical geometry; and
- an ORU(645) which optionally may be the same as the last ORU, the ORU(645) having a resonant wavelength, for the IB-smoothed thickness profile, of at least 645 nm for the oblique optical geometry, all of the ORUs disposed on a side of the ORU(645) that includes the first ORU having resonant wavelengths less than 645 nm for the IB-smoothed thickness profile at the oblique optical geometry; and wherein the IB-smoothed thickness profile has a first average slope over a range from ORU(450) to ORU(600), and a second average slope over a range from ORU(600) to ORU(645), and a ratio of the second average slope to the first average slope is no more than 1.8.

Item 15 is the polarizer of item 14, wherein the IB-smoothed thickness profile, as evaluated at any given ORU, encompasses substantially only those ORUs that coherently contribute to a reflectivity of the packet at a resonant wavelength of the given ORU.

Item 16 is the polarizer of item 14, wherein the IB-smoothed thickness profile, as evaluated at any given ORU, encompasses a predetermined number of the ORUs that are nearest neighbors on each side of the given ORU.

Item 17 is the polarizer of item 16, wherein the predetermined number is no more than 20.

Item 18 is the polarizer of any of items 14-17, wherein the resonant wavelength of the ORU(450), for the IB-smoothed thickness profile, is less than 455 nm, and the resonant wavelength of the ORU(600), for the IB-smoothed thickness profile, is less than 605 nm, and the resonant wavelength of the ORU(645), for the IB-smoothed thickness profile, is less than 650 nm.

Item 19 is the polarizer of any of items 14-18, wherein the second microlayers are substantially isotropic.

Item 20 is a laminate, comprising:
the reflective polarizer of item 14, where the pass axis is a first pass axis and the block axis is a first block axis; and
an absorbing polarizer having a second pass axis and a second block axis, the absorbing polarizer attached to the reflective polarizer with no air gap therebetween and such that the first and second pass axes are substantially aligned, the absorbing polarizer having a contrast ratio of at least 1000;
wherein the last ORU is closer than the first ORU to the absorbing polarizer.

Unless otherwise indicated, all numbers expressing quantities, measurement of properties, and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings of the present application. Not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, to the extent any numerical values are set forth in specific examples described herein, they are reported as precisely as reasonably possible. Any numerical value, however, may well contain errors associated with testing or measurement limitations.

Various modifications and alterations of this invention will be apparent to those skilled in the art without departing from the spirit and scope of this invention, and it should be understood that this invention is not limited to the illustrative embodiments set forth herein. The reader should assume that features of one disclosed embodiment can also be applied to all other disclosed embodiments unless otherwise indicated. It should also be understood that all U.S. patents, patent application publications, and other patent and non-patent documents referred to herein are incorporated by reference, to the extent they do not contradict the foregoing disclosure.

The invention claimed is:

1. A laminate comprising an absorbing polarizer having a contrast ratio of at least 1000 and disposed on a reflective polarizer with no air gap therebetween, the absorbing and reflective polarizers having substantially aligned pass axes, the reflective polarizer comprising a plurality microlayers reflecting and transmitting light by optical interference and oriented with thicker microlayers closer than thinner microlayers to the absorbing polarizer, the microlayers defining a physical thickness profile such that for incident white light at polar angles ranging from 45 to 85 degrees and azimuthal angles of 15, 25, 35, and 45 degrees, the laminate transmits the incident light with the transmitted light having a color within a circle having a diameter of 3 in a CIE LAB color space.

2. The laminate of claim 1, wherein the plurality of microlayers comprises a plurality of alternating first and second microlayers, and wherein the first microlayers are birefringent and the second microlayers are substantially isotropic.

3. The laminate of claim 1, wherein the plurality of microlayers comprises a plurality of alternating first and second microlayers, and wherein first and second microlayers comprise different polymer materials.

4. The laminate of claim 1, wherein the reflective polarizer has a physical thickness of less than 50 microns.

5. The laminate of claim 1, wherein the reflective polarizer has a physical thickness in a range from 20 to 40 microns.

6. The laminate of claim 1 further comprising an adhesive layer bonding the reflective polarizer to the absorbing polarizer.

7. The laminate of claim 1, wherein for normally incident light over a wavelength range from 400 nm to 700 nm, the reflective polarizer has an average transmission of at least 80% for a pass polarization state, and an average transmission of less than 15% for a block polarization state orthogonal to the pass polarization state.

8. The laminate of claim 1, wherein the plurality of microlayers comprises a plurality of alternating first and second microlayers, wherein the first microlayers have indices of refraction nx along an in-plane first direction, indices of refraction ny along an in-plane orthogonal second direction, and indices of refraction nz along a thickness direction orthogonal to the first and second directions, wherein $|ny-nz| \geq 0.05$, and $|nx-ny| > 0.06$.

9. The laminate of claim 1, wherein the plurality of microlayers comprises a plurality of alternating first and second microlayers, wherein the first microlayers have indices of refraction nx along an in-plane first direction, indices of refraction ny along an in-plane orthogonal second direction, and indices of refraction nz along a thickness direction orthogonal to the first and second directions, wherein $|ny-nz| < 0.05$, and $|nx-ny| > 0.06$.

10. The laminate of claim 1, wherein for an incident white light, the laminate transmits the incident light with the transmitted light having chromaticity coordinated a1* and b1* for normal incidence and chromaticity coordinated a2* and b2* for an 80 degree incidence, and wherein a color shift represented by $\sqrt{(a1^*-a2^*)^2+(b1^*-b2^*)^2}$ is less than 3.5.

11. The laminate of claim 10, wherein the color shift is less than 2.5.

12. The laminate of claim 10, wherein the color shift is less than 2.0.

\* \* \* \* \*

UNITED STATES PATENT AND TRADEMARK OFFICE
CERTIFICATE OF CORRECTION

PATENT NO. : 11,550,089 B2
APPLICATION NO. : 17/305867
DATED : January 10, 2023
INVENTOR(S) : Timothy J. Nevitt It is certified that error appears in the above-identified patent and that said Letters Patent is hereby corrected as shown below:

In the Claims

<u>Column 42</u>
Line 10, In Claim 1, delete "a plurality microlayers" and insert -- a plurality of microlayers --, therefor.

Signed and Sealed this
Twenty-fifth Day of July, 2023

Katherine Kelly Vidal
*Director of the United States Patent and Trademark Office*